(12) United States Patent
Kawanishi et al.

(10) Patent No.: US 7,957,653 B2
(45) Date of Patent: *Jun. 7, 2011

(54) PHASE CONTROL OPTICAL FSK MODULATOR

(75) Inventors: Tetsuya Kawanishi, Tokyo (JP); Masayuki Izutsu, Tokyo (JP); Takahide Sakamoto, Tokyo (JP); Masahiro Tsuchiya, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 12/067,455

(22) PCT Filed: Sep. 19, 2006

(86) PCT No.: PCT/JP2006/318478
§ 371 (c)(1),
(2), (4) Date: Aug. 26, 2009

(87) PCT Pub. No.: WO2007/034766
PCT Pub. Date: Mar. 29, 2007

(65) Prior Publication Data
US 2010/0014874 A1    Jan. 21, 2010

(30) Foreign Application Priority Data

Sep. 20, 2005 (JP) .................. 2005-272624

(51) Int. Cl.
H04B 10/04 (2006.01)
(52) U.S. Cl. ........ 398/188; 398/187; 398/186; 398/192; 398/195

(58) Field of Classification Search .................. 398/187, 398/188, 186, 192, 195
See application file for complete search history.

(56) References Cited

U.S. PATENT DOCUMENTS

| | | | |
|---|---|---|---|
| 6,219,469 B1 | 4/2001 | Minakata et al. | |
| 6,411,747 B2 | 6/2002 | Rangaraj | |
| 6,556,727 B2 | 4/2003 | Minakata et al. | |

(Continued)

FOREIGN PATENT DOCUMENTS

JP    63-005306    1/1988

(Continued)

OTHER PUBLICATIONS

Office Action issued by the Japanese Patent Office, mailed Nov. 24, 2009, for corresponding Japanese Patent Application No. 2005-272624 with English translation.

(Continued)

*Primary Examiner* — Ken N Vanderpuye
*Assistant Examiner* — Hibret A Woldekidan
(74) *Attorney, Agent, or Firm* — Myers Wolin, LLC

(57) ABSTRACT

There is provided an optical modulator capable of controlling the phase of a USB signal and the phase of an LSB signal of an optical FSK modulated signal. A modulation signal is applied to a main Mach-Zehnder electrode (or an electrode C) (11) of a main Mach-Zehnder waveguide (MZC) (8) to switch the USB signal and the LSB signal, and so FSK modulation can be made. In order to control the phase of the optical signal to be outputted from the main Mach-Zehnder waveguide (MZC) (8), bias voltage is applied to the main Mach-Zehnder electrode (11), and the phases of the USB signal and the LSB signal are controlled. By doing so, FSK modulation with adjusted phases can be performed.

13 Claims, 31 Drawing Sheets

U.S. PATENT DOCUMENTS

| | | | |
|---|---|---|---|
| 6,674,565 B2 | 1/2004 | Kondo et al. | |
| 7,224,506 B2 * | 5/2007 | Kim et al. | 359/276 |
| 7,239,763 B2 * | 7/2007 | Kawanishi et al. | 385/1 |
| 7,245,787 B2 * | 7/2007 | Kawanishi et al. | 385/1 |
| 7,302,120 B2 * | 11/2007 | Sakane et al. | 385/3 |
| 7,711,215 B2 * | 5/2010 | Kawanishi et al. | 385/3 |
| 7,853,153 B2 * | 12/2010 | Kawanishi et al. | 398/183 |
| 2002/0080454 A1 * | 6/2002 | Schemmann et al. | 359/181 |
| 2002/0154378 A1 | 10/2002 | Kawanishi et al. | |
| 2005/0110981 A1 * | 5/2005 | Hayashi et al. | 356/73.1 |
| 2005/0174357 A1 * | 8/2005 | Wang | 345/581 |
| 2005/0175357 A1 | 8/2005 | Kawanishi et al. | |
| 2005/0180261 A1 * | 8/2005 | Mandal | 367/31 |
| 2007/0019968 A1 * | 1/2007 | Hashimoto et al. | 398/198 |
| 2007/0122161 A1 * | 5/2007 | Charlet et al. | 398/188 |

FOREIGN PATENT DOCUMENTS

| | | |
|---|---|---|
| JP | 63-13017 | 1/1988 |
| JP | 63-013017 | 1/1988 |
| JP | 07-106953 | 4/1995 |
| JP | 08-79174 | 3/1996 |
| JP | 08-111613 | 4/1996 |
| JP | 63-005306 | 1/1998 |
| JP | AS63-13017 | 1/1998 |
| JP | 10-142569 | 5/1998 |
| JP | AH10-133159 | 5/1998 |
| JP | AH11-295674 | 10/1999 |
| JP | 2000-267056 | 9/2000 |
| JP | 2000-352699 | 12/2000 |
| JP | 2002-033655 | 1/2002 |
| JP | A 2002-40381 | 2/2002 |
| JP | A 2002-169133 | 6/2002 |
| JP | 2002-268025 | 9/2002 |
| JP | 2004-252386 | 9/2004 |
| JP | 2004-302238 | 10/2004 |
| JP | 2004-318052 | 11/2004 |
| JP | 2005-215196 | 8/2005 |
| JP | A2005-210537 | 8/2005 |

OTHER PUBLICATIONS

Kawanishi et. al. "Simultaneous Optical Modulation of FSK and IM" The Institute of Electronics, Information and Communication Engineers, Aug. 20, 2004, vol. 104, No. 268 (OPE2004-130), pp. 41-46.

Kawanishi et. al. "Ultra High Extinction Ratio Intensity Modulation Using Optical FSK Modulator" The Institute of Electronics, Information and Communication Engineers, Aug. 19, 2005, vol. 105, No. 243 (OCS2005 35-45), pp. 41-44.

Sakamoto et. al. "Novel Control Method for Externally Modulated Optical Minimum-Shift Keying" The Institute of Electronics, Information and Communication Engineers, Aug. 19, 2005, vol. 105, No. 243 (OCS2005 35-45), pp. 45-50.

Supplementary European Search Report for the corresponding application EP 06 79 8089, Date of completion of the search: Dec. 29, 2008.

Kawanishi, T. et al., "Optical frequency shifter with SSB modulator", Technical Report of IEICE, OCS2002-49, PS2002-33, OFT2002-30 (Aug. 2002).

Kawanishi, T. et al., "Optical FSK modulator using an integrated light wave circuit consisting of four optical phase modulator", CPT 2004 G2, Tokyo Japan, Jan. 14-16, 2004.

Kawanishi, T., et al., "Resonant-type Optical Modulator with Planar Structures", Technical Report of IEICE, LQE2001-3 (May 2001).

Nishihara, et al., "Optical integrated Circuits" (revised and updated edition), Ohmsha, pp. 119-120.

Sakamoto, T., et al., "Novel modulation scheme for optical continuous-phase frequency-shift keying", OFC 2005, Technical Digest, vol. 5, Mar. 2005, vol. 6.

Shimotsu, S., et al., "LiNb03 Optical Single-Sideband Modulator" OFC 2000, PD-16.

Kawanishi, t., et al., "Simultaneous optical modulation of FSK and IM," Technical report of IEICE, EMD2004-47, CPM2004-73, 0PE2004-130, LQE2004-45(Aug. 2004).

Kawanishi, T., et al., "Ultra high extinction ratio intensity modulation using optical FSK modulator," IEICE Technical Report OCS2005-42(Aug. 2005).

Sakamoto, T., et al., "Novel Control Method for Externally Modulated Optical Minimum-Shift Keying," IEICE Technical Report, OCS 2005-43 (Aug. 2005).

Kawanishi, T., et al., "High-speed optical FSK modulator for optical packet labeling," Journal of Lightwave Technology, vol. 23, No. 1, Jan. 2005, p. 87-94.

International Preliminary Report on Patentability of PCT/JP2006/318478 issued Sep. 9, 2008.

Notice of Reasons for Rejection issued by the Japan Patent Office mailed Nov. 24, 2009, for corresponding. Japanese Patent Application No. 2005-242516.

Non-Final Office Action issued by the USPTO on Oct. 8, 2010, in co-pending U.S. Appl. No. 12/064,631.

\* cited by examiner

Fig. 10
Fig.10(A)
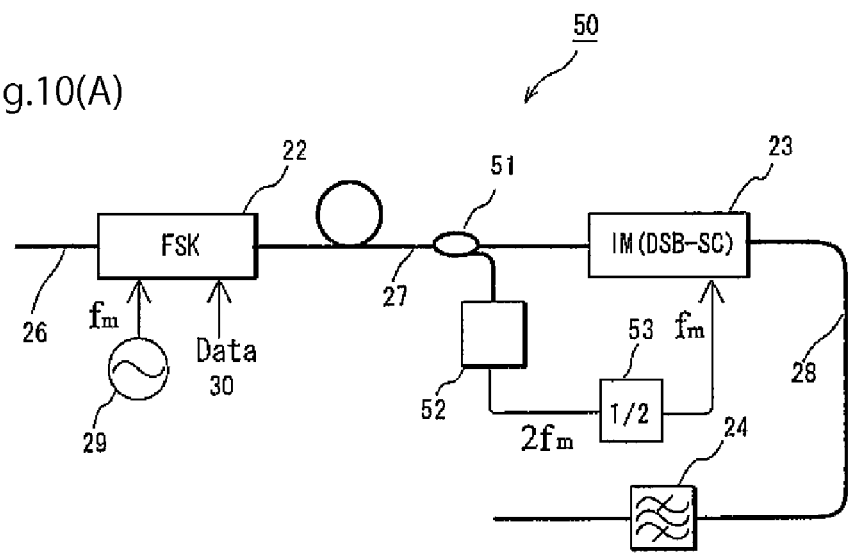
Fig.10(B)
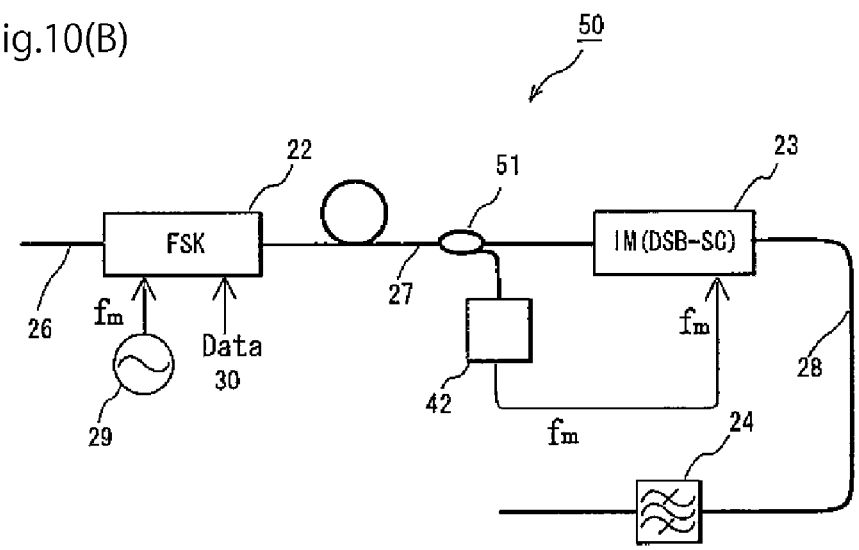

Fig. 11
Fig.11(A)
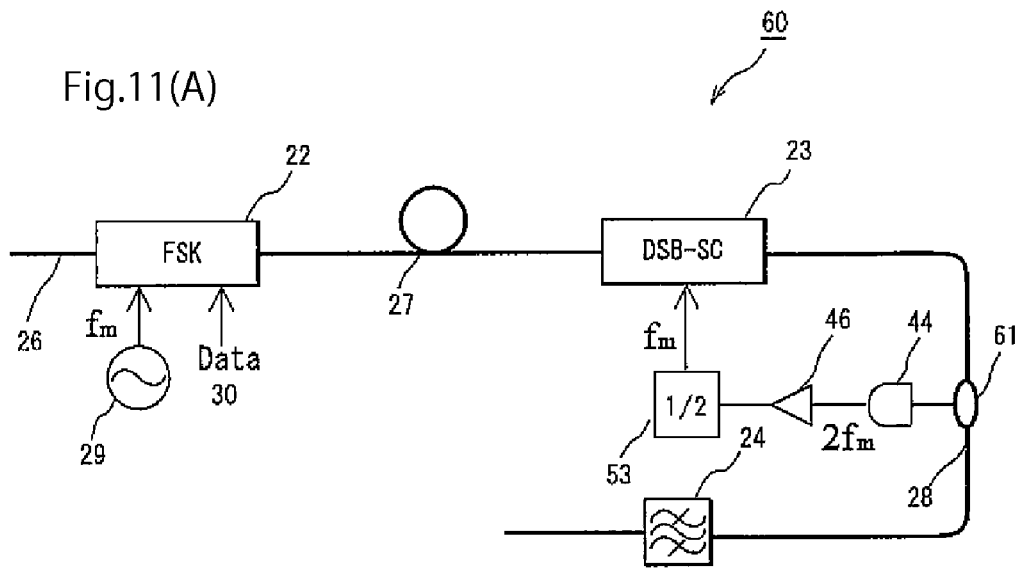
Fig.11(B)
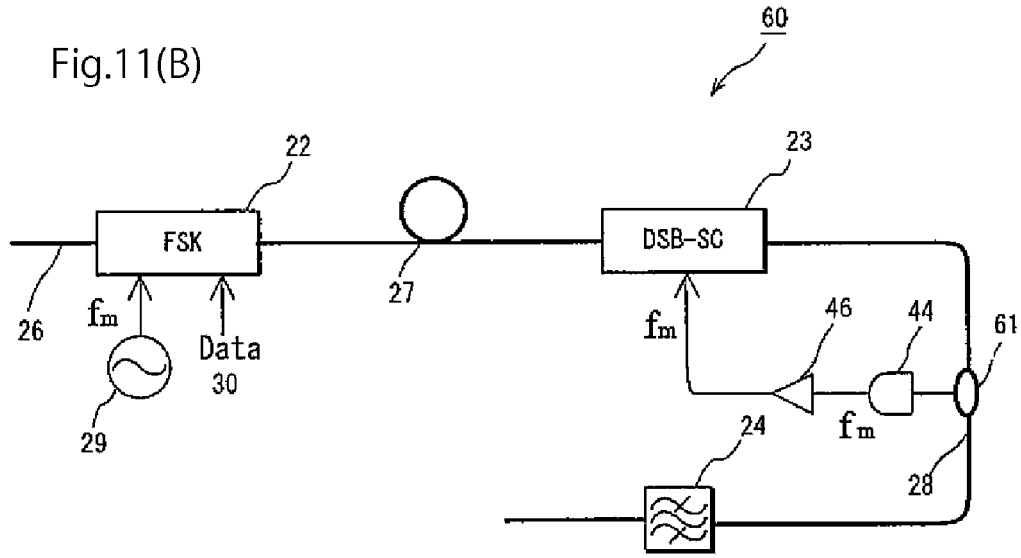

Fig. 14
Fig.14(A)
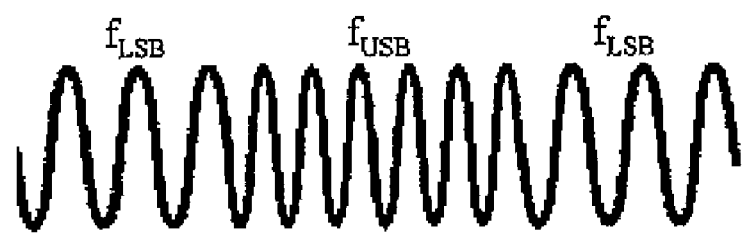
Fig.14(B)
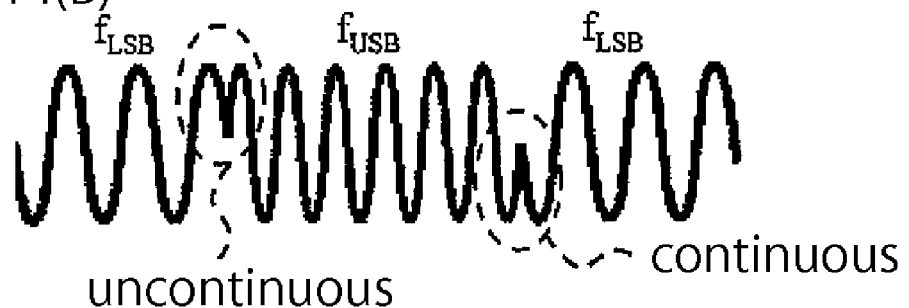

Fig. 16
Fig.16(A)
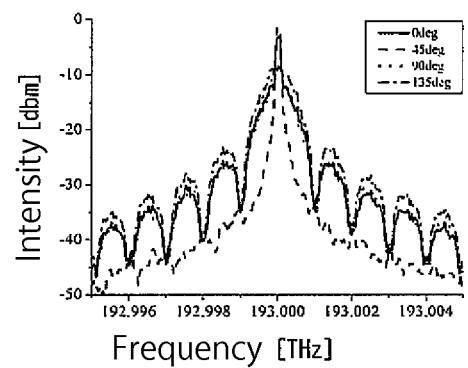
Fig.16(B)
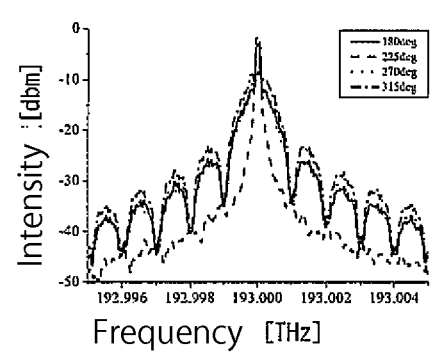

Fig. 17
Fig.17(A)
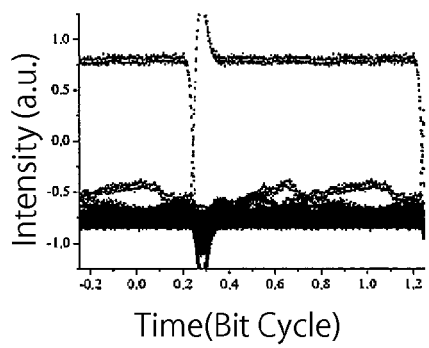
Time(Bit Cycle)
Fig.17(B)
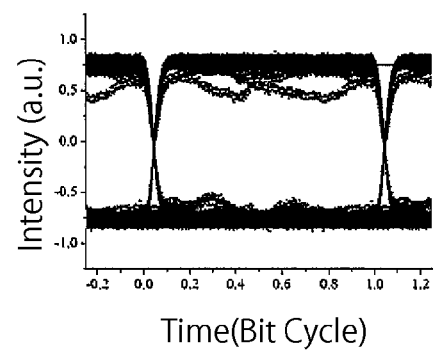
Time(Bit Cycle)

Fig. 19
Fig. 19(A)
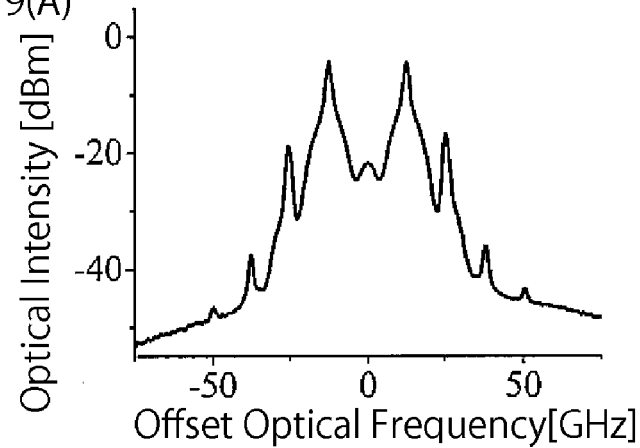
Fig. 19(B)
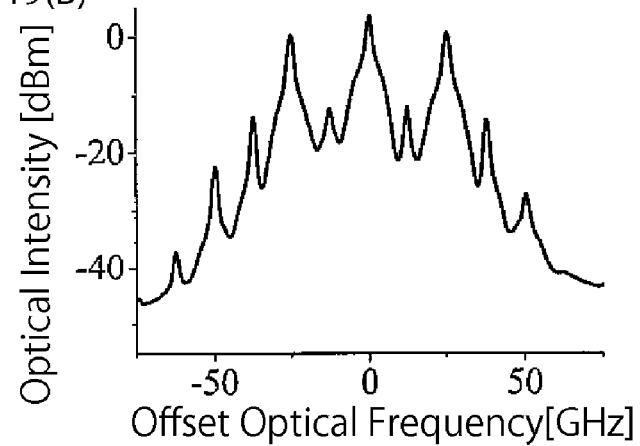
Fig. 19(C)
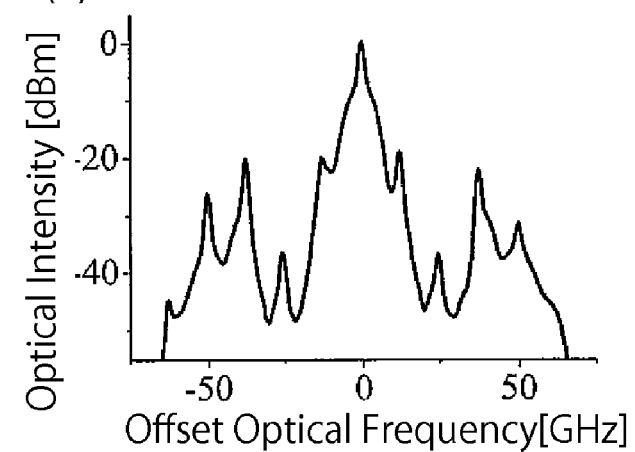

Fig. 20
Fig.20(A)
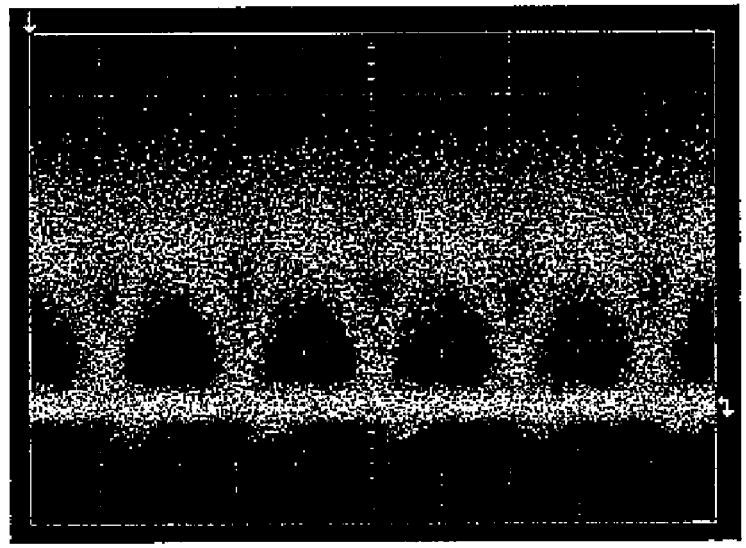
Fig.20(B)
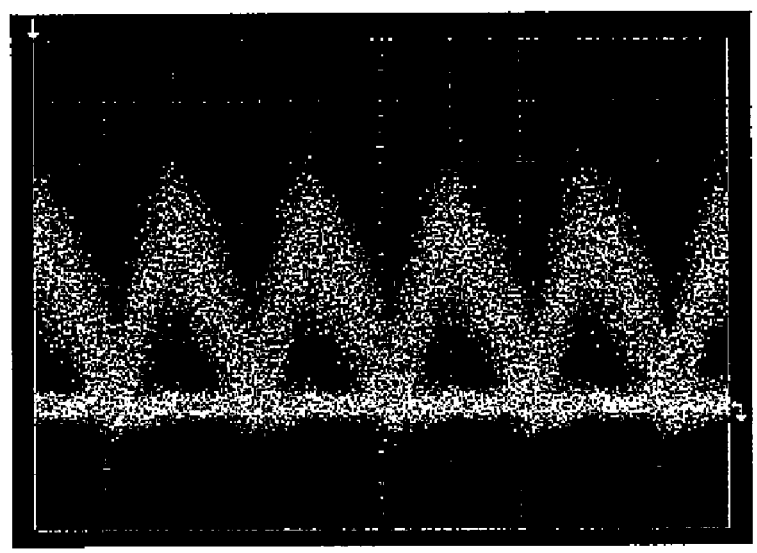

Fig. 27
Fig. 27(A)
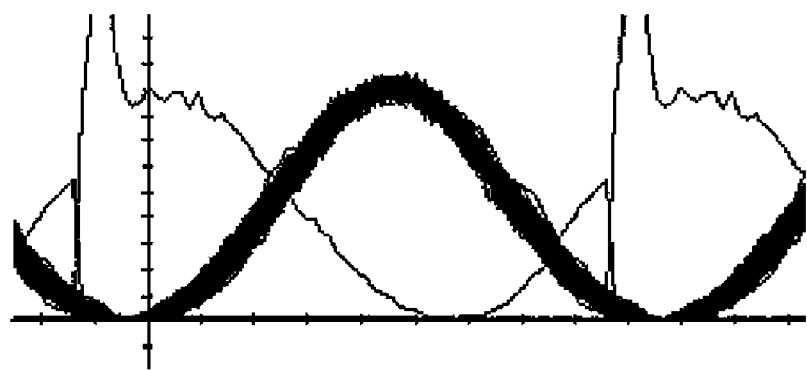
Fig. 27(B)
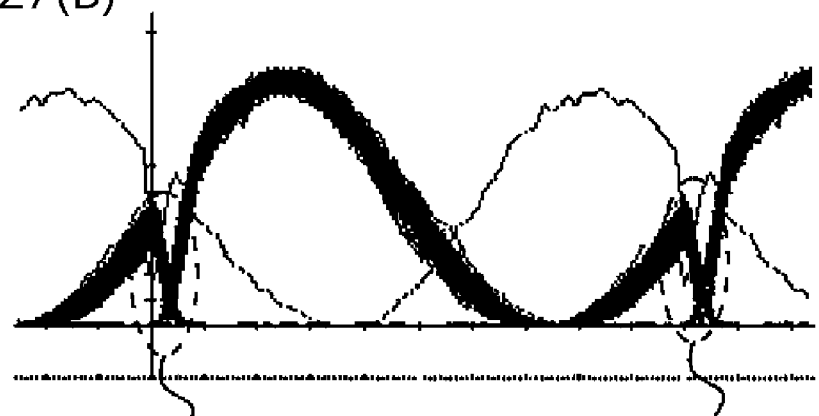
uncontinuous    uncontinuous Fig. 28
Fig.28(A)
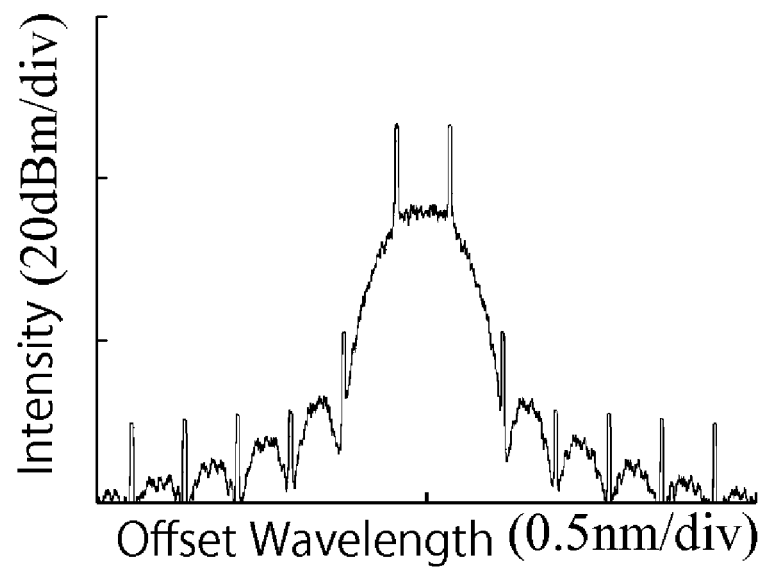
Fig.28(B)
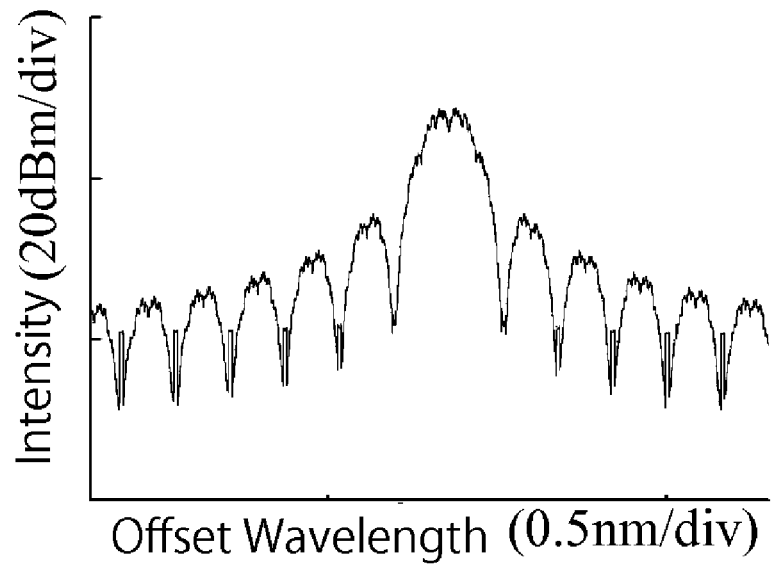

Fig. 29
Fig.29(A)
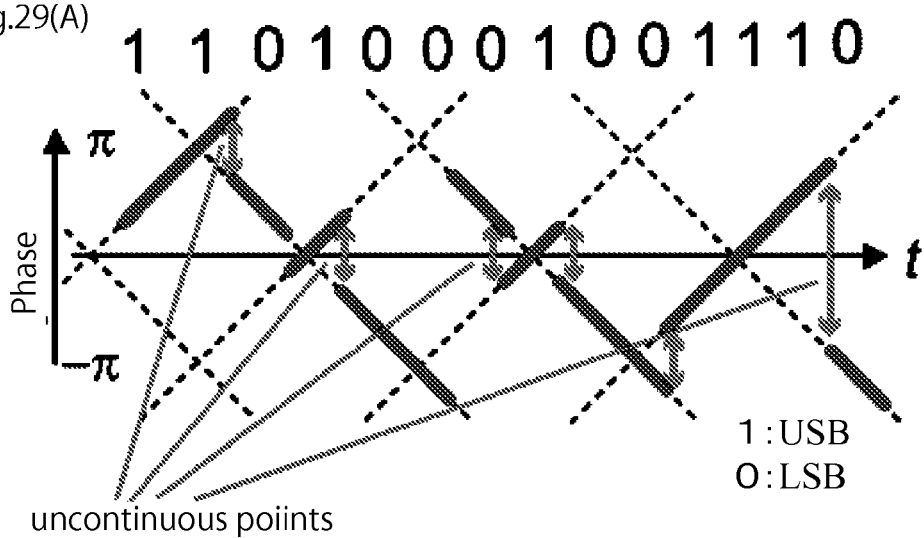
Fig.29(B)
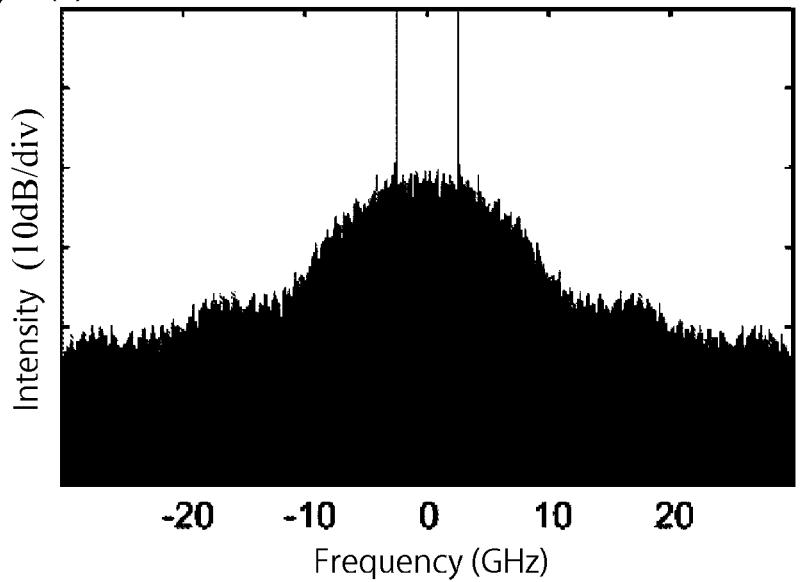

Fig. 30
Fig.30(A)
Fig.30(B)
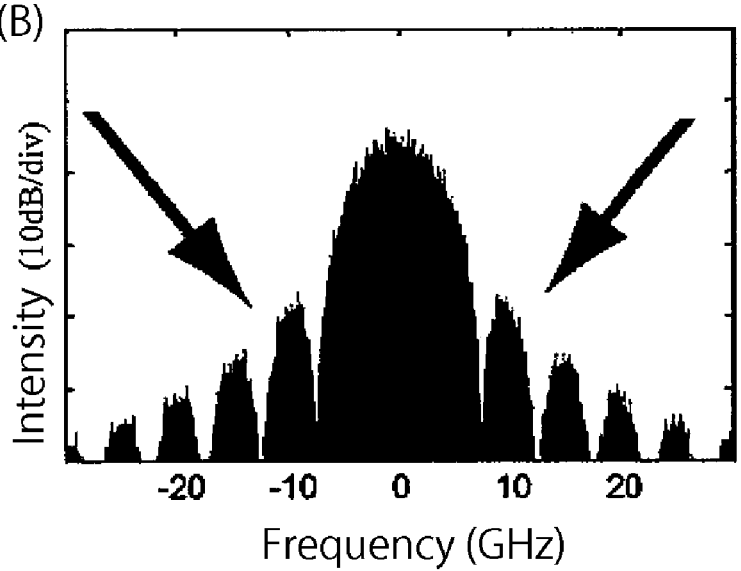

Fig. 31
Fig.31(A)
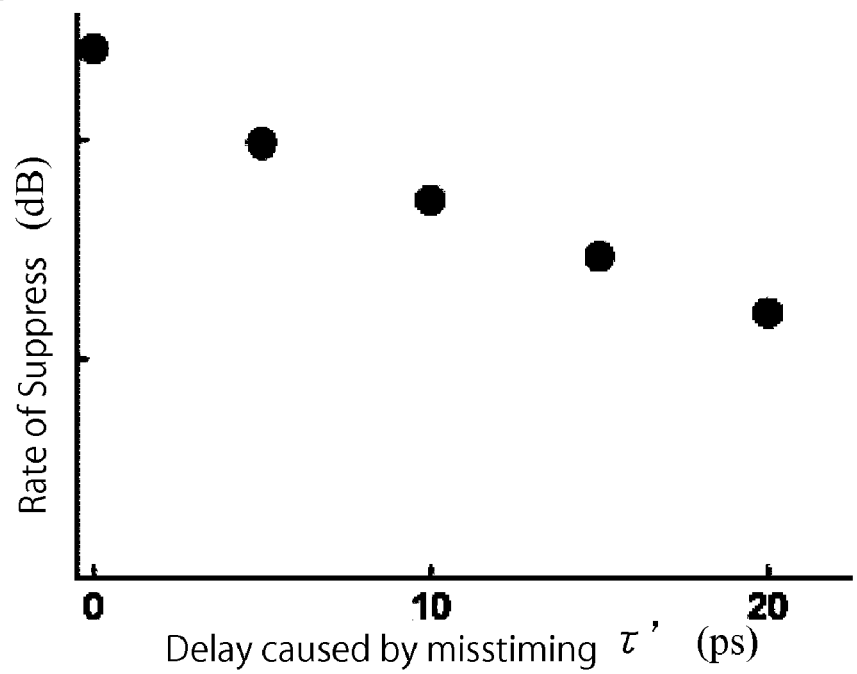
Fig.31(B)
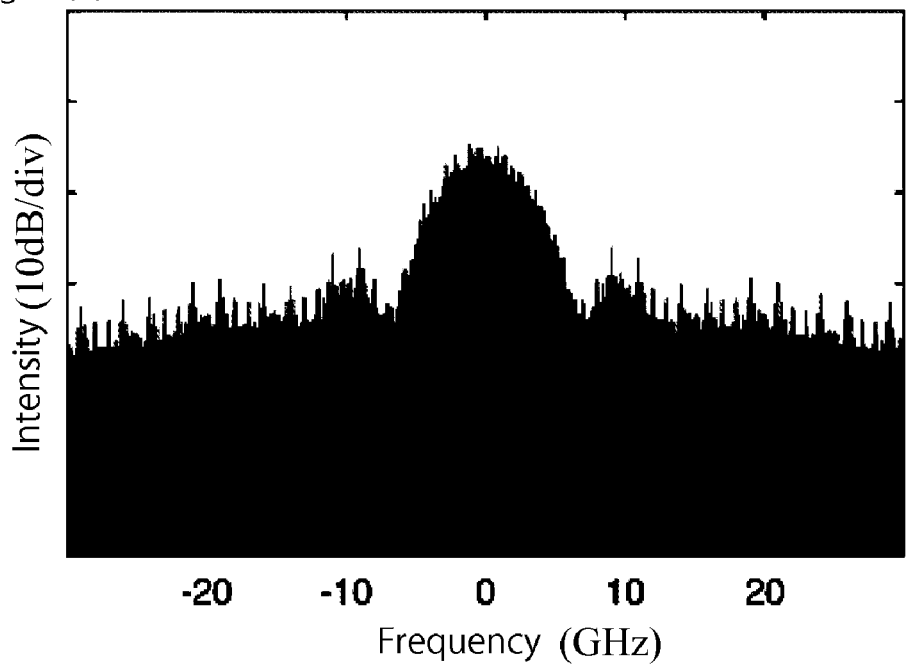

PHASE CONTROL OPTICAL FSK MODULATOR

CROSS REFERENCE TO RELATED APPLICATIONS

The present disclosure is a national phase filing under 35 U.S.C. §371 of International Patent Application No. PCT/JP2006/318478, filed Sep. 19, 2006, which claims priority to Japanese Patent Application No. 2005-272624, filed Sep. 20, 2005, the disclosures of which are expressly incorporated herein by reference in its entireties.

BACKGROUND OF THE INVENTION

1. Field of the Invention

The present invention relates to an optical modulator controlling the phase of an optical signal, and the like. In particular, the present invention relates to an optical modulator and the like which is used for FSK-PSK modulation by controlling the phase of an optical FSK modulation signal.

2. Description of the Related Art

In optical communication, light must be modulated to have signals. As optical modulations, direct modulation and external modulation are known. The direct modulation modulates a driving power of semiconductor laser. And the external modulation modulates light from semiconductor laser by means other than a light source. A modulator used in external modulation is generally referred to an optical modulator. The optical modulator modulates optical intensity, phase, etc. by causing physical changes in the optical modulator based on signals. As technical problems of the optical modulator, there exist reduction of driving voltage, realization of a higher extinction ratio for improving modulation efficiency, widening a bandwidth, and improvement of high light utilization efficiency for speeding up and loss reduction of a modulation. In other words, development of a modulator having high extinction ratio is desired. It is to be noted that the extinction ratio is a ratio of optical intensity between the highest level and the lowest level.

As an example which shifts a frequency of an optical signal to be outputted, there is an optical signal side-band (optical SSB) modulator [Tetsuya Kawanishi and Masayuki Izutsu, "Optical frequency shifter using optical SSB modulator", TECHNICAL REPORT OF IEICE, OCS2002-49, PS2002-33, OFT2002-30 (2002-08)].

An optical FSK modulator which is a modification of an optical SSB modulator is also known [Tetsuya Kawanishi and Masayuki Izutsu, "Optical FSK modulator using an integrated light wave circuit consisting of four optical phase modulator", CPT 2004G-2, Tokyo, Japan, 14-16 Jan. 2004] [Tetsuya Kawanishi, et al. "Analysis and application of FSK/IM simultaneous modulation" Tech. Rep. of IEICE. EMD 2004-47, CPM 2004-73, OPE 2004-130, LQE 2004-45 (2004-08), pp. 41-46].

In the optical FSK modulator, when a modulation signal applied to a sub Mach-Zehnder waveguide is represented by $f_m$ [Hz], an upper side band (USB) signal ($f_0+f_m$) or a lower side band (LSB) signal ($f_0+f_m$) is used as frequency shift information. This is why the phases of the USB signal and the LSB signal are not considered, and a phase difference between the USB signal and the LSB signal exists. But in an FSK-PSK modulation, since phase information is added to an optical FSK signal, the phase difference between the USB signal and the LSB signal is a problem. If the phase difference between the USB signal and the LSB signal of the FSK modulator is able to be controlled, various uses thereof are expected.

This invention is made to provide an optical modulator capable of controlling the optical phase of various kinds of output signals to be, for example, 0 degree or 180 degrees. This invention, by controlling the phase difference of an USB signal and an LSB signal of an optical FSK modulator, is also made to provides embodiments of optical FSK modulation system which have not been considered in the prior art.

This invention is also made to provide an optical FSK modulator capable of controlling the phase of an USB signal and the phase of an LSB signal of an optical FSK modulation signal.

This invention is also made to provide an FSK-PSK modulation system.

SUMMARY OF THE INVENTION

The system of the present invention basically has a pair of third electrodes. And the system of the present invention basically comprises an output signal phase adjusting part. The output signal phase adjusting part adjusts a phase difference between the upper side band (USB) signal and the lower side band (LSB) signal by, for example, modulating the phase of an optical signal propagating through each waveguide. Since the upper side band (USB) signal and the lower side band (LSB) signal of the FSK signal, thus obtained, for example have the same phase, the FSK signal is able to have phase shift keying information. Therefore, an FSK modulator which is able to be used for FSK-PSK modulation and the like can be obtained.

The optical frequency shift keying modulation system according to the first aspect of the present invention comprises: a first sub Mach-Zehnder waveguide ($MZ_A$) (2); a second sub Mach-Zehnder waveguide ($MZ_B$) (3); a main Mach-Zehnder waveguide ($MZ_C$) (8) comprising an input part (4) of an optical signal, a branching part (5) which is configured to be connected to the input part, and is connected to the $MZ_A$ and the $MZ_B$, and the optical signal is branched at the branching part into the $MZ_A$ and the $MZ_B$; the first sub Mach-Zehnder waveguide ($MZ_A$); the second sub Mach-Zehnder waveguide ($MZ_B$); a combining part (6) which is connected to the $MZ_A$ and the $MZ_B$, and the optical signal outputted from the $MZ_A$ and the $MZ_B$ is combined at the combining part; an output part (7) outputting the optical signal combined at the combining part; a first electrode (electrode A) (9) of the first sub Mach-Zehnder waveguide ($MZ_A$); a second electrode (electrode B) (10) of the second sub Mach-Zehnder waveguide ($MZ_B$); a third electrode (electrode C) (11) of the main Mach-Zehnder waveguide ($MZ_C$); a signal source (12) for applying either one or both of a modulation signal and bias voltage to the first electrode (9), the second electrode (10) and the third electrode (11); and an output signal phase adjusting part for adjusting a phase difference between an upper side band signal and a lower side band signal which are outputted from the output part (7).

As above described, the output signal phase adjusting part, which adjusts the phase difference between the upper side band signal and the lower side band signal outputted from the output part (7), is provided to an FSK modulation system. Thus, the system is able to adjust the USB signal and the LSB signal of the FSK signal to have, for example, the same phase. Therefore, this FSK modulation system can be used as an optical modulator for FSK-PSK modulation and the like.

A preferable embodiment of the optical frequency shift keying modulation system according to the first aspect of the present invention is, for example, the above described optical frequency shift keying modulation system wherein the third electrode (electrode C) (11) comprises either one or both of: an electrode (electrode $MZ_{CA}$) (11a) which is provided along a waveguide portion between a combining part of the first sub Mach-Zehnder waveguide ($MZ_A$) (2) and the combining part (6) of the main Mach-Zehnder waveguide ($MZ_C$) (8); and an electrode (electrode $MZ_{CB}$) (11b) which is provided along a waveguide portion between a combining part of the second sub Mach-Zehnder waveguide ($MZ_B$) (3) and the combining part (6) of the main Mach-Zehnder waveguide ($MZ_C$) (8), and wherein the output signal phase adjusting part adjusts the phase difference between the upper side band signal and the lower side band signal outputted from the output part (7), and the phase difference is adjusted by controlling voltage applied to either one or both of the electrode $MZ_{CA}$ (11a) and the electrode $MZ_{CB}$ (11b), and the voltage is controlled by the output signal phase adjusting part.

The optical frequency shift keying modulation system having this arrangement is able to perform phase modulation on an optical frequency shift keying modulation signal with ease. It is also able to remove phase modulation information with ease. In order to perform optical PSK modulation on an optical FSK modulation signal, in general, an optical FSK modulator and an optical PSK modulator (a phase modulator) are used. In particular, a USB signal and an LSB signal outputted from the optical FSK modulator are adjusted to have the same phase. And then, a phase modulator, having synchronized with the FSK signals, performs phase modulation on the FSK signals. This enables to make an FSK modulation signal have phase modulation information.

When a phase of a baseband signal applied to the $MZ_{CA}$ electrode is represented by $\phi_{MZCA}$, and a phase of a baseband signal applied to the $MZ_{CB}$ electrode is $\phi_{MZCB}$, the optical frequency shift keying modulation system of the present invention which have the above arrangement performs a frequency modulation on a term corresponding to $\phi_{MZCA} - \phi_{MZCB}$, and performs a phase modulation on a term corresponding to $\phi_{MZCA} + \phi_{MZCB}$. Therefore, by adjusting the level of $\phi_{MZCA} - \phi_{MZCB}$ and $\phi_{MZCA} + \phi_{MZCB}$, a phase controller switches an USB signal and an LSB signal, and further performs a phase modulation on these signals. Thus, various modulations are performed by one optical modulator. For example, it is able to add an optical PSK signal on an optical FSK modulation signal. It is also able to convert an optical FSK modulation signal to an optical PSK signal. And it is also able to remove an optical PSK signal from an optical FSK modulation signal having an optical PSK signal.

The PSK modulation is performed, for example, by adjusting phase difference between the USB signal and the LSB signal of the FSK signal to become 180 degree. This means phase is reversed (in other words, $\phi_{MZCA} + \phi_{MZCB}$ becomes $\pi + 2n\pi$). In case a PSK modulated optical signal is inputted to the above optical frequency shift keying modulation system, if the phase difference between the USB signal and the LSB signal of the FSK signal is adjusted to become 180 degrees, in other words the phases of the USB signal and the LSB signal are adjusted to be reversed, the phase difference between the USB signal and the LSB signal disappears, thereby removing PSK modulation. This corresponds to what is called a label peel. An optical signal whose label is peeled off is modulated, and a new label (modulation signal) can be added to the optical signal.

The $MZ_{CA}$ electrode or the $MZ_{CB}$ electrode forms an electric field to a waveguide adjacent to the electrode to which voltage is applied, and each of the $MZ_{CA}$ electrode and the $MZ_{CB}$ electrode acts as a phase modulator. Since these electrodes can modulate phase of an optical signal propagating through the waveguides, a USB signal and an LSB signal of an FSK signal, for example, can be adjusted to have the same phase.

It is to be noted that since the $MZ_{CA}$ electrode and the $MZ_{CB}$ electrode are provided as the third electrode (in other words, there are two main Mach-Zehnder electrodes (electrode C)), components to be suppressed (e.g. a carrier, the second order component, the third order component) can be effectively suppressed by controlling the phases of components to be suppressed to be reversed.

A preferable embodiment of the present invention is as follows. A photodetector detects an output signal of the optical FSK modulation system. A control part receives the output signal detected by the photodetector. The control part analyzes a phase difference between a USB signal and an LSB signal contained in the output signal received. And then, the control part applies bias voltage to the $MZ_{CA}$ electrode or the $MZ_{CB}$ electrode so as to reduce the phase difference.

The other preferable embodiment of the optical frequency shift keying modulation system according to the first aspect of the present invention is one of the above described optical frequency shift keying modulation system, wherein the output signal phase adjusting part comprises a phase modulator which is provided on between the combining part (6) of the main Mach-Zehnder waveguide ($MZ_C$) (8) and the output part (7).

This optical FSK modulation system, for example, is able to adjust a USB signal and an LSB signal to have the same phase, by performing phase modulation on one of the USB signal or the LSB signal when an optical signal propagates the output signal phase adjusting part. In particular, a modulation signal including a signal from the signal source which adds information to a signal is applied to the phase modulator of the output signal phase adjusting part. And when the modulation signal is 0 or 1 (in other words, a USB signal or an LSB signal), a predetermined voltage will be applied to the phase modulator. Concretely speaking, a voltage signal which shifts a phase by 180 degrees is applied to the phase modulator.

An optical FSK modulation system according to the second aspect of the present invention is based on the following idea.

The optical FSK modulation system comprises an intensity modulator which is basically provided on a waveguide portion of the main Mach-Zehnder waveguide ($MZ_C$) between the combining part of the first sub Mach-Zehnder waveguide ($MZ_A$) and the combining part (6) of the main Mach-Zehnder waveguide ($MZ_C$), and is for modulating intensity of an optical signal propagating through the waveguide portion. Since components to be suppressed (a carrier component ($f_0$) and a high order component (e.g. a second order component ($f_0 \pm 2f_m$))) of output signals from each sub Mach-Zehnder waveguide are adjusted to have the same signal intensity level, the components to be suppressed (since the phases are reversed) are effectively suppressed when optical signals from each sub Mach-Zehnder waveguide are combined at the combining part (6).

In particular, the optical FSK modulation system according to the second aspect of the present invention is an optical modulator which comprises an intensity modulator which is provided on a waveguide portion of the main Mach-Zehnder waveguide ($MZ_C$) between the combining part of the first sub Mach-Zehnder waveguide ($MZ_A$) and the combining part (6) of the main Mach-Zehnder waveguide ($MZ_C$), and the optical modulator modulates intensity of an optical signal propagating through the waveguide portion.

Since the optical FSK modulation system according to the second aspect of the present invention has the above arrangement, in addition to the benefit of the optical FSK modulation system according to the first aspect of the present invention, it can adjust components to be suppressed (a carrier component ($f_0$) and a high order component (e.g. a second order component ($f_0 \pm 2f_m$))) of output signals from each sub Mach-Zehnder waveguide to have the same signal intensity level. Therefore, the optical FSK modulation system according to the second aspect of the present invention is able to effectively suppressed components to be suppressed when optical signals from each sub Mach-Zehnder waveguide are combined at the combining part (6).

The other preferable embodiment of the present invention is an optical FSK modulation system comprising an intensity modulator which reduces an intensity of a transient signal (i.e., a signal outputted from the main Mach-Zehnder waveguide which is generated in a transient period) by performing intensity modulation.

In particular, an output signal from the main Mach-Zehnder waveguide is controlled so as to reduce the intensity of the output signal at a timing corresponding to a transient period of the USB signal and the LSB signal. This is realized by synchronizing a control signal of the control part with the modulation signals of the intensity modulator and each Mach-Zehnder waveguide. Thus, transient signals can be suppressed, and preferable FSK modulation signals can be obtained. In other words, the optical FSK modulation system according to the above embodiment properly controls phase difference and suppresses transient signals. Therefore, desirable FSK modulation signals can be obtained.

An intensity modulation also may be performed so as to suppress the USB signal and the LSB signal. In this case, the whole system outputs transient signals, but the transient signals is detected by a photodetector and UWB signals can be obtained.

An optical FSK modulation system according to the third aspect of the present invention is basically based on the following idea.

By providing a bias voltage control part for applying bias voltage to each bias electrode to an optical modulator, the most appropriate bias voltage level and a preferable operating environment can be obtained even though the optical modulator is in operation.

An optical modulation system according to the third aspect of the present invention further comprises: a first bias adjusting means for adjusting bias voltage applied to the electrode A and the electrode B so as to maximize an intensity of the optical signal outputted from the main Mach-Zehnder waveguide; and a second bias adjusting means for adjusting bias voltage applied to the electrode C, wherein the bias voltage is adjusted so that, assuming the intensity of the optical signal is Max, an intensity of the optical signal is in between 40% to 60%, both inclusive, of the Max (preferably half of the Max), while the bias voltage applied to the electrode A and the electrode B is kept to be the same level as the one obtained in the first bias adjusting means.

Since the optical modulation system according to the third aspect of the present invention has the above arrangement, in addition to the benefit of the optical FSK modulation system according to the first aspect of the present invention, a bias voltage controlling part (13), as each bias adjusting means, adjusts bias voltage applied to the each electrode from the signal source while receiving information from a photodetector which detects optical signals outputted from each sub Mach-Zehnder waveguide. Therefore, the optical modulation system is able to adjust bias voltage level to the most preferable level automatically.

The other preferable embodiment of the optical modulation system according to the third aspect of the present invention relates to the above described optical modulation system which further comprises a third bias adjusting means, instead of the second bias adjusting means. The third bias adjusting means applies a dithering signal as a bias voltage to the main Mach-Zehnder electrode, while the bias voltage applied to the sub Mach-Zehnder waveguide is kept to be the same level as the one obtained in the first bias adjusting means. The third bias adjusting means adjusts bias voltage of the main Mach-Zehnder electrode so that an output of a dithering signal component is maximized.

An optical modulation system according to the fourth aspect of the present invention is one of the above described optical frequency shift keying modulation systems wherein the third electrode (electrode C) (11) comprises either one of: an electrode (electrode $MZ_{CA}$) (11a) which is provided along a waveguide portion between the combining part of the first sub Mach-Zehnder waveguide ($MZ_A$) (2) and the combining part (6) of the main Mach-Zehnder waveguide ($MZ_C$) (8), and an electrode (electrode $MZ_{CB}$) (11b) which is provided along a waveguide portion between the combining part of the second sub Mach-Zehnder waveguide ($MZ_B$) (3) and the combining part (6) of the main Mach-Zehnder waveguide ($MZ_C$) (8). And the output signal phase adjusting part adjusts the phase difference between the upper side band signal and the lower side band signal outputted from the output part (7) by controlling voltage applied to either one of the electrode $MZ_{CA}$ (11a) and the electrode $MZ_{CB}$ (11b). And the voltage is controlled by the output signal phase adjusting part.

In this embodiment of the optical frequency shift keying modulation system, the third electrode is provided along one sub Mach-Zehnder waveguide in order to particularly apply voltage to one sub Mach-Zehnder waveguide.

An Optical Modulation System According to the Fifth Aspect of the Present Invention An optical modulation system according to the fifth aspect of the present invention is basically based on the following idea.

An intensity modulator such as an optical DSB-SC modulator whose modulation signal is a modulation signal frequency of an optical FSK modulator modulates an optical FSK signal from an optical FSK modulator. And a bandpass filter extracts a predetermined optical signal. Since the optical signal has components related to phase information of the optical signal, an optical PSK signal can be obtained. And since the optical FSK modulation system of the present invention is used as an optical FSK modulator, FSK modulation signals with little phase difference (preferably no phase difference between a USB signal and an LSB signal) can be obtained. Thus, preferable PSK signals can be obtained.

In case the optical FSK signal is converted to the optical PSK signal as above explained, an electric signal which has a modulation frequency of the optical FSK modulation signal is applied to the optical DSB-SC modulator. In general, an optical FSK modulator on the side of an encoder and an optical DSB-SC modulator on the side of a decoder are set far away from each other. It is hence difficult for one signal source to apply modulation signals to both of these modulators. The optical modulation system according to the fifth aspect of the present invention has a synchronization means. The optical modulation system, by using the synchronization means, is able to obtain an electric signal which has a modulation frequency of the optical FSK modulation signal. By applying this signal to a phase modulator such as an optical DSB-SC modulator, an optical PSK signal can be properly obtained even when the modulation signal of the optical FSK modulator is adjusted.

The optical modulation system according to the fifth aspect of the present invention, in particular, comprises: one of the optical frequency shift keying modulation systems above described acting as an optical frequency shift keying (FSK) modulator; an intensity modulator wherein a modulation signal is inputted from the optical frequency shift keying (FSK) modulator; and a bandpass filter for extracting predetermined frequency components from output light of the intensity modulator. And the optical modulation system adjusts frequencies so that a half of a frequency difference between the upper side band (USB) signal and the lower side band (LSB) signal of output light from the FSK modulator becomes equal to a modulation frequency of the intensity modulator.

Since the optical modulation system according to the fifth aspect of the present invention has the above arrangement, an optical FSK modulation signal can be converted to an optical phase shift keying modulation signal.

An optical modulation system according to the sixth aspect of the present invention is based on the following idea.

Transient signals which are generated when a USB signal and an LSB signal is switched can be adjusted by controlling a phase difference between the USB signal and the LSB signal. And by suppressing components corresponding to the USB signal and the LSB signal by an optical intensity modulator, and by extracting transient signals, preferable UWB signals can be obtained.

The optical modulation system according to the sixth aspect of the present invention, in particular, relates to an UWB signal generating system. The UWB signal generating system comprises an optical intensity modulator which modulates intensity of laser light and one of the above described optical frequency shift keying modulation systems to which output light from the optical intensity modulator is inputted. The UWB signal generating system may comprise one of the above described optical frequency shift keying modulation systems and an optical intensity modulator which modulates intensity of an output signal from the system.

It is to be noted that in the optical modulation system according to the sixth aspect of the present invention, the FSK modulation system is preferably synchronized with the optical intensity modulator. And the system has a control part for suppressing the FSK signal. Since the system has this control part, modulation signals are adjusted, and FSK modulation and optical intensity modulation are performed on the adjusted signal. Thus, UWB signals can effectively be obtained.

An optical modulation system according to the seventh aspect of the present invention realizes CPFSK modulation having any shift amount and modulation degree basically by the following way.

A modulator having the same arrangement as a technically established optical SSB modulator and optical FSK modulator performs continuous phase FSK modulation by controlling phase difference $\Delta\phi$ between a sinusoidal clock signal and a baseband signal. And a phase of input light inputted to the modulator is controlled.

In particular, the optical modulation system according to the seventh aspect of the present invention is based on the following idea.

If the above described phase difference $\Delta\phi$ is, for example, represented by $\pi/4+n\pi$ (n is integer), the USB signal and the LSB signal have continuous phase. And by controlling the phase of the input light being synchronized with the baseband signal, a phase gap, generated in the optical FSK modulator when the baseband signal is switched (switch over between the USB signal and the LSB signal), can be compensated. Thus, an optical FSK signal with continuous phase having any shift amount and modulation degree can be obtained.

In other words, even if the phase difference $\Delta\phi$ between the sinusoidal clock signal and the baseband signal is controlled to be, for example, $\pi/4+n\pi$ (n is integer), a phase gap $\delta\phi$, which causes a variation in a phase difference $\Delta\phi$, is generated depending on frequency shift amount (specifically, in case of optical MSK modulation). For example, if the phase difference $\Delta\phi$ is controlled to be $\pi/4+n\pi$ (n is integer), the phase difference $\Delta\phi$ can be $\pi/4+n\pi+\delta\phi$ under certain conditions. The optical modulation system compensates this phase gap by controlling a phase of input light.

The optical modulation system according to the seventh aspect of the present invention is also able to detect optical phase information. Therefore, the USB signal and the LSB signal can be overlapped, thereby saving optical frequency band. Thus, demodulation can be properly performed even in a narrow modulation band width.

It is to be noted that an RZ-CPFSK signal can be obtained by performing intensity modulation on an optical FSK signal and by reducing the output intensity of a USB signal and an LSB signal in a transient period.

It is an object of the present invention to provide an optical modulator capable of controlling optical phases of various kinds of output signals.

It is an object of the present invention to provide an optical modulator capable of controlling phases of a USB signal and an LSB signal of an optical FSK modulation signal.

It is an object of the present invention to provide an FSK-PSK modulation system.

BRIEF DESCRIPTION OF THE DRAWINGS

FIG. 10 is a diagram showing a basic arrangement of the third embodiment of an optical modulation system according to the fifth aspect of the present invention. FIG. 10(A) shows an example that a component having frequency $2f_m$ is extracted, and the frequency of the component is halved by a frequency divider, and then the component is applied to an intensity modulator. On the other hand, FIG. 10(B) shows an example that a component having frequency $f_m$ is extracted, and then the component is applied to an intensity modulator.

FIG. 11 is a diagram showing a basic arrangement of the fourth embodiment of an optical modulation system according to the fifth aspect of the present invention. FIG. 11(A) shows an example that a component having frequency $2f_m$ is extracted, and the frequency of the component is halved by a frequency divider, and then the component is applied to an intensity modulator. On the other hand, FIG. 11(B) shows an example that a component having frequency $f_m$ is extracted, and then the component is applied to the intensity modulator.

FIG. 14 is a conceptual diagram explaining continuous phase optical frequency shift modulation. FIG. 14(A) is a conceptual diagram showing a pulse of continuous phase optical frequency shift modulation. FIG. 14(B) is a conceptual diagram showing a pulse of conventional optical frequency shift modulation.

FIG. 16 is a graph showing a simulation result of optical spectra of a BPF output when a phase difference of an FSK modulated sinusoidal signal of 25 GHz and a DSB-SC modulated sinusoidal signal of 25 GHz is shifted. FIG. 16(A) is a graph showing spectra with phase differences 0 degree, 45 degree, 90 degree, and 135 degree. FIG. 16(B) is a graph showing spectra with phase differences 180 degree, 225 degree, 270 degree, and 315 degree.

FIG. 17 is a graph showing a simulation result of a DPSK demodulation signal when a phase difference of an FSK modulated sinusoidal signal of 25 GHz and a DSB-SC modulated sinusoidal signal of 25 GHz is shifted. FIG. 17(A) is a graph showing modulation signals with phase difference 45 degree. FIG. 17(B) is a graph showing modulation signals with phase difference 135 degree.

FIG. 19 is a graph showing output signal spectra at each point in Example 2. FIG. 19(A) is a graph showing an output signal of an FSK modulator. FIG. 19(B) is a graph showing an output signal of a DSB-SC modulator. FIG. 19(C) is a graph showing a signal having passed through a bandpass filter.

FIG. 20 is oscilloscope images, in place of diagrams, showing outputs of oscilloscope. FIG. 20(A) shows an FSK signal. FIG. 20(B) shows a DPSK demodulation signal.

FIG. 27 is a graph showing a delay detection signal. FIG. 27(A) shows a continuous phase optical frequency shift keying (CPFSK) signal as a delay detection signal. FIG. 27(B) shows an optical FSK modulation signal whose phase is discontinuous (in the above example, the phase difference $\Delta\phi$ is 135 degrees) as a delay detection signal.

FIG. 28 is a graph showing a spectrum of an optical FSK signal. FIG. 28(A) shows a spectrum of a continuous phase frequency shift keying (CPFSK). FIG. 28(B) shows a spectrum of a conventional binary phase frequency shift keying (BPSK).

FIG. 29 is a graph, in place of a diagram, showing a numerical calculation when an initial phase control was not performed. FIG. 29(a) shows an orbit of an optical phase. FIG. 29(b) shows a modulation spectrum of the orbit.

FIG. 30 shows an example of a numerical calculation of a modulation spectrum when the best initial phase control was performed. FIG. 30(a) shows an orbit of an optical phase. FIG. 30(b) shows a modulation spectrum of the orbit.

FIG. 31(a) shows a relationship between a sidelobe suppression ratio and a delay amount of an initial phase control. FIG. 31(b) shows a spectrum when a delay amount $\tau'=20$ ps.

DESCRIPTION OF THE PREFERRED EMBODIMENTS

Basic Arrangement of Optical Modulation System of the Present Invention

Figure 1:
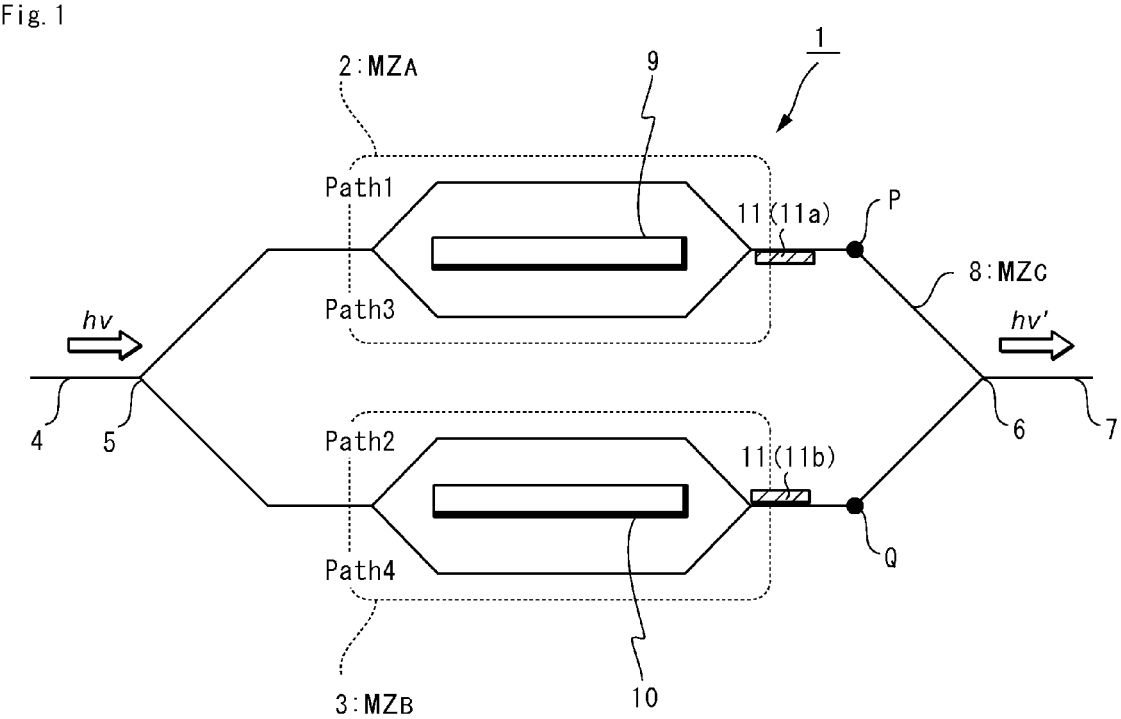
FIG. 1 is a schematic diagram showing a basic arrangement of an optical modulator of the present invention.

Hereinafter, the present invention is explained in detail referring to figures. FIG. 1 is a schematic diagram showing a basic arrangement of an optical modulation system of the present invention. As shown in FIG. 1, the optical frequency shift keying modulation system according to the first aspect of the present invention comprises: a first sub Mach-Zehnder waveguide ($MZ_A$) (2); a second sub Mach-Zehnder waveguide ($MZ_B$) (3); a main Mach-Zehnder waveguide ($MZ_C$) (8) comprising an input part (4) of an optical signal, a branching part (5) which is configured to be connected to the input part, and is connected to the $MZ_A$ and the $MZ_B$, and the optical signal is branched at the branching part into the $MZ_A$ and the $MZ_B$; the first sub Mach-Zehnder waveguide ($MZ_A$); the second sub Mach-Zehnder waveguide ($MZ_B$); a combining part (6) which is connected to the $MZ_A$ and the $MZ_B$, and the optical signal outputted from the $MZ_A$ and the $MZ_B$ is combined at the combining part; an output part (7) outputting the optical signal combined at the combining part; a first electrode (electrode A) (9) of the first sub Mach-Zehnder waveguide ($MZ_A$); a second electrode (electrode B) (10) of the second sub Mach-Zehnder waveguide ($MZ_B$); a third electrode (electrode C) (11) of the main Mach-Zehnder waveguide ($MZ_C$); a signal source (12) for applying either one or both of a modulation signal and bias voltage to the first electrode (9), the second electrode (10) and the third electrode (11); and an output signal phase adjusting part for adjusting a phase difference between an upper side band signal and a lower side band signal which are outputted from the output part (7).

As above mentioned, by providing the output signal phase adjusting part to the FSK modulation system which adjusts the phase difference between an upper side band signal and a lower side band signal outputted from the output part (7), the USB signal and the LSB signal of an FSK signal are, for example, adjusted to have the same phases. Therefore, this FSK modulation system can be used for FSK-PSK modulation and the like.

As shown in FIG. 1, a preferable embodiment of an optical frequency shift keying modulation system according to the first aspect of the present invention is the above described optical frequency shift keying modulation system wherein the third electrode (electrode C) (11) comprises either one or both of: an electrode (electrode $MZ_{CA}$) (11a) which is provided along a waveguide portion between a combining part of the first sub Mach-Zehnder waveguide ($MZ_A$) (2) and the combining part (6) of the main Mach-Zehnder waveguide ($MZ_C$) (8); and an electrode (electrode $MZ_{CB}$) (11b) which is provided along a waveguide portion between a combining part of the second sub Mach-Zehnder waveguide ($MZ_B$) (3) and the combining part (6) of the main Mach-Zehnder waveguide ($MZ_C$) (8), and wherein the output signal phase adjusting part adjusts the phase difference between the upper side band signal and the lower side band signal outputted from the output part (7), and the phase difference is adjusted by controlling voltage applied to either one or both of the electrode $MZ_{CA}$ (11a) and the electrode $MZ_{CB}$ (11b), and the voltage is controlled by the output signal phase adjusting part.

It is to be noted that applying bias voltage or a modulation signal to either one of the $MZ_{CA}$ electrode (11a) or the $MZ_{CB}$ electrode (11b) is a preferable embodiment of the present invention. In this case, either one of the $MZ_{CA}$ electrode (11a) or the $MZ_{CB}$ electrode (11b) may be provided to the system as the third electrode, or, in the system comprising both the $MZ_{CA}$ electrode (11a) or the $MZ_{CB}$ electrode (11b), a signal may be applied to only one of these electrodes. By applying bias voltage or a modulation signal to only one of the $MZ_{CA}$ electrode (11a) or the $MZ_{CB}$ electrode (11b), the phase difference between the upper side band signal and the lower side band signal can easily be adjusted to become 0 degree or 180 degrees. This, for example, enables to diminish the phase difference between the USB signal and the LSB signal, or to maximize the phase difference.

The $MZ_{CA}$ electrode or the $MZ_{CB}$ electrode forms an electric field to a waveguide adjacent to the electrode to which voltage is applied, and each of the $MZ_{CA}$ electrode and the $MZ_{CB}$ electrode acts as a phase modulator. Since these electrodes can perform phase modulation on an optical signal propagating through the waveguide, the USB signal and the LSB signal of the FSK signal, for example, can be adjusted to have the same phase.

It is to be noted that since the $MZ_{CA}$ electrode and the $MZ_{CB}$ electrode are provided as the third electrode (in other words, there are two main Mach-Zehnder electrodes (electrode C)), components to be suppressed (e.g., carrier, the second order component, the third order component) can be effectively suppressed by controlling the phases of components to be suppressed to be reversed.

The optical frequency shift keying modulation system having this arrangement is able to perform phase modulation on an optical frequency shift keying modulation signal with ease. It is also able to remove phase modulation information with ease. In order to perform optical PSK modulation on an optical FSK modulation signal, in general, an optical FSK modulator and an optical PSK modulator (a phase modulator) are used. In particular, a USB signal and an LSB signal outputted from the optical FSK modulator are adjusted to have the same phase. And then, a phase modulator, having synchronized with the FSK signals, performs phase modulation on the FSK signals. This enables to add a phase modulation signal to an FSK modulation signal.

When a phase of a baseband signal applied to the $MZ_{CA}$ electrode is represented by $\phi_{MZCA}$, and a phase of a baseband signal applied to the $MZ_{CB}$ electrode is $\phi_{MZCB}$, the optical frequency shift keying modulation system of the resent invention which have the above arrangement performs a frequency modulation on a term corresponding to $\phi_{MZCA}-\phi_{MZCB}$, and performs a phase modulation on a term corresponding to $\phi_{MZCA}+\phi_{MZCB}$. Therefore, by adjusting the level of $\phi_{MZCA}-\phi_{MZCB}$ and $\phi_{MZCA}+\phi_{MZCB}$, a phase controller switches an USB signal and an LSB signal, and further performs a phase modulation on those signals. Thus, one optical modulator is able to perform various modulations. For example, it is able to add an optical PSK signal on an optical FSK modulation signal. It is also able to convert an optical FSK modulation signal to an optical PSK signal. And it is also able to remove an optical PSK signal from an optical FSK modulation signal having an optical PSK signal.

The PSK modulation is performed, for example, by adjusting phase difference between the USB signal and the LSB signal of the FSK signal to become 180 degree. This means phase is reversed (in other words, $\phi_{MZCA}+\phi_{MZCB}$ becomes $\pi+2n\pi$). In case a PSK modulated optical signal is inputted to the above optical frequency shift keying modulation system, if the phase difference between the USB signal and the LSB signal of the FSK signal is adjusted to become 180 degrees, in other words, the phases of the USB signal and the LSB signal are adjusted to be reversed, the phase difference between the USB signal and the LSB signal disappears, thereby removing PSK modulation. This corresponds to what is called a label peel. An optical signal whose label is peeled off is modulated, and a new label (modulation signal) can be added to the optical signal.

In the present optical information communication, modulation method adopted in each network may be different. For example, OOK modulation method, PSK modulation method, FSK modulation method and the like are adopted in different networks. This is why, in each node of the networks, an optical signal is converted to an electric signal, and then the electric signal is modulated to an optical signal according to each modulation method adopted in the network. However, the optical modulation system of the present invention, for example, is able to perform modulation of an optical signal (e.g., converting an optical FSK modulation signal into an optical PSK modulation signal, or removing optical PSK modulation therefrom) without converting the optical signal into an electric signal. This is a useful technique which can be used in optical information communication and the like.

Sub Mach-Zehnder Waveguide

Hereinafter, each component of the optical modulator of the present invention is described. Each Mach-Zehnder waveguide, for example, is provided with a waveguide of nearly hexagonal shape (which composes two arms of the MZ), and is provided with two parallel-aligned phase modulators. A phase modulator for example can be realized by an electrode which is parallel aligned with waveguides. An intensity modulator for example can be realized by a Mach-Zehnder waveguide and an electrode which applies electric fields to the both arms of the Mach-Zehnder waveguide.

A Mach-Zehnder waveguide or an electrode is generally provided on a substrate. The material of the substrate and each waveguide is not specifically limited if light can propagate therethrough. For example, a lithium niobate waveguide with a Ti diffusion may be formed on an LN substrate, and a silicon dioxide ($SiO_2$) waveguide may be formed on a silicon (Si) substrate. Also, an optical semiconductor waveguide such as an InGaAsP waveguide (a GaAlAs waveguide) formed on an indium phosphide substrate (a GaAs substrate) may be used. The substrate is preferably formed of lithium niobate ($LiNbO_3$:LN) and cut out in a direction orthogonal to the X-axis (X-cut), and light is propagated in a Z-axis direction (Z-axis propagation). This is because a low-power-consumption drive and a superior response speed can be achieved due to dynamic electrooptic effect. An optical waveguide is formed in the surface portion of a substrate having an X-cut plane (YZ plane), and guided light propagates along the Z-axis (the optic axis). A lithium niobate substrate except the X-cut may be used. As a substrate, it is possible to use a material of a one-axis crystal having a crystal system such as a trigonal system and a hexagonal system and having electro optical effect or a material in which a point group of a crystal is $C_{3\nu}$, $C_3$, $D_3$, $C_{3h}$, and $D_{3h}$. These materials have a refractive index adjusting function in which a change in the refractive index due to the application of an electric field has a different sign depending on a mode of propagation light. As a specific example, lithium tantalite oxide ($LiTO_3$:LT), $\beta$-$BaB_2O_4$ (abbr. BBO), $LiIO_3$ and the like can be used other than lithium niobate.

The dimension of the substrate is not particularly limited if it is large enough to be able to form a predefined waveguide. The width, length, and the depth of each waveguide is also not particularly limited if the module of the present invention is able to fulfill its function. The width of each waveguide can be, for example, around 1 μm to 20 μm, preferably about 5 μm to 10 μm. The depth (the thickness) of waveguide can be 10 nm to 1 μm, preferably 50 nm to 200 nm.

The branching part (5) of the main Mach-Zehnder waveguide ($MZ_C$) is a part where optical signals branch into the first sub Mach-Zehnder waveguide ($MZ_A$) and the second sub MZ waveguide ($MZ_B$), and a Y-branching formed branching part can be used. The combining part (6) is a part where optical signals outputted from the first sub Mach-Zehnder waveguide ($MZ_A$) and the second sub Mach-Zehnder waveguide ($MZ_B$) are combined, and a Y-branching formed combining part can be used. The above Y-branching formed parts may be symmetry or asymmetry. As the branching part (5) or the combining part (6), a directional coupler can be used.

The preferable embodiment of the above described optical modulator is the one that is provided with an asymmetric directional coupler at the branching part (5) of the main Mach-Zehnder waveguide ($MZ_C$) (8), and controlled so that the intensity of the optical signal branched to the first sub Mach-Zehnder waveguide ($MZ_A$) by the asymmetric directional coupler is larger than that of the optical signal branched to the second sub Mach-Zehnder waveguide ($MZ_B$).

Electrode on Sub Mach-Zehnder Waveguide

The first electrode (electrode A) and the second electrode (electrode B) are respectively provided on each sub Mach-Zehnder waveguide. The electrode A acts as either one or both of a $DC_A$ electrode and an $RF_A$ electrode. The electrode B acts as either one or both of a $DC_B$ electrode and an $RF_B$ electrode. This means that a modulation signal such as a radio frequency signal other than bias voltage can be applied to these electrode A and electrode B.

The first bias adjustment electrode ($DC_A$ electrode) controls a phase of light propagating through the two arms of the $MZ_A$ by controlling bias voltage between the two arms (path 1 and Path 3) composing the $MZ_A$. On the other hand, the second bias adjustment electrode ($DC_B$ electrode) controls a phase of light propagating through the two arms of the $MZ_B$ by controlling bias voltage between the two arms (path 2 and Path 4) composing the $MZ_B$. The $DC_A$ electrode and the $DC_B$ electrode are preferably direct current electrodes or low frequency electrodes in general (a $DC_A$ signal and a $DC_B$ signal are applied). It is to be noted that "low frequency" of the low frequency electrode means frequency of, for example, 0 Hz to 500 MHz. A phase modulator for adjusting a phase of an electric signal is preferably provided at an output of the signal source of this low frequency signal in order to be able to control a phase of an output signal.

The first modulation electrode ($RF_A$ electrode) inputs a radio frequency (RF) signal to the two arms comprising the $MZ_A$. On the other hand, the second modulation electrode ($RF_B$ electrode) inputs radio frequency ($RF_A$ signal and $RF_B$ signal) signals to the two arms comprising the $MZ_B$. A traveling-wave-type electrode or a resonant-type electrode can be used as the $RF_A$ electrode and the $RF_B$ electrode, and the resonant-type electrode is preferable.

As above explained, two other electrodes may serve as a $DC_A$ electrode and an $RF_A$ electrode separately, on the other hand, one electrode may act as those electrodes alone. In the latter case, a bias voltage and a radio frequency signal is applied to one electrode.

The $RF_A$ electrode and the $RF_B$ electrode are preferably connected to a high frequency electric signal source. The high frequency electric signal source is a device for controlling a signal transmitted to the $RF_A$ electrode and the $RF_B$ electrode. As the high frequency electric signal source, a known high frequency signal source can be adopted. Frequency ($f_m$) of the high frequency signal which is, for example, from 1 GHz to 100 GHz is inputted to the $RF_A$ electrode and the $RF_B$ electrode. A sinusoidal wave having a fixed frequency is, for example, an output of a high frequency signal source. A phase modulator is preferably provided at an output of this high frequency electric signal source in order to be able to control a phase of an output signal.

The $RF_A$ electrode and the $RF_B$ electrode are composed of e.g., gold, platinum or the like. The width of the $RF_A$ electrode and the $RF_B$ electrode is, for example, 1 μm to 10 μm, and are specifically 5 μm. The length of the $RF_A$ electrode and the $RF_B$ electrode is, for example, 0.1 times to 0.9 times the wavelength ($f_m$) of the modulation signal, including 0.18 to 0.22 times or 0.67 to 0.70 times, and more preferably, it is shorter than the resonant point of the modulation signal by 20 to 25%. This is because with such length, the synthesized impedance with a stub electrode remains in an appropriate region. A more specific length of the $RF_A$ electrode and the $RF_B$ electrode is, for example, 3250 μm. Hereinafter, a resonant-type electrode and a traveling-wave-type electrode are described.

A resonant-type optical electrode (resonant-type optical modulator) is an electrode for performing modulation by resonance of a modulation signal. A known resonant-type electrode such as those described in the Japanese Patent Application Laid-Open 2002-268025, and [Tetsuya Kawanishi, Satoshi Oikawa, Masayuki Izutsu, "Planar Structure Resonant-type Optical Modulator", TECHNICAL REPORT OF IEICE, LQE2001-3 (2001-05)] can be adopted as a resonant-type electrode.

A traveling-wave-type electrode (traveling-wave-type optical modulator) is an electrode (modulator) for modulating light while guiding waves so that a lightwave and an electric signal are guided in the same direction (e.g., Hiroshi Nishihara, Masamitsu Haruna, Toshiaki Suhara, "Optical Integrated Circuit" (revised and updated edition), Ohmsha, pp. 119-120). A known traveling-wave-type electrode such as those described in Japan Patent Application Laid-Open Nos. 11-295674, 2002-169133, 2002-40381, 2000-267056, 2000-471159, and 10-133159, for example, can be adopted as a traveling-wave-type electrode.

As a preferable traveling-wave-type electrode, a so-called symmetrical-type earth electrode arrangement (one provided with at least a pair of earth electrodes on both sides of a traveling-wave-type signal electrode) is adopted. Thus, by symmetrically arranging the earth electrodes on both sides of the signal electrode, a high frequency wave outputted from the signal electrode is made easy to be applied to the earth electrodes arranged on the left and right side of the signal electrode, thereby suppressing an emission of a high frequency wave to the side of the substrate.

The RF electrode may act as both of the electrodes for the RF signal and the DC signal. Namely, either one or both of the $RF_A$ electrode and the $RF_B$ electrode are connected to a feeder circuit (bias circuit) for supplying the DC signal and the RF signal mixed. Since the optical SSB modulator of this embodiment has the RF electrode connected to the feeder circuit (bias circuit), an RF signal (ratio frequency signal) and a DC signal (direct current signal:signal related to bias voltage) can be inputted to the RF electrode.

The main Mach-Zehnder electrode (electrode C) (11) is an electrode for controlling the phase difference between an output from the first sub Mach-Zehnder waveguide ($MZ_A$) and an output from the second sub Mach-Zehnder waveguide ($MZ_B$) by applying a modulation signal to the main Mach-Zehnder waveguide ($MZ_C$). The main Mach-Zehnder electrode (electrode C) (11) is also an electrode for controlling the phase of an optical signal outputted by applying bias voltage to the main Mach-Zehnder waveguide ($MZ_C$). As the electrode C, the sub Mach-Zehnder electrode above explained can be used as needed. Since a radio frequency signal as a modulation signal, for example, is applied to the electrode C, a traveling-wave-type electrode corresponding to the radio frequency signal is preferable for the electrode C. Since the phase difference of optical signals of both arms is controlled by the electrode C, a signal desired to be cancelled, e.g., an USB signal or an LSB signal, can be suppressed by reversing the phase of the signal. By performing this phase control at high speed, frequency shift keying can be realized. Also, the phase of the USB signal an the LSB signal can be adjusted by applying bias voltage to the main Mach-Zehnder electrode (11) in order to control the phase of an optical signal outputted from the main Mach-Zehnder waveguide ($MZ_C$) (8).

The main Mach-Zehnder electrode (electrode C) (11) is electrically connected to the signal source (12). And, the signal source (12) is used to apply either one or both of a modulation signal and a bias voltage to the main Mach-Zehnder electrode (11). The modulation signal controls a phase difference between an output signal from the first sub Mach-Zehnder waveguide ($MZ_A$) and an output signal from the second sub Mach-Zehnder waveguide ($MZ_B$). The bias voltage controls a phase of an optical signal outputted from the main Mach-Zehnder waveguide ($MZ_C$) (8).

In case the optical modulator acts as an FSK modulator, the phase difference of an optical signal from each sub Mach-Zehnder waveguide is controlled at high speed by the modulation signal ($RF_C$ voltage), then a USB signal and an LSB signal is switched over to be outputted as an FSK signal. As this modulation signal, the same one as the modulation signal explained above can be used. Also, phases of the USB signal and the LSB signal are controlled by bias voltage ($DC_C$ voltage) applied to the main Mach-Zehnder electrode (11) especially between the combining part (6) and the output part (7) of the main Mach-Zehnder waveguide ($MZ_C$) (8). As this bias voltage, the same one explained above can be used.

Signal Source

As explained above, in the conventional FSK modulator, two kinds of signals ($DC_A$ voltage and $DC_B$ voltage) as bias voltages are generally applied to the electrode A and the electrode B respectively from one signal source, and three kinds of signals ($RF_A$ voltage, $RF_B$ voltage and $RF_C$ voltage) are applied to the electrode A, the electrode B and the electrode C respectively from the other high-frequency power source. Also, in the conventional SSB modulator, three kinds of signals ($DC_A$ voltage, $DC_B$ voltage and $DC_C$ voltage) as bias voltages are generally applied to the electrode A, the electrode B and the electrode C respectively from one signal source, and two kinds of signals ($RF_A$ voltage and $RF_B$ voltage) are applied to the electrode A and the electrode B from the other high-frequency power source.

On the other hand, in the optical modulator of the present invention, three kinds of signals ($DC_A$ voltage, $DC_B$ voltage and $DC_C$ voltage) as bias voltages are preferably applied to the electrode A, the electrode B and the electrode C respectively from one signal source in general, and three kinds of signals ($RF_A$ voltage, $RF_B$ voltage and $RF_C$ voltage) are applied to the electrode A, the electrode B and the electrode C respectively from the other high-frequency power source. As this way, in the optical modulator of the present invention, the signal wiring from the power source has more complicated circuit structure than that of the conventional one, but the optical modulator can adjust, for example, a phase of an FSK signal. It is to be noted that only one signal source is designated as one for applying each bias voltage to the optical modulator, and phase modulation or time control is preferably performed by a phase modulator or a delay circuit as needed. Also, only one signal source is designated as one for applying modulation signal and the like to the optical modulator, and phase modulation or time control is preferably performed by a phase modulator or a delay circuit as needed. And the phase, the intensity and the timing of the signal transmitted from the signal sources to each electrode is preferably controlled by a control part such as a computer connected to the signal sources.

Figure 2:
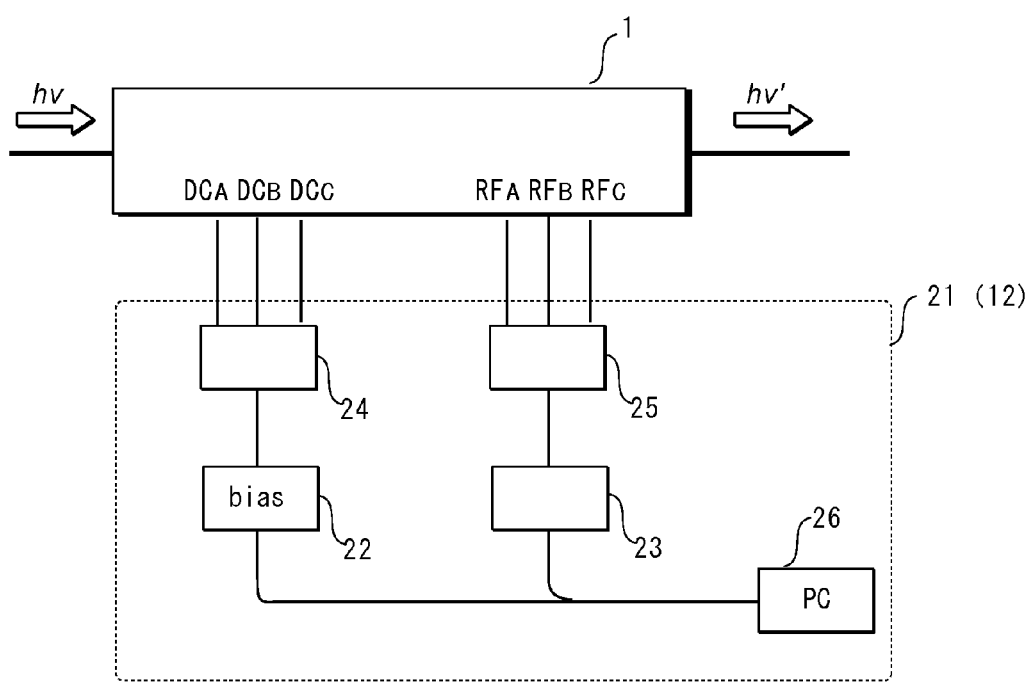
FIG. 2 is a conceptual diagram related to a signal source according to a certain embodiment of the present invention.

FIG. 2 is a conceptual diagram showing a signal source according to a certain embodiment of the present invention. As shown in FIG. 2, this embodiment of the signal source (12) is provided with a bias signal source (low frequency signal source) (12a) and a high frequency signal source (12b). The bias signal source applies bias voltage (low frequency signal) to two sub Mach-Zehnder waveguides and a main Mach-Zehnder waveguide. The high frequency signal source applies a radio frequency signal to two sub Mach-Zehnder waveguides and a main Mach-Zehnder waveguide. These signal sources are, for example, connected to adjustment mechanisms (12c, 12d) for adjusting phase, intensity, frequency and apply timing of an electric signal, and the phase and the like of the signal are adjusted as needed. The adjustment amount thereof may be fixed, or may be controlled by a control mechanism such as a computer (12e) connected to each adjustment mechanism.

The bias signal source (low frequency signal source) (12a) generates a low frequency signal. The signal is adjusted with respect to one or more of its phase, intensity, frequency or apply timing by the adjustment mechanism (12c), and then three kinds of signals ($DC_A$ voltage, $DC_B$ voltage and $DC_C$ voltage) are applied to the optical modulator (1). As explained above, "low frequency" of the low frequency signal means frequency of, for example, 0 Hz to 500 MHz.

The high frequency signal source (12b) generates a high frequency signal. The signal is adjusted with respect to one or more of its phase, intensity, frequency or apply timing by the adjustment mechanism (12d), and then three kinds of signals ($RF_A$ voltage, $RF_B$ voltage and $RF_C$ voltage) are applied to the optical modulator (1). As explained above, high frequency ($f_m$) of the high frequency signal means frequency of, for example, 1 GHz to 100 GHz. A sinusoidal wave with a fixed frequency, for example, is an output of the high frequency electric signal source Bias Voltage Control Part The bias voltage control part (13) is realized by a computer including a computer readable recording media which act as the first bias modulation means and the second bias modulation means. The first bias modulation means outputs a control signal for adjusting bias voltage applied to each sub Mach- Zehnder waveguide so that the intensity of the optical signal outputted from the main Mach-Zehnder waveguide is maximized. And the second bias adjusting means outputs a control signal for adjusting bias voltage applied to the main Mach-Zehnder electrode so that, when the intensity of the optical signal is represented by Max, an intensity of the optical signal outputted from the main Mach-Zehnder waveguide is in between 40% to 60%, both inclusive, of the Max, while the bias voltage applied to the sub Mach-Zehnder waveguide is kept to be the same level as the one obtained in the first bias adjusting means.

The above each means is implemented in a computer and the like which comprises an input device, a memory part, a computing part, a control part and an output part. The input device inputs measured value from the measurement system. The memory part stores the measured value inputted from the input device. The computing part compares the measured value stored in the memory part. The control part, following the input information from the input device, reads a control program stored in the main memory, retrieves each measured value stored in the memory part, and performs a certain control. And an output part outputs a direction on the bias voltage to the signal source based on the computing result from the computing part.

Instead of the second bias adjusting means, the bias voltage control part (13) may contain a third bias adjusting means, which adjusts the bias voltage of the main Mach-Zehnder electrode so that an output of a dithering signal element is maximized by applying a dithering signal as a bias voltage to the main Mach-Zehnder electrode, while the bias voltage applied to the sub Mach-Zehnder waveguide is kept to be the same level as the one obtained in the first bias adjusting means. The dithering signal may be generated by the second bias modulation means with a dithering generation circuit which applies the dithering processing to the staircase wave signal.

For example, by applying m times of dithering to a staircase wave of n steps, the number of steps of the staircase wave becomes (n times m), enhancing the comparative accuracy of the staircase wave signal without increasing the number of steps of the frequency. A dithering generation circuit, for example, includes a feedback frequency divider (abbr. as DIV) and a modulation circuit.

The dithering generation circuit, for example, operates as follows. An output frequency of a voltage controlled oscillator (VCO) is provided to an output terminal and a feedback frequency divider. On the other hand, the modulation circuit receives reference input signal R, generates frequency which applies a certain cycle of fluctuation to an output frequency, and provides the output frequency to the feedback frequency divider. The feedback frequency divider changes the ratio of frequency dividing in the range of about 1% by an output from the modulation circuit in a certain cycle. And then, an output of the feedback frequency divider is provided to a phase comparison circuit. Thus, a dithering signal is generated.

Also, the bias voltage control part (13) may further includes the fourth bias adjusting means for outputting a control signal. The control signal adjusts bias voltage applied to each sub Mach-Zehnder waveguide so that the intensity of the optical signal outputted from each sub Mach-Zehnder waveguide is maximized, while the bias voltage applied to the main Mach-Zehnder electrode is kept to be the same level as the one obtained by the second or the third bias adjusting means.

The optical modulator of the present invention may control a phase of the output signal by adjusting bias voltage applied to the main Mach-Zehnder electrode. In this case, in addition to the ordinary operation of the FSK modulation, the bias voltage is applied to the main Mach-Zehnder electrode, thereby obtaining a phase adjusted FSK modulation signal.

FSK is the abbreviation of Frequency Shift Keying. The FSK is a modulation method using frequency difference information. When a carrier frequency is represented by ($f_0$) and a frequency of a modulation signal is represented by ($f_m$), the FSK modulator outputs a USB signal ($f_0+f_m$) and an LSB signal ($f_0-f_m$). These signals are used as information.

PSK is the abbreviation of Phase Shift Keying. The PSK is a modulation method using phase difference information, for example, phase 0 degree and $\pi$.

Operation

Hereinafter, an operation example of the optical modulator is described. For example, sinusoidal RF signals of 90 degrees phase difference are applied to parallel aligned four optical modulators (composing $RF_A$ electrode and $RF_B$ electrode) of the sub MZ waveguide. And with respect to light, bias voltages are applied to the $DC_A$ electrode and the $DC_B$ electrode so that phase differences of the optical signals are respectively 90 degrees. These phase differences of the electric signals and the optical signals are adjusted as needed, but are basically adjusted to be an integral multiple of 90 degrees.

Figure 3:
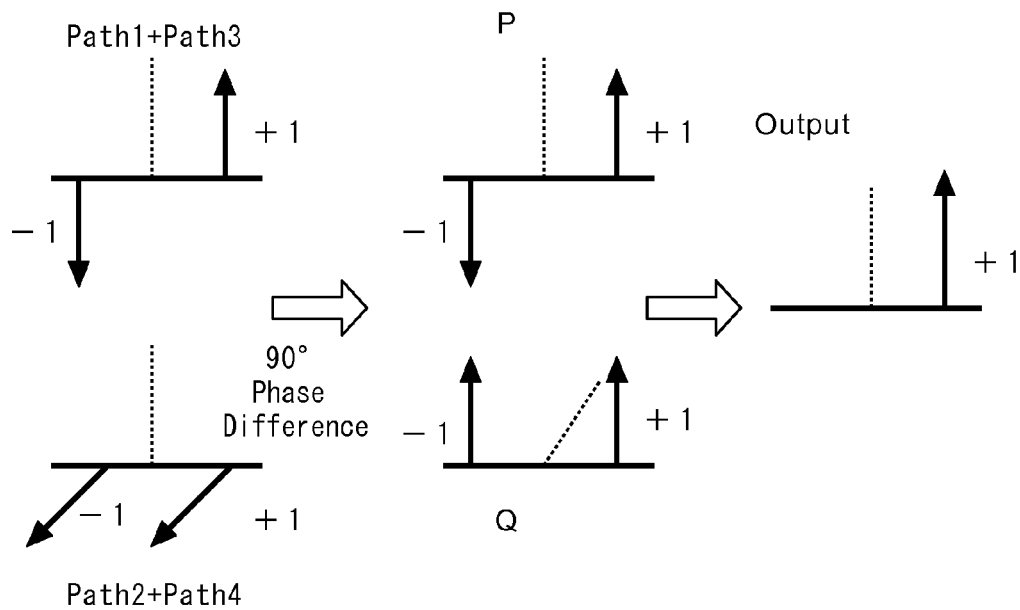
FIG. 3 is a conceptual diagram showing optical signals and phases thereof in each part of an ideal optical FSK modulator (or an optical SSB modulator).

FIG. 3 is a conceptual diagram showing optical signals and the phases in each part of an ideal optical FSK modulator (or an optical SSB modulator). As shown in FIG. 3, a carrier and the like are ideally suppressed, and at point P and point Q of FIG. 1, LSB signals from the $MZ_A$ and the $MZ_B$ are adjusted to be in opposite phase. The signals adjusted in this way are combined at the combining part (6) where the LSB components cancel each other and only the USB components remain. On the other hand, if the phase difference of the output signal from the electrode C is adjusted to be 270 degrees, the USB signals cancel each other and the LSB signals remain.

Figure 4:
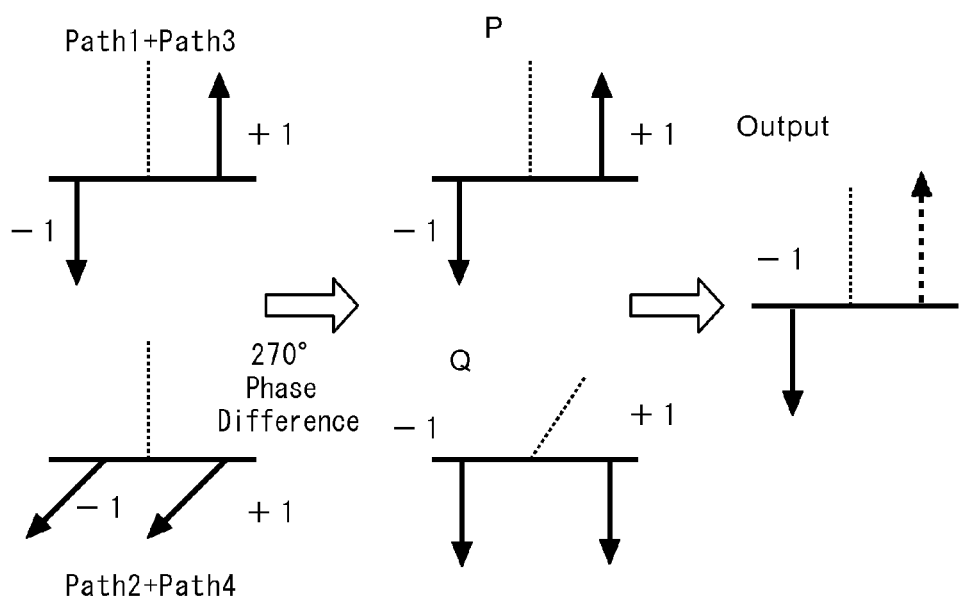
FIG. 4 is a conceptual diagram showing FSK signals (LSB signals) in perspective of phases.

FIG. 4 is a conceptual diagram showing FSK signals (USB signals and LSB signals) considering the phase. FIG. 4 shows the way an LSB signal is obtained. In this example, there is a phase lag of 180° between the USB signal of FIG. 3 and the LSB signal of FIG. 4. The FSK signal is based on frequency shift information. Therefore, what is concerned is a frequency position, and the final phase of the FSK signal (USB signal or LSB signal) does not matter. In fact, as shown in FIG. 4, the phase of the USB signal and that of the LSB signal do not match. In other words, as shown by dotted lines in FIG. 4, if a USB signal exists, the phase lag of 180 degrees between the LSB signal and the USB signal, for example, exists.

Therefore, for example, the phase difference of optical signals at point P and point Q is adjusted to be 180 degrees so that a phase difference between an obtained LSB signal and an LSB signal shown in FIG. 4 become 180 degree. Thus, a phase of the optical signal obtained as an LSB signal, shifted by 180 degrees from the phase of the LSB signal shown in FIG. 4, equals to a phase of the USB signal shown in FIG. 3. This is also realized by adjusting a phase of an LSB signal to be shifted by 180 degrees after having obtained an LSB signal shown in FIG. 4.

For example, if a phase difference between the LSB signal and the USB signal exists, the LSB signal or the USB signal is selected by a modulation signal applied to the main MZ electrode. Therefore, in order to adjust the phases of the LSB signal and the USB signal, the signal source is adjust so that the signal source adjusts bias voltage applied to the main MZ electrode based on the modulation signal.

In order to adjust the signal source this way, for example, if the control device, such as a computer that is connected to the signal source, applies bias voltage in selecting the USB signal, the control device outputs directional information for applying predetermined bias voltage as well as directional information for selecting the USB signal as a modulation signal to the signal source of the bias voltage and the high frequency signal source for the modulation signal etc. respectively.

Each signal source, having received the directional information and following the direction, applies a modulation signal, which outputs the USB signal, to the main Mach-Zehnder electrode. And the each signal source also applies a signal, which applies a predetermined bias voltage, to the main Mach-Zehnder electrode. Thus, a signal is selected and the phase of the USB signal and that of the LSB signal is adjusted (preferably in the same level).

The optical FSK modulation system of the present invention, as above described, comprises an output signal phase modulator for adjusting a phase difference between an upper side band signal and a lower side band signal outputted from the output part (7). Thus, the optical FSK modulation system is able to adjust phases of a USB signal and an LSB signal of an FSK signal to be, for example, the same. Therefore, this FSK modulation system is able to be used for FSK-PSK modulation (i.e. PSK modulation of an FSK modulation signal, or performing FSK modulation on a signal and then further performing PSK modulation on the signal) and the like.

The above optical FSK modulation system is explained specifically. Modulation signals which have a phase difference of 90 degrees, the same amplitude (Am), and the same modulation frequency ($f_m$) are applied to the first electrode and the second electrode. These modulation signals are respectively represented by Am cos $\omega_m t$ and Am sin $\omega_m t$ ($\omega_m = 2\pi f_m$) considering the phase difference of 90 degrees. And a bias signal whose phase is shifted by $\pi$ is applied to the first electrode and the second electrode. It is to be noted that the phase difference (delay) shown in FIG. 3 is adjusted by a function f(t) which is related to a phase of a baseband signal applied to the third electrode. A phase delay caused by the third electrode (11a) which is provided on between the output part of the $MZ_A$ and the combining part (6) of the $MZ_C$ is represented by $A_1 f(t)$. A phase delay caused by the third electrode (11b) which is provided on between the output part of the $MZ_B$ and the combining part (6) of the $MZ_C$ is represented by $A_2 f(t)$. And $\alpha$ is defined by: $\{(A_1-A_2)/(A_1+A_2)\}$, and F is defined by: $\{(A_1+A_2)[f(t)+\pi/4]\}/2$. Note that, if the third electrode is one-electrode type, $\alpha$ will be zero. In the above example, the electrode (11a) is related to $A_1$, and the electrode (11b) is related to $A_2$. It is to be noted that when an input signal is represented by $\exp(j\omega_0 t)$, an output R at the combining part (6) of the $MZ_C$ is defined by the following equation.

$$R = e^{j[\omega_0 t + \pi/4 + \alpha F(t)]} J_1(A_m)[\cos F(t) e^{j\omega_m t} + j \sin F(t) e^{-j\omega_m t}] \quad (Ia)$$

In the above equation, j is an imaginary unit. And $J_1$ (Am) is a Bessel function. If the above modulation is performed so that the sin term is multiplied by the imaginary unit, phase difference of 90 degrees between the USB signal and the LSB signal which is related to j sin term will be provided. And, if the third electrode is two electrode type, $\alpha F(t)$ term remains which corresponds to a phase modulation component. Therefore, an FSK modulation is related to differential components of baseband signals applied to the third electrode ($MZ_{CA}$: 11a) and third electrode ($MZ_{CB}$: 11b). And a phase modulation is related to summation components of baseband signals applied to the third electrode ($MZ_{CA}$: 11a) and third electrode ($MZ_{CB}$: 11b).

In the above equation, a USB signal, for example, relates to cos $[f(t)+\pi/4]$ term, and an LSB signal, for example, relates to sin $[f(t)+\pi/4]$ term. Therefore, if f(t) is $-\pi/4$, a USB signal is outputted and an LSB signal is suppressed. On the other hand, if f(t) is $\pi/4$, a USB signal is suppressed and an LSB signal is outputted. And in so adjusting, a phase difference between the USB signal and the LSB signal becomes 180 degrees.

In case the electrode C is a two-electrode type one, if a baseband signal is applied to either one of the $MZ_{CA}$ (11a) or the $MZ_{CB}$ (11b), $\alpha$ can be switched to 1 or $-1$. In other words, by switching electrodes, to which a baseband signal is applied, from the $MZ_{CA}$ (11a) to the $MZ_{CB}$ (11b), $\alpha$ can be switched from 1 to $-1$, or switched from $-1$ to 1. Therefore, by switching electrodes to which a baseband signal is applied, phase modulation can be performed. Also a phase of an output signal can be controlled by applying or not applying baseband signals to the both electrodes. In other words, in the above system, phase modulation can be performed so that a signal has phase differences of 0 degree, 90 degree ($\pi/2$), 180 degree ($\pi$), or 270 degree ($3\pi/2$).

As above explained, a preferable embodiment of the optical frequency shift keying modulation system according to the first aspect of the present invention is the above described optical frequency shift keying modulation system wherein the third electrode (electrode C) (11) comprises either one or both of: an electrode (electrode $MZ_{CA}$) (11a) which is provided along a waveguide portion between a combining part of the first sub Mach-Zehnder waveguide ($MZ_A$) (2) and the combining part (6) of the main Mach-Zehnder waveguide ($MZ_C$) (8); and an electrode (electrode $MZ_{CB}$) (11b) which is provided along a waveguide portion between a combining part of the second sub Mach-Zehnder waveguide ($MZ_B$) (3) and the combining part (6) of the main Mach-Zehnder waveguide ($MZ_C$) (8), and wherein the output signal phase adjusting part adjusts the phase difference between the upper side band signal and the lower side band signal outputted from the output part (7), and the phase difference is adjusted by controlling voltage applied to either one or both of the electrode $MZ_{CA}$ (11a) and the electrode $MZ_{CB}$ (11b). and the voltage is controlled by the output signal phase adjusting part.

In the optical FSK modulation system according to this embodiment, the $MZ_{CA}$ electrode or the $MZ_{CB}$ electrode forms an electric field to a waveguide adjacent to the electrode to which voltage is applied, and each of the $MZ_{CA}$ electrode and the $MZ_{CB}$ electrode acts as a phase modulator. Since these electrodes can modulate phase of an optical signal propagating through the waveguides, a USB signal and an LSB signal of an FSK signal, for example, can be adjusted to have the same phase.

In particular, not only applying a modulation signal related to a USB signal or an LSB signal to the electrode C, but also applying bias voltage, which is, for example, reversed in phase if the modulation signal is a USB signal or an LSB signal, to either one or both of the $MZ_{CA}$ electrode and the $MZ_{CB}$ electrode.

A preferable embodiment of the present invention is as follows. A photodetector detects an output signal of the optical FSK modulation system. A control part receives the output signal detected by the photodetector. The control part analyzes a phase difference between a USB signal and an LSB signal contained in the output signal received. An then, the control part applies bias voltage to the $MZ_{CA}$ electrode or the $MZ_{CB}$ electrode so as to reduce the phase difference. Thus, even if the environment of the optical modulation system changes, the phase difference between the USB signal and the LSB signal can be adjusted as little as possible.

As above explained, the other preferable embodiment of the optical frequency shift keying modulation system according to the first aspect of the present invention is one of the above described optical frequency shift keying modulation systems wherein the output signal phase adjusting part comprises a phase modulator which is provided on between the combining part (6) of the main Mach-Zehnder waveguide ($MZ_C$) (8) and the output part (7).

This optical FSK modulation system, for example, is able to adjust a USB signal and an LSB signal to have the same phase, by performing phase modulation on one of the USB signal or the LSB signal when an optical signal propagates the output signal phase adjusting part. In particular, a modulation signal from the signals source is applied to the phase modulator of the output signal phase adjusting part. And when the modulation signal is 0 or 1 (in other words, a USB signal or an LSB signal), a predetermined voltage will be applied to the phase modulator. Concretely speaking, a voltage signal which shifts a phase by 180 degrees is applied to the phase modulator. Thus, one of the phases of the USB signal or the LSB signal can be reversed, thereby the phases of the USB signal or the LSB signal can be matched.

Manufacturing Method of Optical Modulator of the Present Invention

As a forming method of an optical waveguide, a know forming method of the internal diffusion method such as the titanium diffusion method or a proton exchange method and the like can be used. In other words, the optical modulator of the present invention, for example, can be manufactured by the following method. Firstly, an optical waveguide is formed by patterning titanium on the surface of a wafer of lithium niobate by photolithography method, and spreading titanium by thermal diffusion method. This is subject to the following conditions. The thickness of titanium is 100 to 2000 angstrom, diffusion temperature is 500 to 2000° C., and diffusion time is 10 to 40 hours. An insulating buffer layer of silicon dioxide (thickness of 0.5 to 2 μm) is formed on a principle surface of the substrate. Secondly, an electrode with metal plating with thickness of 15 to 30 μm is formed on the buffer layer. And lastly, the wafer is cut off. By these processes, an optical modulator formed with titanium-diffused waveguide is manufactured.

Also, an electrode is manufactured in the same way as the above process. For example, in the same way as a formation of an optical waveguide, by using photolithography technique, an electrode can be formed on both sides of a plurality of waveguides which are formed in the same breadth, the electrode being formed so that the interelectrode gap is about 1 μm to 50 μm.

In case of manufacturing an electrode using silicon substrate, the manufacturing process, for example, is as follows. A lower cladding layer is disposed on a silicon (Si) substrate by the flame hydrolysis deposition method, the lower cladding layer being composed mostly of silicon dioxide ($SiO_2$). And then a core layer is deposed, the core layer being composed mostly of silicon dioxide ($SiO_2$) to which germanium dioxide ($GeO_2$) is added as a dopant. Subsequently, vitrification is performed in an electric furnace. And then, an optical waveguide is formed by etching and an upper cladding layer is disposed, the upper cladding layer being composed mostly of silicon dioxide ($SiO_2$). And then, a thin-film heater thermooptic intensity modulator and a thin-film heater thermooptic phase modulator are formed on the upper cladding layer.

The phase modulator can easily be manufactured, for example, by a waveguide and an electrode capable of applying an electric field to the waveguide. The intensity modulator can easily be manufactured, for example, by a MZ waveguide and an electrode, the electrode being provided on each arm of the MZ waveguide and capable of applying an electric field to the waveguide composing each arm.

Figure 5:
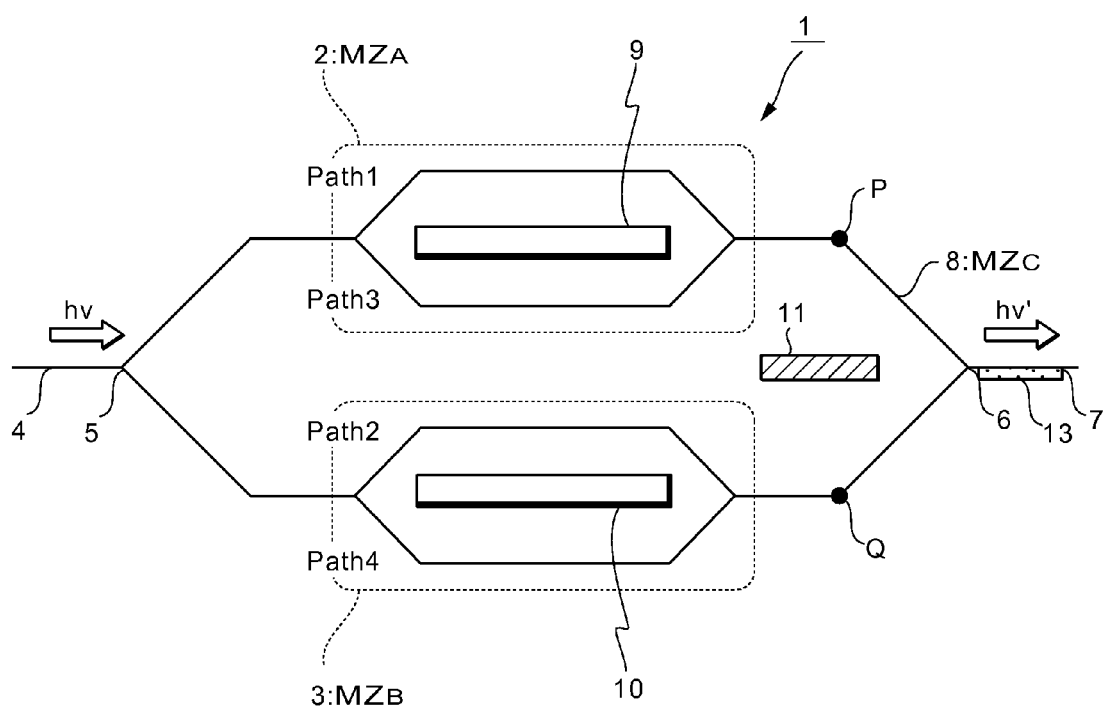
FIG. 5 is a diagram showing the other preferable embodiment of an optical frequency shift keying modulation system according to the first aspect of the present invention.

FIG. 5 shows the other preferable embodiment of the optical frequency shift keying modulation system according to the first aspect of the present invention. As shown in FIG. 5, the other preferable embodiment of the optical frequency shift keying modulation system according to the first aspect of the present invention is one of the above described optical frequency shift keying modulation system wherein the output signal phase adjusting part comprises a phase modulator which is provided on between the combining part (6) of the main Mach-Zehnder waveguide ($MZ_C$) (8) and the output part (7).

This optical FSK modulation system, for example, is able to adjust a USB signal and an LSB signal to have the same phase, by performing phase modulation on one of the USB signal or the LSB signal when an optical signal propagates the output signal phase adjusting part. In particular, a modulation signal including a signal from the signals source which adds information to a signal is applied to the phase modulator of the output signal phase adjusting part. And when the modulation signal is 0 or 1 (in other words, a USB signal or an LSB signal), a predetermined voltage will be applied to the phase modulator. Concretely speaking, a voltage signal which shifts a phase by 180 degrees is applied to the phase modulator.

Figure 6:
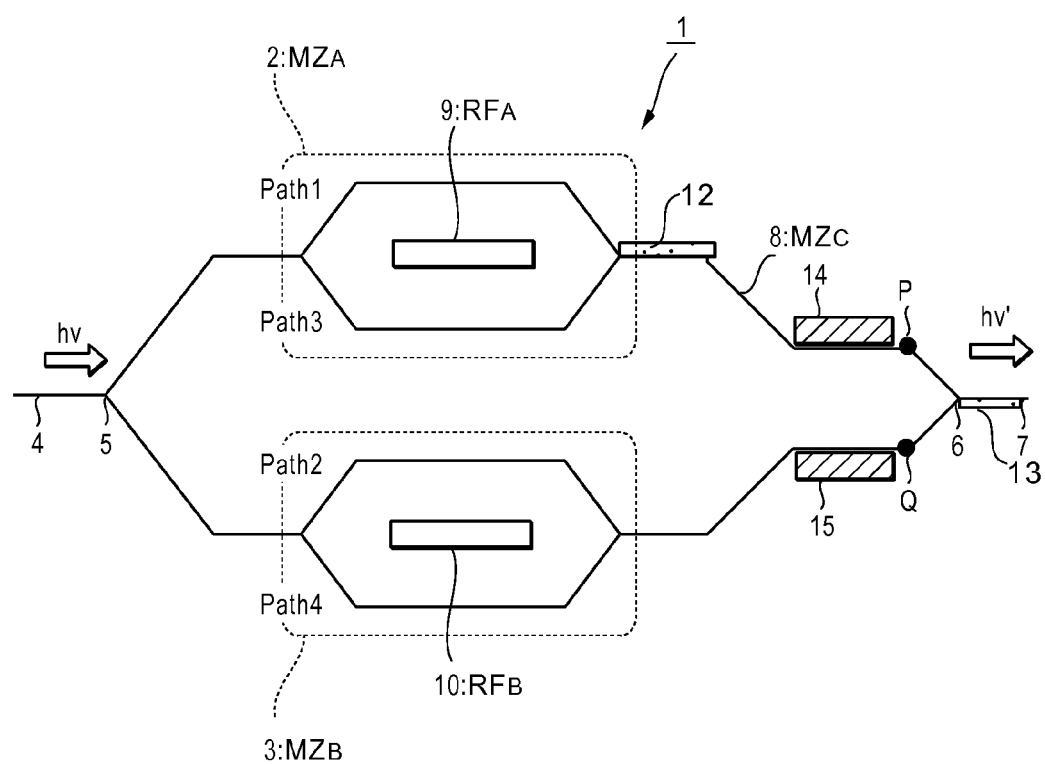
FIG. 6 is a conceptual diagram explaining an optical frequency shift keying modulation system according to the second aspect of the present invention.

Optical FSK Modulation System According to the Second Aspect of the Present Invention FIG. 6 is a conceptual diagram explaining an optical frequency shift keying modulation system according to the second aspect of the present invention. As shown in FIG. 6, an optical FSK modulation system according to the second aspect of the present invention is based on the following idea.

The optical FSK modulation system comprises an intensity modulator (12) which is basically provided on a waveguide portion of the main Mach-Zehnder waveguide ($MZ_C$) between the combining part of the first sub Mach-Zehnder waveguide ($MZ_A$) and the combining part (6) of the main Mach-Zehnder waveguide ($MZ_C$). And the intensity modulator modulates intensity of an optical signal propagating through the waveguide portion. Since components to be suppressed (a carrier component ($f_0$) and a high order component (e.g., a second order component ($f_0 \pm 2f_m$))) of output signals from each sub Mach-Zehnder waveguide are adjusted to have the same signal intensity level, the components to be suppressed (since the phases are reversed) are effectively suppressed when optical signals from each sub Mach-Zehnder waveguide are combined at the combining part (6).

In FIG. 6, an optical FSK modulation system which comprises an intensity modulator (12) provided on a waveguide portion of the main Mach-Zehnder waveguide ($MZ_C$) between the combining part of the first sub Mach-Zehnder waveguide ($MZ_A$) and the combining part (6) of the main Mach-Zehnder waveguide ($MZ_C$) is shown as the optical FSK modulation system according to the second aspect of the present invention. But the optical FSK modulation system according to the second aspect of the present invention may be an optical FSK modulation system which comprises an intensity modulator (12) provided on a waveguide portion of the main Mach-Zehnder waveguide ($MZ_C$) between the combining part of the second sub Mach-Zehnder waveguide ($MZ_B$) and the combining part (6) of the main Mach-Zehnder waveguide ($MZ_C$). And the optical FSK modulation system according to the second aspect of the present invention may also be an optical FSK modulation system which comprises both these two modulators above described.

A preferable embodiment of the optical modulator is one further comprising an asymmetric directional coupler provided at the branching part (5) of the main Mach-Zehnder waveguide ($MZ_C$) (8). The asymmetric directional coupler controls intensity of the optical signal branched to the first sub Mach-Zehnder waveguide ($MZ_A$) so that the intensity of the optical signal branched to the first sub Mach-Zehnder waveguide ($MZ_A$) is higher than intensity of the optical signal branched to the second sub Mach-Zehnder waveguide ($MZ_B$).

If the intensity difference between components to be suppressed is small, the intensity modulator (12) is required to lessen the intensity of one of the component minutely. Further if optical intensity of an optical signal from the $MZ_A$ is weaker than that from $MZ_B$, components to be suppressed cannot be effectively suppressed by the intensity modulator (12). On the contrary, the optical modulator described above can effectively use the intensity modulator (12), because the intensity of an optical signal heading toward the $MZ_A$ which has the intensity modulator can be higher than the intensity of an optical signal heading toward the $MZ_B$.

If a ratio of intensity branch is too small, asymmetric configuration has no meaning. On the other hand, if the ratio is too large, intensity of the entire optical signal must be reduced. From this perspective, an intensity branch ratio ($MZ_A/MZ_B$), for example, is from 1.01 to 5 both inclusive, from 1.1 to 3 both inclusive is preferable, and the ratio may also be from 1.3 to 1.5 both inclusive. Increasing the branch ratio of $MZ_A$ this way, by adjusting intensity considering the branch ratio at the intensity modulator (12), intensity of components desired to be suppressed can be effectively adjusted.

While not specifically shown in figures, the other preferable embodiment of the present invention is one further comprising the intensity modulator (12) provided on a waveguide portion between a combining part of the second sub Mach-Zehnder waveguide ($MZ_B$) and the combining part (6) of the main Mach-Zehnder waveguide ($MZ_C$). The intensity modulator modulates intensity of the optical signal propagating through the waveguide portion.

It is to be noted that an optical modulator further comprising the intensity modulator (12) provided on between the output part of the $MZ_B$ and the combining part (6) is the other embodiment of the present invention. In this case, components desired to be suppressed can be adjusted and suppressed, regardless of which intensity is stronger between the optical signals from the $MZ_A$ and the optical signal from the $MZ_B$.

In particular, the optical FSK modulation system according to the second aspect of the present invention is an optical modulator which adopts the optical FSK modulation system according to the first aspect of the present invention as needed, and comprises an intensity modulator (12) which is provided on a waveguide portion of the main Mach-Zehnder waveguide ($MZ_C$) between the combining part of the first sub Mach-Zehnder waveguide ($MZ_A$) and the combining part (6) of the main Mach-Zehnder waveguide ($MZ_C$), and the intensity modulator modulates intensity of an optical signal propagating through the waveguide portion.

Since the optical FSK modulation system according to the second aspect of the present invention has the above arrangement, in addition to the benefit of the optical FSK modulation system according to the first aspect of the present invention, it can adjust components to be suppressed (a carrier component ($f_0$) and a high order component (e.g., a second order component ($f_0 \pm 2f_m$))) of output signals from each sub Mach-Zehnder waveguide to have the same signal intensity level. Therefore, the optical FSK modulation system according to the second aspect of the present invention is able to effectively suppressed components to be suppressed when optical signals from each sub Mach-Zehnder waveguide are combined at the combining part (6). In addition, since the system has a configuration of the optical FSK modulation system according to the first aspect of the present invention, a phase difference between a USB signal and an LSB signal can be adjusted. Therefore, the system can be used as a high performance optical information communication system.

The phases of carrier waves (carrier signals) and a high order component (e.g., a second order component ($f_0 \pm 2f_m$)) of optical signals outputted from each sub Mach-Zehnder waveguide are decided by phase or bias voltage of a signal applied to each sub Mach-Zehnder waveguide. Therefore, components to be suppressed are effectively suppressed by adjusting phases of output signals from each sub Mach-Zehnder waveguide, so that the phases of components to be suppressed (a carrier wave (a carrier signal) of an optical signal or a high order component (e.g., a second order component ($f_0 \pm 2f_m$)) are reversed, before combined at the combining part.

A control part, for example, adjusts voltage applied to the first main Mach-Zehnder electrode ($MZ_{CA}$ electrode) and the second main Mach-Zehnder electrode ($MZ_{CB}$ electrode) so that phase difference of optical carrier signals or certain high order optical signals contained in output signals from the first waveguide ($MZ_A$) and the second waveguide ($MZ_B$) becomes 180 degrees. This control part, for example, is a computer which is connected to signal sources of each electrode and stores a processing program. When the computer receives an input of control information from an input device such as a keyboard, a CPU reads out, for example, a processing program stored in a main program, and reads out necessary information from memories based on an order of the processing program, rewrites information stored in memories as needed, and outputs an order, which controls timing and phase difference of an optical signal outputted from a signal source, to signal source from an external output device. As the processing program, one that makes a computer have the following two means is adopted. One is a means for grasping phase of a certain component on each sub Mach-Zehnder, and the other is a means for generating an order to adjust a modulation signal applied to the first main Mach-Zehnder electrode ($MZ_{CA}$ electrode) and the second main Mach-Zehnder electrode ($MZ_{CB}$ electrode), so that the phase of a certain component is reversed, by using phase information of a certain information grasped by the means for grasping.

The other preferable embodiment of the present invention is an optical FSK modulation system which comprises an intensity modulator which reduces an intensity of a transient signal (i.e., a signal outputted from the main Mach-Zehnder waveguide which is generated in a transient period) by performing intensity modulation.

Concretely speaking, an output signal from the main Mach-Zehnder waveguide is controlled so as to reduce the intensity of the output signal at a timing corresponding to a transient period of the USB signal and the LSB signal. This is realized by synchronizing a control signal of the control part with the modulation signals of the intensity modulator and each Mach-Zehnder waveguide. Thus, transient signals can be suppressed, and preferable FSK modulation signals can be obtained. In other words, the optical FSK modulation system according to the above embodiment properly controls phase difference and suppresses transient signals. Therefore, preferable FSK modulation signals can be obtained.

An intensity modulator may also may be performed so as to suppress the USB signals and the LSB signals. In this case, the whole system outputs transient signals, but the transient signals can be detected by the photodetector and UWB signals can be obtained.

Figure 7:
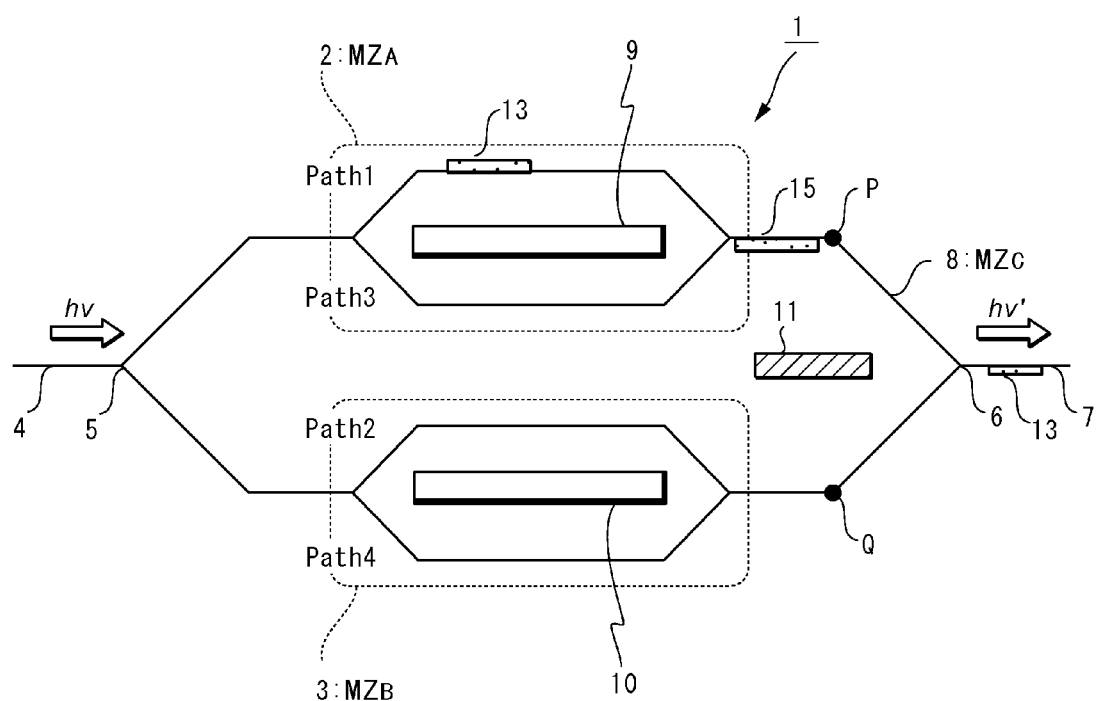
FIG. 7 is a schematic diagram showing a preferable embodiment of the present invention.

FIG. 7 is a schematic block diagram showing a preferable embodiment of the present invention. As shown in FIG. 7, an optical modulator according to this embodiment further comprises an intensity modulator (12) provided on one of two arms composing the first sub Mach-Zehnder waveguide ($MZ_A$) or one of two arms composing the second sub Mach-Zehnder waveguide ($MZ_B$) or two or more of the waveguides. The intensity modulator (12) modulates intensity of the optical signals propagating through the waveguides The arm (Path of FIG. 1) whereon the intensity modulator (12) is provided may be either one of Path1, Path2, Path3, or Path4. It may also be either one of Path1 and Path2, Path1 and Path3, or Path1 and Path4. It may also be either one of Path2 and Path3, or Path2 and Path4. It may also be Path3 and Path4. It may also be Path1, Path2 and Path3. It may also be Path1, Path2 and Path4. It may also be Path1, Path3 and Path4. It may also be Path2, Path3 and Path4. It may also be all the Paths.

One that acts as the intensity modulator provided on the sub Mach-Zehnder waveguide is not specifically limited. But it is, for example, one that has a sub Mach-Zehnder waveguide and an electrode applying electric field to the sub Mach-Zehnder waveguide.

In the optical modulation system according to this embodiment, since it is possible to adjust intensity of a certain component from the sub Mach-Zehnder in advance, components desired to be suppressed can be suppressed more effectively. And by suppressing components to be suppressed and adjusting a phase difference between a USB signal and an LSB signal, a preferable optical FSK modulation system for optical communication can be provided.

Optical FSK Modulation System According to the Third Aspect of the Present Invention An optical FSK modulation system according to the third aspect of the present invention is basically based on the following idea.

By providing a bias voltage control part for applying bias voltage to each bias electrode to an optical modulator, the most appropriate bias voltage level and a preferable operating environment can be obtained even though the optical modulator is in operation.

An optical modulation system according to the third aspect of the present invention further comprises: a first bias adjusting means for adjusting bias voltage applied to the electrode A and the electrode B so as to maximize an intensity of the optical signal outputted from the main Mach-Zehnder waveguide; and a second bias adjusting means for adjusting bias voltage applied to the electrode C, wherein the bias voltage is adjusted so that, assuming the intensity of the optical signal is Max, an intensity of the optical signal is in between 40% to 60%, both inclusive, of the Max (preferably half of the Max), while the bias voltage applied to the electrode A and the electrode B is kept to be the same level as the one obtained in the first bias adjusting means.

Since the optical modulation system according to the third aspect of the present invention has the above arrangement, in addition to the benefit of the optical FSK modulation system according to the first aspect of the present invention, a bias voltage controlling part, as each bias adjusting means, adjusts bias voltage applied to the each electrode from the signal source while receiving information from a photodetector which detects optical signals outputted from each sub Mach-Zehnder waveguide. Therefore, the optical modulation system can adjust bias voltage level to the most preferable level automatically.

The other preferable embodiment of the optical modulation system according to the third aspect of the present invention relates to the above described optical modulation system which further comprises a third bias adjusting means, instead of the second bias adjusting means. The third bias adjusting means applies a dithering signal as a bias voltage to the main Mach-Zehnder electrode, while the bias voltage applied to the sub Mach-Zehnder waveguide is kept to be the same level as the one obtained in the first bias adjusting means. The third bias adjusting means adjusts bias voltage of the main Mach-Zehnder electrode so that an output of a dithering signal component is maximized.

The bias voltage control part is realized by a computer including a computer readable recording media which act as the first bias modulation means and the second bias modulation means. The first bias modulation means outputs a control signal for adjusting bias voltage applied to each sub Mach-Zehnder waveguide so that the intensity of the optical signal outputted from the main Mach-Zehnder waveguide is maximized. And the second bias adjusting means outputs a control signal for adjusting bias voltage applied to the main Mach-Zehnder electrode so that, when the intensity of the optical signal is represented by Max, an intensity of the optical signal outputted from the main Mach-Zehnder waveguide is in between 40% to 60%, both inclusive, of the Max, while the bias voltage applied to the sub Mach-Zehnder waveguide is kept to be the same level as the one obtained in the first bias adjusting means.

The above each means is implemented in a computer and the like which comprises an input device, a memory part, a computing part, a control part and an output part. The input device inputs measured value from the measurement system. The memory part stores the measured value inputted from the input device. The computing part compares the measured value stored in the memory part. The control part, following the input information from the input device, reads a control program stored in the main memory, retrieves each measured value stored in the memory part, and performs a certain control. And an output part outputs a direction on the bias voltage to the signal source based on the computing result from the computing part.

Instead of the second bias adjusting means, the bias voltage control part may contain a third bias adjusting means, which adjusts the bias voltage of the main Mach-Zehnder electrode so that an output of a dithering signal element is maximized by applying a dithering signal as a bias voltage to the main Mach-Zehnder electrode, while the bias voltage applied to the sub Mach-Zehnder waveguide is kept to be the same level as the one obtained in the first bias adjusting means. The dithering signal may be generated by the second bias modulation means with a dithering generation circuit which applies the dithering processing to the staircase wave signal.

For example, by applying m times of dithering to a staircase wave of n steps, the number of steps of the staircase wave becomes (n times m), enhancing the comparative accuracy of the staircase wave signal without increasing the number of steps of the frequency. A dithering generation circuit, for example, includes a feedback frequency divider (abbr. as DIV) and a modulation circuit.

The dithering generation circuit, for example, operates as follows. An output frequency of a voltage controlled oscillator (VCO) is provided to an output terminal and a feedback frequency divider. On the other hand, the modulation circuit receives reference input signal R, generates frequency which applies a certain cycle of fluctuation to an output frequency, and provides the output frequency to the feedback frequency divider. The feedback frequency divider changes the ratio of frequency dividing in the range of about 1% by an output from the modulation circuit in a certain cycle. And then, an output of the feedback frequency divider is provided to a phase comparison circuit. Thus, a dithering signal is generated.

Also, the bias voltage control part may further include the fourth bias adjusting means for outputting a control signal. The control signal adjusts bias voltage applied to each sub Mach-Zehnder waveguide so that the intensity of the optical signal outputted from each sub Mach-Zehnder waveguide is maximized, while the bias voltage applied to the main Mach-Zehnder electrode is kept to be the same level as the one obtained by the second or the third bias adjusting means.

The optical modulator of the present invention may control a phase of the output signal by adjusting bias voltage applied to the main Mach-Zehnder electrode. In this case, in addition to the ordinary operation of the FSK modulation, the bias voltage is applied to the main Mach-Zehnder electrode, thereby enabling to obtain a phase adjusted FSK modulation signal.

Hereinafter, the bias adjusting process according to this embodiment of the present invention is explained. The first bias adjusting step is for adjusting bias voltage of each MZ waveguide so as to maximize an intensity of an optical signal outputted from the main MZ waveguide. In this step, the bias voltage of the electrode C and the two sub MZ electrode is adjusted so as to increase the output from the main MZ waveguide (preferably increased as much as possible, more preferably maximized). Since the main MZ waveguide is connected to a measurement system not shown in figures, the bias voltage applied to each MZ electrode may be adjusted by observing output levels of the measurement system. It is to be noted that "the maximum output" is not in a strict sense of the word, but is the maximum level when each bias voltage is changed in, for example, 5 to 100V. It may also be the maximum level of the samples performed in about 1 to 10V interval.

The measurement system may be connected to a power supply system providing each bias voltage via a control device, and each bias voltage may be controlled so that an optical intensity measured by the measurement system is increased. The control device comprises an input part, an output part, a memory part (including memory and main memory), a computing part, and a control part. The input part inputs information. The output part outputs information. The memory part stores information. And the computing part, such as CPU, performs arithmetic operations or controls. Information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from a controlling program of the main memory, outputs a signal changing bias voltages applied to either one of or two or more of electrodes from the output part. This process changes the intensity level of output light. The control device, retrieving the information and comparing it to the former optical intensity, outputs a direction of changing bias voltages so as to increase the optical intensity from the output part. A power source which received this output signal, based on the direction, changes voltage levels applied to each electrode, thereby increasing the optical output.

The second bias adjusting step is for adjusting bias voltage applied to the main Mach-Zehnder electrode. The bias voltage is adjusted so that, when the intensity of the optical signal observed in the first bias adjusting step is represented by Max, an intensity of the optical signal outputted from the main Mach-Zehnder waveguide is in between 40% to 60%, both inclusive, (preferably half) of the Max, while the bias voltage applied to each sub Mach-Zehnder waveguide is kept to be the same level as the one obtained in the first bias adjusting step.

The voltage control part outputs a direction to maintain bias voltage applied to each sub MZ waveguide at the same level as the one obtained in the first bias adjusting step. Following the direction, the signal source maintains the bias voltage applied to each sub MZ waveguide at a fixed level. The voltage control part, on the other hand, observes an intensity of the optical signal outputted from the main MZ waveguide, compares it to the Max, and outputs a direction to adjust the bias voltage applied to the main MZ electrode. Having received the direction, the signal source adjusts the bias voltage applied to the main MZ waveguide.

Specifically, information on optical intensity measured by the measurement system is inputted to the control device by the input part, and stored in the memory. The CPU of the control device, based on a direction from a controlling program of the main memory, retrieves information on optical intensity from the memory. Also, the CPU of the control device, based on a direction from the controlling program of the main memory, outputs a signal changing the bias voltage applied to the main MZ electrode from the output part. By ding this, the intensity level of output light changes. The control device, retrieving the information and comparing it to the former optical intensity, outputs a direction of changing the bias voltage so as to increase the optical intensity from the output part. The bias signal source which received this output signal, based on the direction, changes voltage levels applied to the main MZ electrode, thereby reducing the intensity of the optical signal from the main MZ waveguide. When the intensity of the output signal from the main MZ waveguide reaches a predetermined level such as one in between 40% to 60%, both inclusive, (preferably half) of the Max, this step is terminated, and the next step will be performed.

The third bias adjusting step is an optional step for adjusting bias voltage applied to each sub Mach-Zehnder waveguide. The bias voltage is adjusted so as to maximize the intensity of the optical signal outputted from each sub MZ waveguide, while the bias voltage applied to the main Mach-Zehnder electrode is kept to be the same level as the one obtained in the second bias adjusting step.

The voltage control part outputs a direction to maintain the bias voltage applied to the main MZ electrode at the same level as the one obtained in the second bias adjusting step. Following the direction, the bias signal source maintains the bias voltage applied to the main MZ electrode at the same level as the one obtained in the second bias adjusting step. The voltage control part, on the other hand, observes an intensity of the optical signal outputted from each sub MZ waveguide, outputs a direction to adjust the bias voltage applied to each sub MZ electrode so as to maximize the each observed level. Having received the direction, the signal source adjusts the bias voltage applied to each sub MZ waveguide.

Specifically, information on optical intensity measured by the measurement system is inputted to the control device by the input part, and stored in the memory. The CPU of the control device, based on a direction from a controlling program of the main memory, retrieves the information on optical intensity from the memory. Also, the CPU of the control device, based on a direction from the controlling program of the main memory, outputs a signal changing the bias voltage applied to each sub MZ electrode from the output part. By ding this, the intensity level of output light changes. The control device, retrieving the information and comparing it to the optical intensity so far stored, outputs a direction of changing the bias voltage so as to maximize the optical intensity from the output part. The bias signal source which received this output signal, based on the direction, changes voltage levels applied to each sub MZ electrode, thereby changing the intensity of the optical signal from each sub MZ waveguide. When the intensity of the output signal from the both of the sub MZ waveguide reaches the maximum level, this step is terminated, thereby enabling to obtain an appropriate bias voltage.

Another embodiment of the present invention is as follows. Instead of the second bias adjusting step, applying a dithering signal (minute vibration signal) as a bias voltage to the main MZ electrode and adjusting the bias voltage of the main Mach-Zehnder electrode so as to maximize an output of a dithering signal element, while the bias voltage applied to the sub Mach-Zehnder waveguide is kept to be the same level as the one obtained in the first bias adjusting step.

The optical FSK modulation system according to the other aspect of the present invention is the optical modulator above described which further comprises a control part for controlling a signal source which applies signals to the first electrode (9), the second electrode (10), and the main Mach-Zehnder electrode (electrode C) (11), wherein the control part makes the signal source (i) adjusts bias voltage applied to the main Mach-Zehnder waveguide ($MZ_C$), and bias voltage applied to the first sub Mach-Zehnder waveguide ($MZ_A$) and the second sub Mach-Zehnder waveguide ($MZ_B$) so that an output from the main Mach-Zehnder waveguide ($MZ_C$) is increased, (ii) adjusts bias voltage applied to the main Mach-Zehnder waveguide ($MZ_C$), so that an output from the main Mach-Zehnder waveguide ($MZ_C$) is decreased, (iii) decreases bias voltage of either one of the first sub Mach-Zehnder waveguide ($MZ_A$) or the second sub Mach-Zehnder waveguide ($MZ_B$) so that an output from the main Mach-Zehnder waveguide ($MZ_C$) is decreased, (iv) adjusts bias voltage applied to the main Mach-Zehnder waveguide ($MZ_C$), so that an output from the main Mach-Zehnder waveguide ($MZ_C$) is decreased.

The optical modulator of this embodiment is able to properly adjust bias voltage applied to each electrode. Therefore, a carrier component ($f_0$) or a high order component (e.g., a second order component ($f_0 \pm 2f_m$)) and the like are able to be suppressed, thereby a higher extinction ratio can be achieved. The bias adjusting method of the optical FSK modulation system according to this aspect basically includes the following steps of:

(i) adjusting bias voltage of the main Mach-Zehnder electrode (electrode C) and bias voltage of the two sub Mach-Zehnder electrodes so as to increase output from the main Mach-Zehnder waveguide ($MZ_C$);

(ii) adjusting bias voltage of the electrode C so as to decrease output from the main Mach-Zehnder waveguide ($MZ_C$);

(iii) decreasing bias voltage of either one of the sub Mach-Zehnder electrodes so as to decrease output from the main Mach-Zehnder waveguide ($MZ_C$); and (iv) adjusting bias voltage of the electrode C so as to decrease output from the main Mach-Zehnder waveguide ($MZ_C$).

Note that it is a preferable embodiment of the present invention to repeatedly perform the above step (iii) and the step (iv). Hereinafter, each step is explained.

(i) Step of Adjusting Bias Voltage of the Electrode C and Bias Voltage of the Two Sub Mach-Zehnder Electrodes so as to Increase Output from the Main Mach-ZEHNDER Waveguide This step adjusts bias voltage of the electrode C and bias voltage of two sub Mach-Zehnder electrodes so that output from the main Mach-Zehnder waveguide is increased (preferably as much as possible, more preferably maximized). Since the main MZ waveguide is, for example, connected to a measurement system, the bias voltage applied to the each Mach-Zehnder electrode may be adjusted by observing output levels of the measurement system.

The measurement system may be connected to a power supply system supplying each bias voltage via a control device, and each bias voltage may be controlled so that optical intensity measured by the measurement system is increased. The control device comprises an input part, an output part, a memory part (including memory and main memory), a computing part. The input part inputs information. The output part outputs information. The memory part stores information. And the computing part such as CPU performs arithmetic operations. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from a controlling program of the main memory, outputs a signal for changing bias voltages applied to either one of or two or more of electrodes from the output part. This process changes the intensity level of output light. The control device, retrieving the information and comparing it to the former optical intensity, outputs an order of changing bias voltages so as to increase the optical intensity from the output part. A power source which received this output signal, based on the order, changes voltage levels applied to each electrode, thereby increasing the optical output.

(ii) Step of Adjusting Bias Voltage of Electrode C so as to Decrease Output from the Main Mach-Zehnder Waveguide This step adjusts bias voltage applied to the main Mach-Zehnder electrode so that intensity of output light from the main Mach-Zehnder waveguide is decreased. Since the main MZ waveguide is connected to a measurement system not shown in figures, the bias voltage applied to the main Mach-Zehnder electrode may be adjusted by observing output levels of the measurement system.

The measurement system may be connected to a power supply system supplying bias voltage to the main Mach-Zehnder electrode via a control device, and the bias voltage may be controlled so that optical intensity measured by the measurement system is decreased. Information on optical intensity measured by the measurement system is inputted to the control device by the input part, and stored in the memory. The CPU of the control device, based on an order from a controlling program of the main memory, retrieves the information on optical intensity from the memory. Also, the CPU of the control device, based on an order from the controlling program of the main memory, outputs a signal for changing bias voltages applied to the main Mach-Zehnder electrode from the output part. This process changes the intensity level of output light. The control device, retrieving the information and comparing it to the former optical intensity, outputs an order of changing bias voltages so as to decrease the optical intensity from the output part. A power source which received this output signal, based on the order, changes voltage levels applied to the main Mach-Zehnder electrode, thereby decreasing the optical output.

(iii) Step of Decreasing Bias Voltage of Either One of the Sub Mach-Zehnder Electrodes so as to Decrease Output from the Main Mach-Zehnder Waveguide In this step, bias voltage of either one of the sub Mach-Zehnder electrodes is decreased so that output from the main Mach-Zehnder waveguide is decreased. In this step, if bias voltage of either one of the sub Mach-Zehnder electrodes is decreased, output from the main Mach-Zehnder waveguide will be decreased. Therefore, bias voltage of the sub Mach-Zehnder electrode, to which output from the main Mach-Zehnder waveguide is decreased, is adjusted to be decreased. In this step, voltage level to be increased or decreased may be predetermined. A range of voltage level change is, for example, from 0.01V to 0.5V, and is preferably from 0.05V to 0.1V. By this step, output intensity from the main Mach-Zehnder is decreased. Since the main Mach-Zehnder waveguide is connected to a measurement system not shown in figures, the bias voltage may be adjusted by observing output levels of the measurement system.

The measurement system may be connected to a power supply system supplying bias voltage to the electrode A and the electrode B via a control device, and the bias voltage applied to the electrode A or the electrode B may be controlled. In this case, information on an electrode whose voltage level is changed and information on voltage level to be changed may be stored in a memory and the like. The CPU of the control device, based on an order from a controlling program of the main memory, retrieves control information from the memory, and outputs a signal for changing bias voltage applied to the electrode A and electrode B. This changes bias voltage applied to the electrode A or the electrode B by a certain amount. And if the bias voltage applied to the electrode A or the electrode B changes by a certain amount, intensity of an optical signal from the main Mach-Zehnder will change. The information on optical intensity observed by the measurement system is inputted from the input part and stored in the memory. The CPU of the control device, based on an order from the controlling program of the main memory, retrieves information on optical intensity stored in the memory, outputs an order from the output part. The order is to change bias voltages applied to the sub Mach-Zehnder electrodes so as to decrease optical intensity from the main Mach-Zehnder waveguide. The power source, having received this output signal, changes the voltage level applied to electrodes based on the order, thereby decreasing optical output.

(iv) Step of Adjusting Bias Voltage of the Electrode C so as to Decrease Output of the Main Mach-Zehnder Waveguide This step adjusts bias voltage of electrode C so as to decrease output of the main Mach-Zehnder waveguide. Since the main MZ waveguide is connected to a measurement system not shown in figures, for example, the bias voltage may be adjusted by observing output levels of the measurement system. It is to be noted that this step or the above step (iii) and this step may be repeatedly performed.

The measurement system may be connected to a power supply system supplying bias voltage to the electrode C via a control device, and bias voltage applied to the electrode C may be controlled. The CPU of the control device, based on an order from a controlling program of the main memory, retrieves control information from the memory, and outputs a signal for changing bias voltage applied to the electrode C from the output part. This changes bias voltage applied to the electrode C by a certain amount.

Also, the CPU of the control device, based on an order from a controlling program of the main memory, retrieves control information or information on output light from the memory, and may make a decision to stop adjusting bias voltage. To the contrary, the CPU may keep adjusting bias voltage by feeding back intensity information of an output light from the measurement system.

The other preferable embodiment of the present invention is an optical modulation system which comprises an optical intensity modulator for modulating an intensity of laser light and an optical frequency shift keying modulation system to which output light from the optical intensity modulator is inputted. The optical intensity modulator decreases intensity of a transient signal by performing intensity modulation so that the intensity of the transient signal, which is a signal generated in a transient period from the optical FSK modulator, is decreased.

The intensity modulation by the above optical modulation system is performed by controlling a switching timing between the USB signal and the LSB signal by adjusting a modulation signal of the controlling part so that a modulation signal of the intensity modulator and a modulation signal of the optical FSK modulation system are synchronized with each other. Thus, transient signals can be suppressed, and preferable FSK modulation signals can be obtained.

An optical modulation system according to the fourth aspect of the present invention is one of the above described optical frequency shift keying modulation systems wherein the third electrode (electrode C) (11) comprises either one of: an electrode (electrode $MZ_{CA}$) (11a) which is provided along a waveguide portion between the combining part of the first sub Mach-Zehnder waveguide ($MZ_A$) (2) and the combining part (6) of the main Mach-Zehnder waveguide ($MZ_C$) (8), and an electrode (electrode $MZ_{CB}$) (11b) which is provided along a waveguide portion between the combining part of the second sub Mach-Zehnder waveguide ($MZ_B$) (3) and the combining part (6) of the main Mach-Zehnder waveguide ($MZ_C$) (8). And the output signal phase adjusting part adjusts the phase difference between the upper side band signal and the lower side band signal outputted from the output part (7) by controlling voltage applied to either one of the electrode $MZ_{CA}$ (11a) and the electrode $MZ_{CB}$ (11b). And the voltage is controlled by the output signal phase adjusting part.

In this embodiment of the optical frequency shift keying modulation system, the third electrode is provided along one sub Mach-Zehnder waveguide in order to particularly apply voltage to one sub Mach-Zehnder waveguide.

Providing either one of the $MZ_{CA}$ (11a) or the $MZ_{CB}$ (11b) on the optical modulation system as above described corresponds that α is 1 or −1. Thus, the optical modulation system is able to perform phase modulation by using $MZ_{CA}$ (11a) or the $MZ_{CB}$ (11b) alone. Also phase modulation can be controlled by applying or not applying a baseband signal to the electrode.

Optical Modulation System According to the Fifth Aspect of the Present Invention An optical modulation system according to the fifth aspect of the present invention is basically based on the following idea.

An intensity modulator such as an optical DSB-SC modulator whose modulation signal is a modulation signal frequency of an optical FSK modulator modulates an optical FSK signal. And a bandpass filter extracts a predetermined optical signal. Since the optical signal has components related to phase information of the optical signal, an optical PSK signal can be obtained. And since the optical FSK modulation system of the present invention is used as an optical FSK modulator, FSK modulation signals which have about the same phases (preferably no phase difference between the USB signal and the LSB signal) can be obtained, and therefore preferable PSK signals can be obtained.

In particular, when the center frequency of an input signal is represented by $f_0$, and the modulation frequencies of an optical FSK modulator and an intensity modulator are represented by $f_m$, an input signal is FSK modulated into a USB signal ($f_0+f_m$) and an LSB signal ($f_0-f_m$). Then these signals are further intensity modulated (DSB-SC modulated). The USB signal ($f_0+f_m$) is modulated into a USB signal ($f_0+2f_m$) and an LSB signal ($f_0$). The LSB signal ($f_0-f_m$) is modulated into a USB signal ($f_0$) and an LSB signal ($f_0-2f_m$). If the components ($f_0$) are extracted from these modulation signals by a band pass filter and the like, the extracted components are represented by the following equation (IIa).

$$Ke^{-j[(-1)^n-\alpha]F(t)}e^{-jn\pi/2};\qquad\text{(IIa)}$$

It is to be noted that the DSB-SC modulation is represented by $j\sin[A'_m(w_m t+\phi_m)]$, and K is a number defined by $\exp(jw_0 t+\pi/4)J_1(A_m)J_1(A'_m)$. And, $\phi_m=n\pi/2$ (where n is an integer). According to the above equation (II), a phase of an output from the intensity modulator changes based on the value of $\alpha$. In particular, suppose n is zero, and if $\alpha$ is zero, the phase of the output signal becomes 90 degrees, and if $\alpha$ is $-1$, the phase of the output signal becomes 180 degrees, and if $\alpha$ is 1, the phase of the output signal becomes 0 degrees. It is can be seen that the optical modulation system having the above described arrangement is able to perform PSK modulation on an optical signal which is FSK modulated by the FSK modulator.

In case the optical FSK signal is converted to the optical PSK signal as above explained, an electric signal which has a modulation frequency of the optical FSK modulation signal is applied to the optical DSB-SC modulator. In general, an optical FSK modulator on the side of an encoder and an optical DSB-SC modulator on the side of a decoder are set far away from each other. It is hence difficult for one signal source to apply modulation signals to both of these modulators. The optical modulation system according to the fifth aspect of the present invention has a synchronization means. The optical modulation system, by using the synchronization means, is able to obtain an electric signal which has a modulation frequency of the optical FSK modulation signal. By applying this signal to a phase modulator such as an optical DSB-SC modulator, an optical PSK signal can be properly obtained even when the modulation signal of the optical FSK modulator is adjusted.

The optical modulation system according to the fifth aspect of the present invention, in particular, comprises: one of the optical frequency shift keying modulation systems above described acting as an optical frequency shift keying (FSK) modulator; an intensity modulator wherein a modulation signal is inputted from the optical frequency shift keying (FSK) modulator; and a bandpass filter for extracting predetermined frequency components from output light of the intensity modulator. And the optical modulation system adjusts frequencies so that a half of a frequency difference between the upper side band (USB) signal and the lower side band (LSB) signal of output light from the FSK modulator becomes equal to a modulation frequency of the intensity modulator.

Since the optical modulation system according to the fifth aspect of the present invention has the above arrangement, an optical FSK modulation signal can be converted to an optical phase shift keying modulation signal.

Figure 8:
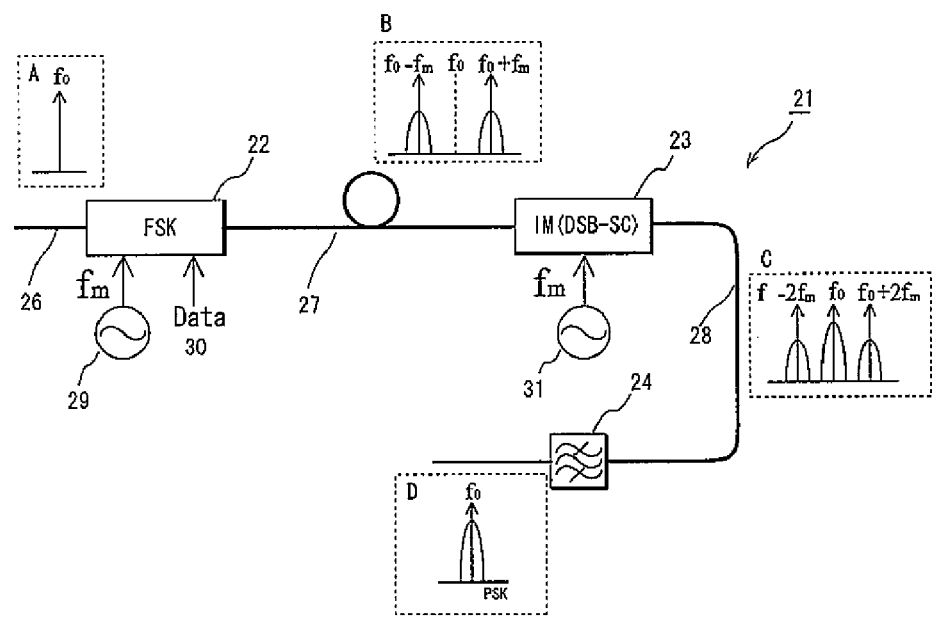
FIG. 8 is a schematic diagram showing a basic arrangement of an optical modulation system according to the fifth aspect of the present invention.

FIG. 8 is a diagram showing a basic arrangement of an optical modulation system according to the fifth aspect of the present invention. As shown in FIG. 8, the optical modulation system (21) according to the fifth aspect of the present invention is an optical conversion system for converting an optical FSK signal to an optical phase shift keying (PSK) signal. The system comprises an optical FSK modulator (22) such as an optical frequency shift keying (FSK) modulator, an intensity modulator (23) such as an optical double sideband suppressed carrier (DSB-SC) modulator wherein a modulation signal is inputted from the optical FSK modulator, and a bandpass filter (24) for extracting predetermined frequency components from output signal of the intensity modulator, wherein a modulation frequency of the optical FSK modulator is equal to a modulation frequency of the intensity modulator.

In FIG. 8, line 26 represents an optical path connected to the optical FSK modulator, line 27 represents a transmission path connecting the optical FSK modulator and the intensity modulator (the optical DSB-SC modulator), line 28 represents a transmission path connecting the intensity modulator, such as the optical DSB-SC modulator, and the bandpass filter, 29 represents a signal source for generating a modulation frequency signal of the optical FSK modulator, and the like. 30 represents a signal source for generating an optical FSK modulation signal (data signal) of the optical FSK modulator, 31 represents a signal source for generating a modulation frequency signal of the intensity modulator (the optical DSB-SC modulator). Although not specifically shown in figures, each signal source contains a control device which controls signal frequency and the like as needed. And, in FIG. 8, A is a conceptual diagram of an input signal, B is a conceptual diagram of output signals of the optical FSK modulator, C is a conceptual diagram of output signals of the intensity modulator (the optical DSB-SC modulator), and D is a conceptual diagram of an output signal of the bandpass filter.

The optical FSK modulation system above described can be used as an optical FSK modulator. If a conventional optical FSK modulator is used to obtain a PSK modulation signal, since the phase of the USB signal and that of the LSB signal do not match, the phase difference between the USB signal and the LSB signal must be considered. But the optical modulation system according to the fifth aspect of the present invention is able to control the phase difference so that, for example, there is no phase difference between the USB signal and the LSB signal. This is because the system has the above mentioned optical FSK modulation system. Thus, a preferable PSK modulation signal can be obtained.

As the intensity modulator of the optical modulation system according to the fifth aspect of the present invention, for example, an optical double sideband suppressed carrier (DSB-SC) modulator is adopted. The intensity modulator is a device for controlling intensity (amplitude) of an optical signal propagating through waveguides. A publicly known variable optical attenuator (VOA) can be used as the intensity modulator. Also, as the intensity modulator, VOA element using LN can be used (see, for example, the Japanese Patent Application Laid-Open 1998-142569). In particular, an optical DSB-SC modulator is, for example, one which adjusts output intensity of an interferometer by inducing refractive index change on one of the arms of a Mach-Zehnder waveguide by thermooptic effect caused by a thin film heater formed on a waveguide as a thermal source (see, for example, the Japanese Patent Application Laid-Open 2000-352699). The optical DSB-SC modulator, for example, comprises a signal source and a phase adjuster for adjusting phases of signals outputted from the signal source. And the phases of electric signals applied to each arm of the Mach-Zehnder waveguide are adjusted so that the phase difference becomes 180 degrees. Since the phase difference between the electric signals applied to the each arm becomes 180 degrees, an optical DSB-SC signal can be outputted. In the optical modulation system according to the fifth aspect of the present invention, a modulation frequency $f_m$ of the optical FSK modulator is applied to the optical DSB-SC modulator. In specific, in case the optical FSK modulator and the optical DSB-SC modulator are not so far away from each other, modulation signals which are generated from the same signal source may be applied to the modulators. Thus, an optical PSK signal can be obtained properly even when a modulation signal of the optical FSK modulator is changed.

In the optical modulation system according to the fifth aspect of the present invention, when the center frequency of an input signal inputted to the intensity modulator is represented by $f_1$, and a modulation frequency of the modulation signal of the intensity modulator is represented by $f_m$, output signals of the intensity modulator are mainly $f_1 \pm f_m$ ($f_1 + f_m$ and $f_1 - f_m$). Among modulators which output signals with these frequencies, one which outputs signals whose $f_1$ components are suppressed, among others, is referred to as an optical DSB-SC modulator. In other words, the optical DSB-SC modulator outputs double sideband optical signals and a frequency component $f_1$ of a carrier signal is suppressed.

This optical DSB-SC modulator, for example, comprises Mach-Zehnder waveguides. And this optical DSB-SC modulator can be manufactured by the same way as the above described optical FSK modulator is manufactured.

The bandpass filter is a filter for removing predetermined frequency components from signals outputted from the optical DSB-SC modulator, and it is a filter for extracting optical signals containing, for example, $f_0$ components. A publicly known optical bandpass filter can be used as the bandpass filter. An example of the basic arrangement of the optical bandpass filter is as follows. Plural basic blocks are laminated on an optical substrate with tie layers. The basic block, for example, comprises a cavity layer and reflection multilayer films. The cavity layer is arranged in the center of the basic block. And the reflection multilayer film comprises high refractive index layers and low refractive index layers which are alternately and symmetry arranged on both sides of the cavity layer. In particular, the optical bandpass filter has a multilayered configuration of total derivative Fabry-Perot etalon. More specifically, tie layers are disposed between cavity layers and these layers are piled up. The cavity, the basic element of the optical bandpass filter, has a configuration of multilayer mirror layer. The mirror layer has a multilayered configuration and the each layer has different refractive index of optical path length λ/4. In the mirror layer which is disposed on and below spacer layers, each refractive index film is symmetrically arranged. Therefore, if a high refractive index film is used for a spacer layer, low refractive index films are used for adjacent layers, and if a low refractive index film is used for a spacer layer, high refractive index films are used for adjacent layers. Also, the mirror layer and its adjacent layer are configured to be a pair of a high refractive index film and a low refractive index film, or the adjacent layer is disposed one more layer and the remaining layers are configured to be a pair of a high refractive index film and a low refractive index film, thereby the layers will be 2n layers or 2n+1 layer (n is an integer more than 1, and represents each refractive index film). Thus, in addition to the types of refractive index film of the above mentioned spacer layer, there are four types of film structures. And a matched layer, which is composed of one or more of layers, to incident media is disposed on the top layer of the filter.

In the optical modulation system according to the fifth aspect of the present invention, an amplifier and a polarization controller (PC) may be provided on a light path as needed. A transmission path (27) which connects the optical FSK modulator and the optical DSB-SC modulator is, for example, an optical fiber transmission path. It may also be a single mode fiber.

Hereinafter, operation of the optical modulation system according to the fifth aspect of the present invention is explained by referring to figures. In the following, the operation of the optical modulation system which uses an optical FSK modulator with a third electrode (one-electrode-type third electrode) and an optical DSB-SC modulator as an intensity modulator is explained. An optical signal is inputted to an optical path (26) which is connected to the optical FSK modulator. The optical signal has frequency $f_0$ as shown in FIG. 8 area A. A signal with frequency $f_m$ is applied to the optical FSK modulator (22) as a modulation signal. Specifically, signals with frequency $f_m$ and a phase difference of 90 degrees are respectively applied to the first electrode and the second electrode of the optical FSK modulator. Then signals with phase difference according to the modulation frequency $f_m$ are outputted. Optical spectra of a USB signal and an LSB signal are shown in FIG. 8 area B. That is to say, a center frequency of the USB signal is $f_0 + f_m$ and a center frequency of the LSB signal is $f_0 - f_m$. In the optical frequency shift keying, this switchover between the USB signal and the LSB signal is used as information. And this switchover between the USB signal and the LSB signal can be performed by controlling voltage applied to the third electrode. As shown in FIG. 8 area B, an optical FSK signal is a carrier suppressed signal in which frequency $f_0$ components are suppressed, and USB signals and LSB signals are extracted and outputted. If the USB signal represents "1", and the LSB signal represents "0", information can be transmitted by switching the USB signal and the LSB signal. The output signal of the optical FSK modulator is represented by the following equation (1a)

Equation (1a)

$$R = e^{j[\omega_0 t + \pi/4]}[\cos[f(t) + \pi/4]J_1(A_m)e^{j\omega_m t} + i\sin[f(t) + \pi/4]J_1(A_m)e^{-j\omega_m t}], \quad (1a)$$

In the above equation (1a), the input signal is represented by $\exp(i w_0 t)$, and high order term is ignored. Phase modulation of the optical signal performed in the $MZ_A$ of FIG. 1 is represented by $A_m \cos w_m t$ ($w_m = 2\pi f_m$). On the other hand, phase modulation of the optical signal performed in the $MZ_B$ is represented by $A_m \sin w_m t$ because of the phase difference of 90 degrees. The phase modulation amount from point P to the combining part of the both arms of the main Mach-Zehnder shown in FIG. 1 is represented by function f(t). And this function can be controlled by controlling voltage applied to the electrode $RF_C$. On the other hand, the phase modulation amount from point Q to the combining part of the both arms of the main Mach-Zehnder shown in FIG. 1 is represented by function −f(t). For example, if f(t) is −π/4 (i.e., −45 degrees), the optical FSK modulator outputs a USB signal. On the other hand, if f(t) is π/4 (i.e., 45 degrees), the optical FSK modulator outputs an LSB signal. The velocity of switchover between a USB signal and an LSB signal depends on a bandwidth of the third electrode (electrode C). If a traveling-wave-type electrode, which has a bandwidth of about 18 GHz, is used as the third electrode, a high-speed switchover can be performed.

The output signal of the optical FSK modulator is inputted to an intensity modulator (e.g., optical DSB-SC modulator) through a transmission path (27). The modulation frequency of the optical DSB-SC modulator is $f_m$. If a USB signal (center frequency: $f_0 + f_m$) of an optical FSK signal is inputted to the optical DSB-SC modulator, an optical signal whose center frequency is $f_0 + 2f_m$ and an optical signal whose center frequency is $f_0$ are outputted as DSB-SC signals. On the other hand, if an LSB signal (center frequency: $f_0-f_m$) of the optical FSK signal is inputted to the optical DSB-SC modulator, an optical signal whose center frequency is $f_0$ and an optical signal whose center frequency is $f_0-2f_m$ are outputted as DSB-SC signals. In this way, whether the optical FSK signal inputted to the optical DSB-SC modulator is a USB signal or an LSB signal, there remains a center frequency $f_0$ component in the output optical signal of the optical DSB-SC modulator. Therefore, the output signals of an optical DSB-SC modulator will be ones shown in FIG. 8 area C.

On the other hand, the optical DSB-SC modulation can be represented by the following equation (2a).

Equation 2a $$i \sin(A'_m \sin \omega_m t), \qquad (2a)$$

Where $A'_m \sin w_m t$ represents phase modulation amount on each arms of the sub Mach-Zehnder waveguide composing the optical DSB-SC modulator. Output light of the optical DSB-SC modulator is modulated by optical FSK modulation and optical DSB-SC modulation. And, the optical FSK modulation is represented by the equation (1a), and the optical DSB-SC modulation is represented by the equation (2a). Thus, the output signal of the DSB-SC modulator is represented by the following equation (3a) which is obtained by multiplying the equation (1a) and the equation (2a).

Equation (3a)

$$e^{j[\omega_0+\pi/4]}[\cos[f(t)+\pi/4]J_1(A_m)e^{j\omega_m t} + \\ i\sin[f(t)+\pi/4]J_1(A_m)e^{-j\omega_m t}]J_1(A'_m)\{e^{j\omega_m t}-e^{-j\omega_m t}\}, \qquad (3a)$$

Next, the output signal of the DSB-SC modulator passes through the bandpass filter (24). This bandpass filter is a filter through which light of only certain restricted frequencies between $f_0-f_m$ and $f_0+f_m$ ($f_0$ is the center frequency) can pass. It may be a filter through which light of frequencies between $f_0-0.5f_m$ and $f_0+0.5f_m$ can pass. It is to be noted that only optical signals of center frequency $f_0$ passes through the filter, but optical signals of center frequency $f_0 \pm f_m$ cannot pass through the filter. That is to say, the output light of the bandpass filter will be one shown in FIG. 8 area D. Look at a spectrum from a frequency point of view, it seems that basic information of the optical FSK system such as USB signals and LSB signals are lost. If so, this optical modulation system is a useless system.

On the other hand, removing a center frequency $f_0 \pm f_m$ component means removing frequency $f_0 \pm f_m$ component of the equation (3a). In short, the output optical signal of the bandpass filter can be represented by the following equation (4a).

Equation (4a)

$$-e^{j\omega_0 t - jf(t)} \times J_1(A_m)J_1(A'_m), \qquad (4a)$$

In other words, an optical phase of the output signal of the bandpass filter is represented by a function including f(t) which represents a switching signal of the optical FSK modulator. This means that a modulation signal of the optical FSK modulator could be converted to an optical phase modulation signal. In this way, the optical modulation system according to the fifth aspect of the present invention is able to perform optical FSK modulation, and is further able to convert the FSK modulated signal into a PSK modulated signal.

The Second Embodiment of the Optical Modulation System According to the Fifth Aspect of the Present Invention In the real communication system, it is assumed that an optical FSK modulator and an intensity modulator (optical DSB-SC modulator) are located far away from each other. Even in this case, modulation frequencies which are applied to the optical FSK modulator and the intensity modulator must be adjusted to the same level. Therefore, it is difficult to supply the same level of modulation frequency to the optical FSK modulator and the optical DSB-SC modulator from the same power source. On the other hand, in case modulation frequency signals, which are generated from other signal sources, are respectively applied to the optical FSK modulator and the optical DSB-SC modulator, if a modulation signal of the optical FSK modulator is adjusted, a modulation signal of the optical DSB-SC modulator must be adjusted as well in accordance with the adjustment of the modulation signal of the optical FSK modulator.

In order to solve the above problem, the optical modulation system according to the fifth aspect of the present invention is made to apply an electric signal having modulation signal frequency of the optical FSK modulator to the optical DSB-SC modulator when converting an optical FSK signal to an optical PSK signal. Thus the optical conversion system which is able to operate the optical DSB-SC modulator even when the modulation signal frequency of the optical FSK modulator is adjusted is provided. The optical modulation system according to the fifth aspect of the present invention described below includes a predetermined synchronizing means. The system is able to obtain an electric signal having modulation frequency of the optical FSK modulator by using the synchronizing means, and is able to apply this electric signal to the optical DSB-SC modulator. Therefore, even when the modulation signal of the optical FSK modulator is adjusted, an optical PSK signal can be generated properly.

Figure 9:
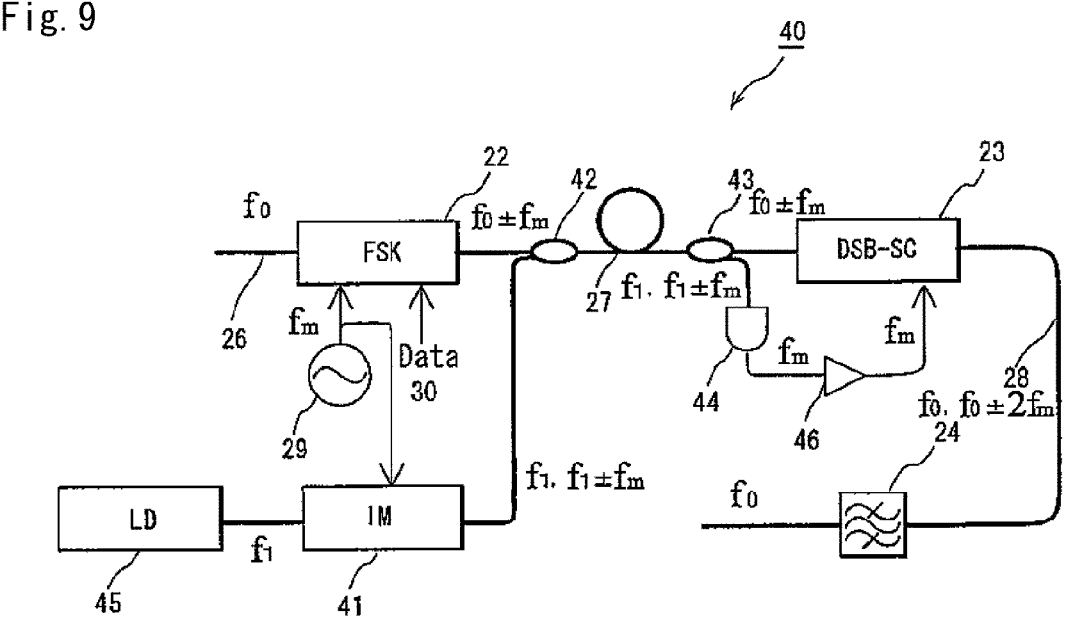
FIG. 9 is a schematic diagram showing a basic arrangement of the second embodiment of an optical modulation system according to the fifth aspect of the present invention.

FIG. 9 is a diagram showing a basic arrangement of the second embodiment of the optical modulation system according to the fifth aspect of the present invention. As shown in FIG. 9, the second embodiment of the optical modulation system (40) according to the fifth aspect of the present invention is an optical conversion system which comprises an above described optical FSK modulation system as an optical modulator (22), an intensity modulator (41), a first coupler (42), a transmission path (27), a second coupler (43), a photodetector (44), an (optical) intensity modulator (23), and a bandpass filter (24). The modulation signal of the optical FSK modulator, as a modulation signal (electric signal), is applied to the intensity modulator (41). The output optical signal of the optical FSK modulator and the output optical signal of the intensity modulator are combined at the first coupler (42). The optical signal combined at the first coupler is propagated through the transmission path (27). The optical signal propagated through the transmission path (27) is branched to an output optical signal component of the optical FSK modulator and an output optical signal component of the intensity modulator at the second coupler (43). The output optical signal component of the intensity modulator branched at the second coupler is converted to an electric signal by the photodetector (44). The output optical signal component of the optical FSK modulator branched by the second coupler is inputted to the (optical) intensity modulator (23), and an electric signal outputted from the photodetector is applied to the (optical) intensity modulator (23) (in FIG. 9, the (optical) intensity modulator is represented by DSB-SC (optical DSB-SC modulator) which is a typical optical intensity modulator, same below). A predetermined optical signal of output signals of the intensity modulator (23) is extracted by the bandpass filter (24).

In FIG. 9, the elements which have the same function as those depicted in FIG. 8 have the same code. The operations of those elements are omitted, since they are understood from the forgoing description. In FIG. 9, 45 is a light source such as a laser diode. And 46 is an optional intensity amplifier.

As the intensity modulator (41) of this embodiment, a publicly known intensity modulator which is used for optical information communication can be used. In particular, the same as the optical DSB-SC modulator above described, the one having a Mach-Zehnder waveguide and electrodes provided on each arms can be used as the intensity modulator.

The coupler (42) of this embodiment is not specifically limited if it is able to combine optical signals. A publicly known coupler (optical coupler) can be adopted.

The coupler (43) of this embodiment is, for example, a branching filter. As the branching filter, a publicly known branching filter such as an interleaver can be adopted. Since the light branched by the branching filter are an optical signal (optical FSK signal) with frequency domain around $f_0$ and a signal (modulation signal) with a center frequency of frequency domain around $f_1$, one that is able to branch these signals is used. Note that $f_1$ is a center frequency of LD (45) which is inputted to the intensity modulator. The interleaver is a device having a characteristic that can branch an incoming wavelength multiplexed optical signal into a pair signal systems whose wavelength interval is doubled and conversely combines a pair of wavelengths multiplexed signals into one signal system whose wavelength interval is halved. According to the interleaver, a sharp signal transmitting wavelength region can be obtained, so that signals of adjacent channels can be reliably separated, thereby preventing a mixture of another wavelength and a degradation of the communication quality. An interleaver is, for example, a fiber-type interleaver including a plurality of fiber computers, a multilayered interleaver including a multilayered film and a prism, a multiple inflection plate-type interleaver including a multiple inflection plate and a polarized wave separating device, and a waveguide-type interleaver using a waveguide. More specifically, it is Nova-Interleavers manufactured by Optoplex Corporation, OC-192 and OC-768 manufactured by Nexfon Corporation.

The photodetector of this embodiment is a means for detecting an optical signal, and converting the optical signal to an electric signal. As the photodetector, a publicly known photodetector can be adopted. As the photodetector, for example, one detecting an optical signal and converting it to an electric signal can be used. Intensity, frequency, and the like of an optical signal can be detected by the photodetector. As the photodetector, for example, one described in [Hirho Yonetsu, "Optical Communication Element Engineering (light-emitting, light-receiving element)" Kougakutosyo Ltd. the 6th edition, 2000] can be adopted as needed.

The light source (45) of this embodiment is a device for generating light such as laser light. For example, the light source specifically is a diode, a laser diode, and the like.

As the intensity amplifier (46) of this embodiment, a publicly known amplifier which amplifies an electric signal can be used. The publicly known amplifier is, for example, tandemly connected even-number inverters.

The optical conversion system of this embodiment applies an FSK modulation signal ($f_m$) which consists of a sinusoidal wave and the like to the intensity modulator (41) as well as the optical FSK modulator (22). And light which is intensity modulated at modulation frequency $f_m$ becomes a pulse signal having a cycle related to frequency $f_m$. The optical signal and the optical FSK signal which are intensity modulated by the coupler (42). The combined signal has a frequency component ($f_0 \pm f_m$) generated from the optical FSK signal and a frequency component ($f_m$) generated from the modulation frequency.

This optical signal propagates through the transmission path (27) such as an optical fiber. And the signal is branched by the coupler (43) before it is inputted to the intensity modulator (optical DSB-SC modulator). Components of frequency $f_0$ of the branched signals are extracted as electric signals by the photodetector (44). And then amplitude compensation is performed by the amplifier (46) as needed. This electric signal with frequency $f_0$ is applied to the intensity modulator (optical DSB-SC modulator) as a modulation signal. By so ding, even when the modulation signal of the optical FSK modulator has changed, an electric signal having the same frequency as the modulation signal is applied to the intensity modulator (optical DSB-SC modulator).

The Third Embodiment of the Optical Modulation System According to the Fifth Aspect of the Present Invention FIG. 10 is a diagram showing a basic arrangement of the third embodiment of an optical modulation system according to the fifth aspect of the present invention. FIG. 10(A) shows an example that a component having frequency $2f_m$ is once extracted, and the frequency of the component is halved by a frequency divider, and then the component is applied to an intensity modulator. On the other hand, FIG. 10(B) shows an example that a component having frequency $f_m$ is extracted, and then the component is applied to an intensity modulator.

As shown in FIG. 10(A), the optical conversion system according to the third embodiment comprises an optical FSK modulation system, a transmission path (27), a coupler (51), a clock recovery means (52), a frequency divider (53), an intensity modulator (23), and a bandpass filter (24). The FSK modulation system acts as an optical FSK modulator (22). The transmission path (27) transmits an output signal from the optical FSK modulator. The coupler (51) branches the optical signal which has propagated through the transmission path (27). The clock recovery means (52) extracts electric signals having frequency components ($2f_m$) which have twice the frequency of the modulation signal of the optical FSK modulator from the optical signals branched at the coupler. The frequency divider (53) halves the frequency of the electric signals, extracted by the clock recovery means, having frequency components which have twice the frequency of the modulation signal of the optical FSK modulator. The intensity modulator (23), such as an optical DSB-SC modulator, to which output signals of the optical FSK modulator branched by the coupler are inputted, and the electric signals outputted from the frequency divider are applied as a modulation signal. The bandpass filter (24) extracts predetermined optical signals from the output signals of the intensity modulator.

In FIG. 10, the elements which have the same function as those depicted in FIG. 8 have the same code. The operations of those elements are omitted, since they are understood from the forgoing description.

The coupler (51) of this embodiment is not specifically limited if it is able to branch optical signals. A publicly known coupler can be adopted.

The clock recovery means (52) is a means for extracting electric signals having frequency components which has twice the frequency of the modulation signal of the optical FSK modulator. As a clock recovery means, a publicly known clock and data recovery module can be adopted.

In the ultra high speed optical communication, a transmitter-side modulates light with a data signal which is synchronized with a standard clock signal, and then outputs the light. And the receiver-side performs clock and data recovery operation on this modulated signal. The device which is developed for this purpose is the clock and data recovery module. The clock and data recovery module normally recovers clock and data signal by a device on the receiver-side. But in the present invention, this can be used as a means for extracting electric signals having frequency components which have twice the frequency of the modulation signal of the optical FSK modulator. As a clock and data recovery module, for example, a phase synchronization loop type clock and data recovery module manufactured by Yokogawa Electric Co. can be used. The phase synchronization loop type clock and data recovery module is preferable because the phase synchronization loop has a transmitter inside and is able to maintain frequency of data even when data transfer is interrupted. A clock and data recovery module with low jitter is preferable.

A phase lock circuit for realizing a clock and data recovery module using phase lock loop method is, for example, described in [T. Enzaka "Design and Application of PLL Circuit—Calculation and Verification of Loop Filter Constant" CG Publication Co.] The phase lock circuit, for example, basically comprises a phase comparator for comparing phases of two input signals, a low pass filter (LPF) for averaging direct current signals including ripples from the phase comparator and removing alternate current components, and a variable controlled oscillator (VCO) for controlling oscillating frequency by input (direct current) signals, and to which an output signal of the low pass filter is inputted. Note that if a frequency divider described below is set between an output of the VCO and an input of the phase comparator, a frequency which is generated by dividing input frequency and the VCO output frequency is synchronized. In other words, oscillating frequency of the VCO is controlled to be frequency-divided by the frequency dividing ratio. In a phase comparator, basically, an input signal (reference frequency signal) and an output signal of the VCO (e.g., signal via a frequency divider) is inputted, and a phase difference between the signals are outputted as an electric voltage or an electric current. As the VCO circuit, a publicly known VCO circuit can be used, and not specifically limited. And as the VCO circuit, one having multi-vibrator or LC resonance circuit can be used. Output frequency of the VCO covers $2f_m$.

In specific, A PLL circuit, for example, comprises a reference oscillator for outputting frequency f, a phase comparator, a low-pass filter (LPF), an output terminal for outputting signals of a voltage controlled oscillator (VCO) and this PPL circuit of frequency F, and a variable frequency dividing circuit for dividing an output signal of frequency F by frequency dividing ratio N (by using dividing ratio assignment signal) and inputting this divided signal to the phase comparator. The frequency dividing ratio N of this PLL circuit is set to a certain ratio based on dividing ratio assignment signal (In other words, the frequency divider is a programmable frequency divider). The frequency F of a signal from the output terminal is divided by the variable frequency dividing circuit into frequency F/N. Then, a signal of this frequency F/N and an output signal of frequency f from the reference oscillator are inputted to the phase comparator. The phase comparator detects a phase difference between these signals and outputs direct current voltage according to the phase difference to the LPF. The LPF removes high-pass signals which are unnecessary for control voltage of the VCO, and outputs only low-pass signals to the VCO. The VCO, based on a signal from the LPF, controls frequency F of the output signal and performs feedback control so that F/N becomes f. The above described feedback control loop (VCO→variable frequency divider→phase comparator→LPF→VCO) is referred to as a Phase Lock Loop.

A frequency divider (53) is a device for halving frequency of an electric signal having a frequency component twice a modulation signal of the optical FSK modulator extracted by a clock recovery means. As a frequency divider, a publicly known frequency divider can be used, and it is not specifically limited.

As a frequency divider, one having a toggle flip-flop (T-FF) can be used. A T-FF is, for example, a Master Slave T-FF or a dynamic T-FF. A frequency divider (90 GHzInPHBT dynamic Frequency Divider manufactured by NTT) can be used. In specific, this frequency divider has a dynamic T-FF, a buffer, an MST-FF, a buffer, an MST-FF, a dynamic T-FF, an MST-FF, and a driver connected in series in this order. This frequency divider, in a high-speed (more than 40 Gbit/s) optical conversion system, is able to generate low-speed clock signals by using clock signals extracted from received signals. A frequency divider having CMOS flip-flop (see, for example, FIGS. 3 and 4 of JP Patent No. 3477844) can also be used. This frequency divider has three D-type flip-flop connected in cascade. And each D-type flip-flop is composed of a plural number of inverters. More specifically, a P-channel transistor and an N-channel transistor of the CMOS are push-pull connected by an inverter.

As the other frequency divider, as shown in FIG. 6 of JP Patent No. 3435751, a frequency divider comprising a counter having a set value M (e.g., M=2) and an AND circuit to which an input signal of the counter and an output signal of the counter are inputted can be used. The counter counts the input signals, and provides one-cycle interval of low output every M cycle. Then, the AND circuit performs OR operation between the input signal and the output signal of the counter, and outputs signals which is generated by the operation. Therefore, one-cycle interval of pulse is removed from the output of the AND circuit every M cycle. For example, if M=2, one-cycle interval of pulse is removed every 2 cycle. Therefore, signal cycle will be doubled, and signals with half the frequency of an input signal will be outputted.

As the other frequency divider, as shown in FIGS. 5 and 6 of JP Patent No. 3585114, a frequency divider having a frequency divider integrated circuit can be used. A frequency divider integrated circuit 1 composing the frequency divider has a terminal SW1 and a terminal SW2. And the frequency divider is able to switch frequency division ratio among 1/2, 1/4, and 1/8 based on "H" level or "L" level of control signals applied to the terminal SW1 and the terminal SW2.

The frequency divider integrated circuit 1 is, for example, an MC12093 manufactured by Motorola Co. The frequency divider has a terminal SB (a terminal for stand-by mode), a terminal IN (an input terminal), a terminal IN bar, a terminal Vcc (a power source terminal), a terminal GND (an earth terminal), and a terminal OUT (an output terminal). An input signal is inputted in the terminal IN via a coupling condenser. And a terminal IN bar is connected to the ground via the other coupling condenser. And the frequency divider is configured so that the frequency division ration becomes 1/2 when levels of the control signals applied to the terminal SW1 and terminal SW2 are both "H" level.

An output of the optical FSK modulator, in fact, contains several components. The optical conversion system according to this embodiment extracts electric signals having frequency $f_m$ by using these frequency components, and uses the electric signals as modulation signals of an intensity modulator (an optical DSB-SC modulator). In particular, optical FSK signals are generated by high-frequency signals $f_m$ outputted from the signal source (29). The optical FSK signal contains several frequency components. And the optical FSK signal is branched by the coupler (51). The components branched by the coupler are transmitted to the clock replay means. The clock replay means extracts components having frequency $2f_m$ and converts the components to electric signals having frequency $2f_m$. And the frequency divider converts the electric signals having frequency $2f_m$ extracted by the clock recovery means into electric signals having half the frequency of the electric signals extracted by the clock recovery means. The electric signals having frequency $f_m$ thus obtained are applied to the intensity modulator (the optical DSB-SC modulator) as modulation signals. This enables, when the modulation signal of the optical FSK modulator is adjusted, the modulation signal applied to the optical DSB-SC modulator to be also adjusted in accordance with the adjustment of the modulation signal of the optical FSK modulator.

Note that FIG. 10(B) is a schematic diagram showing a system wherein the clock recovery means directly obtains electric signals having frequency $f_m$. In this example, since electric signals having frequency $f_m$ are obtained by the clock recovery means, the frequency divider is not particularly required. And, the electric signals obtained are applied to the intensity modulator (the optical DSB-SC modulator) as modulation signals.

The Fourth Embodiment of an Optical Modulation System According to the Fifth Aspect of the Present Invention FIG. 11 is a diagram showing a basic arrangement of the fourth embodiment of an optical modulation system according to the fifth aspect of the present invention. FIG. 11(A) shows an example that a component having frequency $2f_m$ is extracted, and the frequency of the component is halved by a frequency divider, and then the component is applied to an intensity modulator. On the other hand, FIG. 11(B) shows an example that a component having frequency $f_m$ is extracted, and then the component is applied to the intensity modulator.

As shown in FIG. 11, an optical conversion system (60) according to the forth embodiment comprises an optical FSK modulation system acting as the optical FSK modulator (22), a transmission path (27) trough which an output signal form the optical FSK modulator propagates, an intensity modulator (23) such as an optical DSB-SC modulator to which an output signal of the optical FSK modulator is inputted, a coupler (61) for branching output light of the intensity modulator, a photodetector (44) for detecting optical signals branched by the coupler, a frequency divider (53) for halving frequency of an electric signal outputted from the photodetector, and a band pass filter (24) for extracting a predetermined optical signals outputted from the intensity modulator. And an output signal of the frequency divider is inputted to the optical conversion system as a modulation signal of the intensity modulator.

In FIG. 11, the elements which have the same function as those depicted in FIGS. 8 to 10 have the same code. The operations of those elements are omitted, since they are understood from the forgoing description. The coupler described in the third embodiment can be applied to the coupler (61) herein described.

An output light of the intensity modulator (23) such as an optical DSB-SC modulator includes components of frequency $2f_m$. The output light of the intensity modulator (23) is branched by the coupler (61). And the branched optical signals are converted into electric signals by the photodetector (44). After amplitude compensation is performed on the electric signals as needed, the electric signals are transmitted through a band pass filter not shown in figures, and then electric signal components having frequency $2f_m$ are extracted. The frequency $2f_m$ of the extracted electric signals are halved by the frequency divider, and the electric signals with frequency $f_m$ thus obtained are applied to the intensity modulator (23).

Note that FIG. 11(B) is a schematic diagram showing a system wherein the photodetector directly obtains electric signals having frequency $f_m$. In this example, since electric signals having frequency $f_m$ are obtained by the photodetector, the frequency divider is not particularly required. And the electric signals thus obtained are applied to the intensity modulator (the optical DSB-SC modulator) as modulation signals.

An optical modulation system according to the sixth aspect of the present invention is based on the following idea.

Transient signals which are generated when a USB signal and an LSB signal is switched can be adjusted by controlling a phase difference between the USB signal and the LSB signal. By suppressing components corresponding to the USB signal and the LSB signal by the optical intensity modulator, and by extracting transient signals, preferable UWB signals can be obtained.

The optical modulation system according to the sixth aspect of the present invention, in particular, relates to an UWB signal generating system. The UWB signal generating system comprises an optical intensity modulator which modulates intensity of laser light and one of the above described optical frequency shift keying modulation systems to which output light from the optical intensity modulator is inputted. The UWB signal generating system may comprise one of the above described optical frequency shift keying modulation systems and an optical intensity modulator for modulating intensity of an output signal from the system.

It is to be noted that in the optical modulation system according to the sixth aspect of the present invention, the FSK modulation system is preferably synchronized with a modulation signal of the optical intensity modulator. And the system has a control part for controlling to suppress the FSK signal. Since the system has this control part, modulation signals are adjusted, and then FSK modulation and optical intensity modulation are performed on the adjusted signal. Therefore UWB signals can effectively be obtained.

Note that in the optical modulation system according to the sixth aspect of the present invention, by controlling a phase difference between a USB signal and an LSB signal to become 180 degrees, a particularly preferable UWB signals can be obtained.

The UWB signal generation system according to the sixth aspect of the present invention relates to an UWB signal generation system using the above described optical frequency shift keying modulation system. In particular it relates to an UWB signal generation system comprising an optical intensity modulator for modulating intensity of laser light and an optical frequency shift keying modulation system to which output light from the optical intensity modulator is inputted.

In recent years, a UWB technique has attracted attention in an effort to further increase in speed of short-distance wireless communication in a wireless LAN or the like. The UWB is an abbreviation of an Ultra Wide Band. The UWB technique is a wireless communication technique using a short-pulse RF signal. The UWB technique is characterized in that a frequency band occupied by a signal is ultra wide. At the present, a frequency is allocated in a microwave band under FCC in the USA, and the UWB technique is developed in an effort to realize the UWB technique around a several gigahertz band. On the other hand, in research institutes, a millimetric-wave band UWB technique also begins to be examined to realize a gigabit class wireless LAN. As methods of generating UWB signals, an IR (Impulse Radio) and a DS-SS (Direct Sequence Spread Spectrum) method are known for generating UWB signals.

In the IR (Impulse Radio) device, since only an electric pulse matched with the characteristics of the antenna is outputted, the electric pulse cannot be transmitted simultaneously with another signal. Another disadvantage is that the signal generator must use pulse light. In the signal generator, since the output pulse mainly depends on the characteristics of the antenna, a center frequency or a band is disadvantageously limited. In the signal generator, many pieces of light having frequencies which are not actually transmitted are wastefully generated.

In a UWB signal generator based on the DS-SS (Direct Sequence Spread Spectrum) method, a microwave/millimetric-wave UWB signal is generated by an optical heterodyne method. The UWB signal generator includes a signal source, two lasers, a phase lock loop, a Mach-Zehnder modulator, a bias power supply, a pulse pattern generator, a photodiode, and a spectrum analyzer. In the signal generator, the Mach-Zehnder modulator superposes carrier signals by phase modulation, the two lasers are synchronized in phase by the phase lock loop, and a UWB signal is generated by heterodyne extraction. In the signal generator, a stability control mechanism is disadvantageously complex and expensive.

It is an object of the UWB signal generation system according to the sixth aspect of the present invention to particularly provide a UWB signal generator using an optical FSK modulator which can be used in optical information communication. It is another object of the system to particularly provide a UWB signal generator which can use CW (continuous wave) light as laser light. It is another object of the system to particularly provide a UWB signal generator which can be used in wavelength division multiplexing (WDM) communication.

In an optical FSK modulator, an upper sideband and a lower sideband which are transiently, simultaneously generated in a switching operation interferes with each other to generate a component having a frequency which is twice a modulation frequency of the optical FSK modulator. When output light from a modulator is guided to a photodetector (high-speed photodetector) which can respond to a frequency component having a frequency which is a frequency difference or more of the two components (which is twice the frequency of the modulation signal), an RF signal having a frequency corresponding to the frequency difference is generated only while the two components are simultaneously generated. Since this phenomenon is a transitive phenomenon occurring in a frequency switching state, when a signal for switching optical frequencies is assumed as a rectangular pulse having short rise/fall time, an RF signal can be generated.

In particular, a rise time of repeated rectangular pulse of a modulation signal is set as 5%. The UWB signal generator using the optical FSK modulator of the present invention (simply referred to as "a UWB signal generator of the present invention" below) outputs this RF signal (microwave/millimetric-wave pulse) as a USB signal.

The USB signal generation system, since adopting the above described optical frequency shift keying modulation system, comprises an output signal phase adjusting part for adjusting a phase difference between an upper sideband (USB) signal and a lower sideband (LSB) signal, thereby being able to adjust a phase difference between a USB signal and an LSB signal. A USB signal and an LSB signal of an FSK signal, thus obtained, for example, are adjusted to have reversed phases each other. Therefore, a UWB signal can be effectively obtained.

An example of the UWB signal generation system of the present invention comprises a laser source, an optical intensity modulator, an optical FSK modulation system above described acting as an optical frequency shift keying (optical FSK) modulator, and a photodetector for detecting output of the optical FSK modulator.

The laser light source is a device for generating laser light. As the laser light source, a laser light source having a CW wavelength can also be used. In a conventional UWB signal generator, a pulse light source must be adopted as a light source. However, in the present invention, a method that generates an UWB signal by an antenna as in the conventional UWB signal generator is not adopted, and an optical FSK method is adopted. For this reason, a laser light source having a CW wavelength can be used. The laser light source includes a semiconductor laser. A laser device in which an optical intensity modulator (to be described later) is built may also be used.

As the number of frequency of the light outputted from the laser light source, 100 THz or more is preferably set because stable laser light can be used. It is preferably set at 170 THz or more because an existing fiber can be used. It is more preferably set at 190 to 250 THz because information can be transmitted through a fiber with low loss.

As an intensity of light outputted from the laser light source, 0.1 mW or more is set, 1 mW or more is preferably set, or 10 mW or more is more preferably set.

The optical intensity modulator is a device for modulating an intensity of laser light from the laser light source. As the optical intensity modulator, a known optical intensity modulation can be adopted. As such an optical intensity modulator, an LN modulator or the like is used. The optical intensity modulator modulates amplitude of the laser light. At this time, a band width of the modulated laser light is set at $\Delta f_{sig}$ in this specification. As the optical intensity modulator, a modulator which is built in a laser device and which directly modulates laser light may be used. However, an optical intensity modulator arranged independently of the laser light source is preferably used.

Hereinafter, a logical explanation of obtaining a UWB signal is made. In the beginning, a mathematical expression about an output spectrum of the optical FSK modulator will be described below. In the optical FSK system, as an electrode corresponding to the third electrode of an optical SSB modulator, a traveling wave type electrode coping with high-speed switching is preferably adopted in order to realize high-speed code switching. An output spectrum of the optical FSK modulator can be basically interpreted like an output spectrum of the optical SSB modulator. Since a large number of examples of the output spectrum of the optical SSB modulator are reported, the output spectrum of the optical SSB modulator will be described below.

When a modulation signal is represented by $A^{RF} \sin \omega_m t$, a sideband obtained by a signal phase modulator is expressed by the following equation (1)

$$A^{LW} \exp i[\omega_o t + A^{RF} \sin \omega_m t] = A^{LW} \sum_{n=-\infty}^{\infty} J_n(A^{RF}) \exp[i\omega_o t + i n \omega_m t] \quad (1)$$

In equation (1), reference symbol $J_n(A)$ represents a first-type n-order Bessel function. In this equation, input light is represented by $A^{LW} \exp[i\omega_0 t]$. Reference symbol $A^{RF}$ represents an amount representing a size of a phase shift of light caused by an electric signal in a modulator. The amount is called an induced phase.

Similarly, when a modulation signal is represented by $A^{RF} \cos \omega_m t$, a sideband obtained by a signal phase modulation is expressed by the following equation (2).

$$A^{LW} \exp i[\omega_o t + A^{RF} \cos \omega_m t] = A^{LW} \sum_{n=-\infty}^{\infty} i^n J_n(A^{RF}) \exp[i\omega_o t + in\omega_m t] \quad (2)$$

Therefore, it is understood that an amplitude of an n-order side wave band: $\exp[i(\omega_0 + n\omega_m)t]$ is expressed by an n-order Bessel function.

The maximum value of $J_1(A)$ is 0.583 when $A=1.841$. An induced phase at which the maximum value is obtained is defined as the following equation (3) and equation (4).

$$J_1'(A_m) = 0 \quad (3)$$

$$\left(J_1'(A) \equiv \frac{dJ_1(A)}{dA}, 0 \leq A \leq \pi\right) \quad (4)$$

Optical SSB

Since ±1-order sidebands are used in optical frequency conversion performed by the optical SSB modulator, when an induced phase is set at a value exceeding $A_m$, conversion efficiency is not improved to cause generation of an unnecessary harmonic component. Therefore, only a case in which the induced phase ranges from 0 to $A_m$ will be considered.

Assumed that an amplitude and a phase of light at Phase j (j=1; 2; 3; 4) of a Mach-Zehnder waveguide are represented by $A_j^{LW}$ and $\phi_j^{LW}$, respectively, and that an amplitude and a phase of an electric field induced on an optical waveguide by an RF electric signal are represented by $A_j^{RF}$ and $\phi_j^{RF}$ respectively. In this case, when equations (1) and (2), output light E of the optical SSB modulator can be expressed by the following equations (5) to (9). A phase uses a point where four Paths are coupled to each other as a reference.

$$E = \frac{e^{-i w_0 t}}{4} \sum_{j=1}^{4} \sum_{n=-\infty}^{\infty} J_n(A_j^{RF}) \exp\{in(wmt + \phi_j^{RF})\} A_j^{LW} e^{-i\phi_j^{LW}} \quad (5)$$

$$= \frac{e^{i\omega_0 t}}{4} \sum_{n=-\infty}^{\infty} e^{in\omega_m t} \sum_{j=1}^{4} J_n(A_j^{RF}) P_{n,j} A_j^{LW} \quad (6)$$

$$P_{n,j} \equiv \exp i\left[(1 - Sn)j\frac{\pi}{2} + \Delta\phi_j^{LW} + n\Delta\phi_j^{RF}\right] \quad (7)$$

$$\phi_j^{LW} = \frac{j\pi}{2} + \Delta\phi_j^{LW}, \phi_j^{RF} = -S\frac{j\pi}{2} + \Delta\phi_j^{RF} \quad (8)$$

$$S = \pm 1, T = \pm 1 \quad (9)$$

Ideal SSB modulation is obtained when phase difference of light and electricity are given by $\pi/2$ each, i.e., $\Delta\phi_j^{LW} = \Delta\phi_j^{RF}$ and when an amplitude does not fluctuate ($A_j^{LW} = A^{LW}$, $A_j^{RF} = A^{RF}$) [S. Shimotsu, S. Oikawa, T. Saitou, N. Mitsugi, K. Kubodera, T. Kawanishi, and M. Izutsu, "LiNbO3 Optical Single-Sideband Modulator" OFC 2000, PD-16]. On the other hand, an output optical spectrum is given by the following equation (10) to (12).

$$E = A^{LW} e^{i\omega_0 t} \sum_{n=0}^{\infty} J_N(A^{RF}) e^{iN\omega_m t} \quad (10)$$

$$= A^{LW} ST e^{i\omega_0 t} [J_1(A^{RF}) e^{iST\omega_m t} - J_3(A^{RF}) e^{-i3ST\omega_m t} + J_5(A^{RF}) e^{i5ST\omega_m t} - J_7(A^{RF}) e^{-i7ST\omega_m t} + \ldots] \quad (11)$$

N is defined by $S \times T \times (2n+1) \times (-1)^n$ in equation (12). When amplitude falls within a range smaller than $A_m$, a harmonic component of five or more orders is sufficiently small. For this reason, an output spectrum obtained when $S \times T = +1$ is given by equation (13).

$$E \cong A^{LW} e^{i\omega_0 t} [J_1(A^{RF}) e^{i\omega_m t} - J_3(A^{RF}) e^{-i3\omega_m t}] \quad (13)$$

Since $J_1$ is larger than $J_3$, +1 order components $\exp[i(\omega_0 + \omega_m)t]$ are dominant in output light, optical frequency shifting corresponding to a modulated frequency with reference to input light $A^{LW} \exp[i\omega_0 t]$ can be realized. Conversion efficiency obtained in this case can be expressed by $J_1$. When a ratio of the +1-order component to an unnecessary harmonic component is defined by SNR [dB], $J_1/J_3$ is obtained. In this case, it is assumed that each of the optical and electric circuits has no phase difference and no amplitude difference and that a loss in the optical wavelength is zero. For this reason, $J_1$ and $J_1/J_3$ give theoretical limitations of conversion efficiency and an SNR in optical frequency conversion performed by the optical SSB modulator.

A range of $A^{RF}$ that satisfies a conversion efficiency of −10 dB or more and an SNR of 30 dB or more is given by $0.67 < A^{RF} < 0.85$. Similarly, when a case in which $S \times T = -1$ is satisfied is considered, an output spectrum is given by equation (14).

$$E \cong A^{LW} e^{i\omega_0 t} [-J_1(A^{RF}) e^{-i\omega_m t} + J_3(A^{RF}) e^{i3\omega_m t}] \quad (14)$$

As is apparent from equation (14), an optical frequency shifts to be increased (to the upper sideband) when $S \times T = +1$ is satisfied, and shifts to be decreased (to the lower sideband) when $S \times T = -1$ is satisfied. Therefore, it is understood that the sign of T or S is changed to make it possible to realize switching of optical frequencies. A change of the sign of T can be realized by controlling a voltage applied to the third electrode and switching optical phase differences between the Paths 1 and 3 and the Paths 2 and 4 from $-\pi/2$ to $\pi/2$. On the other hand, the sign of S can be changed by switching a phase difference of RF signals of the first electrode and the second electrodes from $\pi/2$ to $-\pi/2$. Note that an amplitude of the switching signal on the third electrode corresponds to a half-wave voltage of a modulation signal (switching a USB signal and an LSB signal) applied to the third electrode.

In this case, a range of frequency modulation performed by the optical FSK modulator is represented by $\Delta f_{FSK}$, $\Delta f_{FSK} > \Delta f_{Sig}$ is satisfied. For example, when $\Delta f_{Sig}$ and $\Delta f_{FSK}$ are given by 10 GHz and 25 GHz, respectively, a UWB signal having a frequency of 50 GHz is generated. As described above, $\Delta f_{Sig}$ denotes a bandwidth of laser light the intensity of which is modulated by a light intensity modulator.

The UWB signal generator according to the present invention can also be used in wavelength division multiplexing (WDM) communication. In the WDM communication performed by using the UWB signal generator according to the present invention, when frequency intervals are given by $\Delta f_{WDM}$, a relation given by $\Delta f_{WDM} > (\Delta f_{FSK} + \Delta f_{Sig}) \times 2$ may be satisfied. For example, when $\Delta f_{Sig}$ and $\Delta f_{FSK}$ are 10 GHz and 25 GHz, respectively, 100 GHz may be set as $\Delta f_{WDM}$.

According to the optical FSK modulator, an average output light intensity does not depend on a voltage at the third electrode. Therefore, in the UWB signal generator according to the present invention using the optical FSK modulator, an average output is constant to make it possible to perform the modulation simultaneously with modulation of another modulation method (OOK or the like) using an average output of intensity modulation signals or the like in accordance with a UWB signal.

2. Operation of UWB Signal Generator

Generation of a UWB signal by using the UWB signal generator according to the present invention is described below. As above described, an output from the optical FSK modulator can be switched between an upper sideband and a lower sideband by a change in voltage on the third electrode. When phase differences between optical signals of the Paths 1, 3 and the Path 2, 4 are represented by $\phi_{FSK}$, the amplitudes of the upper sideband and the lower sideband are given by the following equations (15) and (16) respectively.

$$J_1(A^{RF})[1+\exp(i\phi_{FSK})]/2 \quad (15)$$

$$J_1(A^{RF})[-1+\exp(-i\phi_{FSK})]/2 \quad (16)$$

Figure 12:
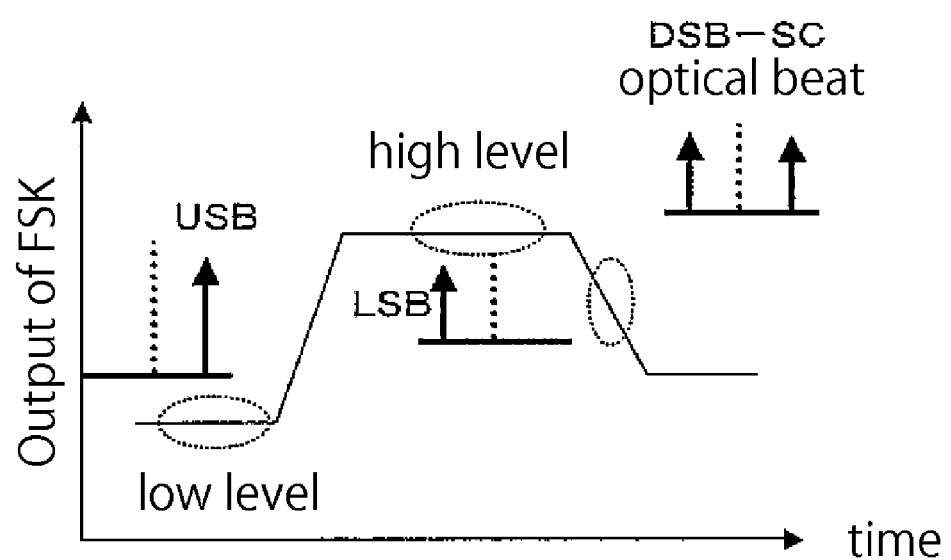
FIG. 12 is a diagram explaining a generation of UWB signals by optical FSK modulation.

Only the upper sideband is outputted when $\phi_{FSK}=0$. On the other hand, only the lower sideband is outputted when $\phi_{FSK}=\pi$. In any case, an average output light intensity is given by $J_1(A^{RF})$, and does not depend on $\phi_{FSK}$. FIG. 12 is a diagram for explaining generation of a UWB signal by optical FSK modulation. For rise time and fall time of a switching pulse on the third electrode, an upper sideband and a lower sideband simultaneously exist. When the upper and lower sideband are converted into electric signals by a high-speed photodetector, an RF signal corresponding to a frequency difference ($2f_m$) between the upper sideband and the lower sideband is obtained as an optical beat. The rise time and the fall time are limited by the bands of the electrodes and the driven circuit. However, when a traveling-wave-type electrode (and a driver) is used, the rise time and the fall time can be set at about 10 ps. The upper limit of frequency modulation of FSK is similarly limited by a band of a modulation electrode and set about 60 GHz. Therefore, when the UWB signal generator is used, a UWB signal having a carrier frequency of 120 GHz and a pulse width of 10 ps can be generated.

In a UWB signal output method obtained by the UWB signal generator according to the present invention, an FSK switching signal does not affect an average output light intensity. This means that the range of a change in intensity by FSK modulation on a frequency axis is limited to about a carrier frequency of the UWB signal. In an UWB generation technique, which has been proposed, a method of extracting only a desired spectral component of a filter (antenna) after a short pulse is generated is used. However, in the method obtained by the optical FSK modulator proposed here, as described above, an unnecessary spectrum is not generated, and only a component necessary for UWB communication can be selectively obtained. More specifically, only a necessary component is generated as an RF signal not to affect an optical baseband. Since a spectral range is determined by the rise time and the fall time of an FSK switching signal, the range spectral range can be easily controlled. The carrier frequency is twice the frequency $f_m$ of a sinusoidal wave to be supplied to the first and the second electrodes.

Since the carrier frequency of a UWB signal is twice the frequency of a high-frequency electric signal source, a signal having a high-frequency component, and the frequency can be easily controlled. Since the pulse waveform of the UWB signal is determined by a waveform of a modulation signal applied to the third electrode, for example, the pulse waveform of the UWB signal can be easily controlled by adjusting the rise time or the like.

Intensity Modulation Signal/UWB Signal Generator

An intensity modulation signal and UWB signal generator using an optical FSK modulator according to the present invention (to be also simply referred to as an "intensity modulating signal/UWB signal generator according to the present invention" hereinafter) is a device which can output an intensity modulating signal and a UWB signal by combining a UWB signal generator according to the present invention to a photodetector. A practical example of the intensity modulating signal/UWB signal generator according to the present invention will be described below.

The intensity modulating signal/UWB signal generator according to the present invention includes a laser light source, an intensity modulator for modulating intensity of light from the laser light source, an optical FSK modulator to which a light signal modulated by the optical intensity modulator is inputted, and a photodetector such as a high-speed optical photodetector for detecting output of the optical FSK modulator. Of these elements, the elements described in the UWB signal generator according to the present invention are the same as those described above.

A photodetector is a device for detecting an optical signal. For which a known photodetector can be adopted. For example, a device including photodiode can be adopted as such a photodetector. As the photodetector, a photodetector which can detect and convert the optical signal into an electric signal can be used. The photodetector can detect intensity or the like of an optical signal. A detection band of the photodetector may be larger than $\Delta f_{Sig}$ and smaller than twice $\Delta f_{FSK}$.

An optical amplifier (for example, a limiting amplifier) can suppress an intensity modulation component by using a saturation phenomenon. Light passes through the optical amplifier to make it possible to output a UWB signal the intensity modulating component is suppressed. Therefore, the use of the optical amplifier is effective for an intensity modulating signal/UWB signal generator. In order to effectively suppress the intensity modulating component as described above, an ON/OFF extinction ratio of the intensity modulating signal is set at 20 dB or less. When such an ON/OFF extinction ratio is set, an almost constant UWB signal output can be obtained by using the saturation characteristics of the amplifier.

Operation of Intensity Modulation Signal/UWB Signal Generator

Since the optical FSK modulator kept an average output light intensity constant, when an intensity modulating signal is inputted, the intensity modulating signal/UWB signal generator can simultaneously transmit the intensity modulating signal and the UWB signal without affecting the intensity modulating signal. The intensity of the UWB signal is affected by the intensity modulating signal. However, when this causes a problem, a fluctuation in intensity can be suppressed by using an optical amplifier (limiting amplifier or the like).

The intensity modulator which decreases intensity of the transient signal by performing intensity modulation so that signals other than the transient signal which are generated at a transient period of output from the optical FSK modulator is the other preferable embodiment of the present invention. The intensity modulation is performed by remaining components generated at a timing of the FSK signal switching by adjusting a control signal of the control part so that a modulation signal of the intensity modulator and a modulation signal of the optical FSK modulation system are synchronized with each other.

The Optical Modulation System According to the Seventh Aspect of the Present Invention An optical modulation system according to the seventh aspect of the present invention realizes CPFSK modulation having any shift amount and modulation degree basically by the following way.

The above described optical FSK modulation system is used as an optical FSK modulator. And while controlling a phase difference between a USB signal and an LSB signal, the optical FSK modulation system performs continuous phase FSK modulation by controlling phase difference $\Delta\phi$ between a sinusoidal clock signal as a modulation signal and a baseband signal. And then, the optical FSK modulation system controls a phase of input light inputted to the modulator.

In particular, the optical modulation system according to the seventh aspect of the present invention is based on the following idea.

If the above described phase difference $\Delta\phi$ is for example represented by $\pi/4+n\pi$ (n is integer), the phase between the USB signal and the LSB signal become continuous. And by controlling the phase of the input light being synchronized with the baseband signal, a phase gap, generated in the optical FSK modulator when the baseband signal is switched (switch over between the USB signal and the LSB signal), can be compensated. Thus, an optical FSK signal having continuous phase and any shift amount and modulation degree can be obtained.

In other words, even if the phase difference $\Delta\phi$ between the sinusoidal clock signal and the baseband signal is controlled to be, for example, $\pi/4+n\pi$ (n is integer), a phase gap $\delta\phi$, which is a variation of a phase difference $\Delta\phi$, is generated depending on frequency shift amount (specifically, in case of optical MSK modulation). For example, if the phase difference $\Delta\phi$ is controlled to be $\pi/4+n\pi$ (n is integer), the phase difference $\Delta\phi$ can be $\pi/4+n\pi+\delta\phi$ under certain conditions. The optical modulation system compensates this phase gap by controlling a phase of input light.

The Optical Modulation System According to the Seventh Aspect of the Present Invention The optical modulation system according to the seventh aspect of the present invention is also able to detect optical phase information. Therefore, the USB signal and the LSB signal can be overlapped, thereby saving optical frequency band. This enables proper demodulation even in a narrow modulation band width.

It is to be noted that an RZ-CPFSK signal can be obtained by performing intensity modulation on an optical FSK signal and by reducing the output intensity of a USB signal and an LSB signal in a transient period.

Minimum Shift Keying (MSK) is a famous modulation method in the field of digital communication using radio transmission. The characteristic of MSK modulation method is as follows. A main lobe of a modulation spectrum generated by the MSK modulation is smaller than that of Differential Phase Shift Keying (DPSK) method, and side lobes which are generated at higher frequency components strongly deteriorate. Since such a compact spectrum provides potentially favorable dispersion tolerance, it is very useful for long distance transmission. Although the MSK modulation method has proved its efficiency in radio communication, it has not realized a practical high-speed external modulation in optical communication.

Figure 13:
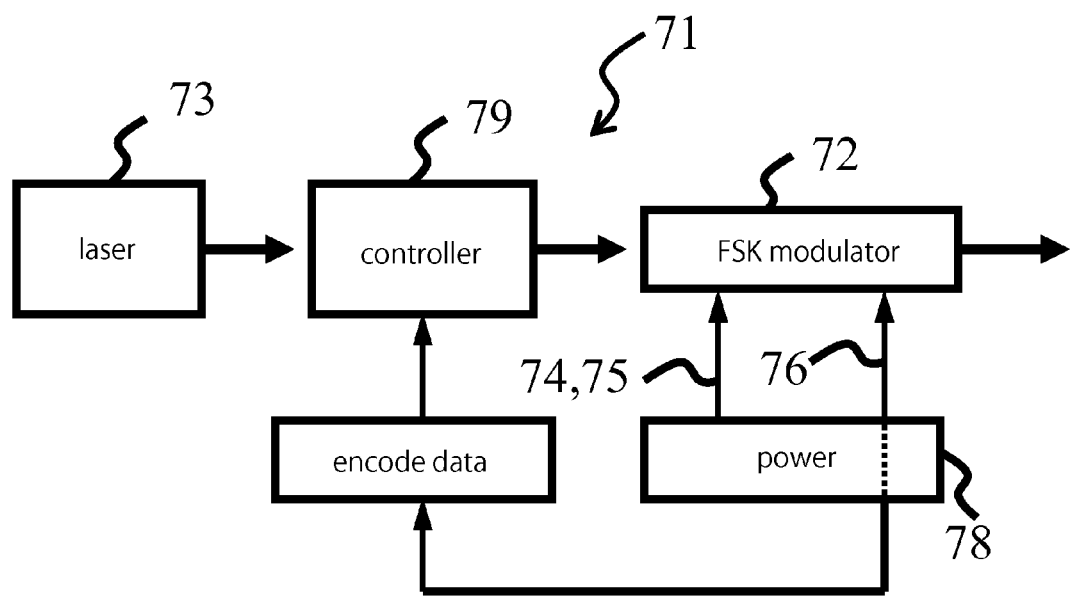
FIG. 13 is a schematic diagram showing a basic arrangement of a continuous phase optical frequency shift keying (CPFSK) modulator according to the seventh aspect of the present invention. The CPFSK modulator has any frequency shift and is capable of continuous phase modulation.

Hereinafter, an optical modulation system according to the seventh aspect of the present invention is explained referring to figures. FIG. 13 is a schematic diagram showing a basic arrangement of a continuous phase optical frequency shift keying (CPFSK) modulator according to the seventh aspect of the present invention. The CPFSK modulator has any frequency shift and is able to perform continuous phase modulation. As shown in FIG. 13, the continuous phase optical frequency shift keying modulator (71) according to this embodiment comprises an optical FSK modulation system acting as an optical FSK modulator (72), a power source system (78), and an initial phase controller (79). The power source system (78) applies sinusoidal clock signals (74,75) to the first electrode and the second electrode of the optical frequency shift keying modulator, and also applies a baseband signal (76) to the third electrode of the optical frequency shift keying modulator. The baseband signal (76) has a predetermined phase difference ($\Delta\phi$) with the sinusoidal clock signal. The phase difference ($\Delta\phi$) is, for example, represented by the following equation (I) with the phase of the clock signal. The initial phase controller controls a phase of an input light which is inputted to the optical frequency shift keying modulator (72) from a laser light source (73) by encode data synchronized with the baseband signal (76). And the initial phase controller compensates a phase gap which is generated in the optical frequency shift keying modulator (72) when the baseband signal (76) is switched, and causes a variation in the phase difference ($\Delta\phi$). Note that an encode data generator is an optional element.

$$\Delta\phi=\pi/4+n\pi \text{ (n is an integer)} \qquad (I)$$

The continuous phase optical frequency shift keying modulator (71) according to this embodiment switches a USB signal and an LSB signal by controlling a frequency switching timing. It further controls a phase difference (delay amount) $\Delta\phi$ between a sinusoidal clock signal (74, 75) as a modulation signal and a baseband signal (76) so that it becomes a predetermined phase difference, for example, represented by the above equation (I). And the continuous phase optical frequency shift keying modulator (71) also synchronizes the baseband signal (76) with an optical signal inputted to the optical FSK modulator (72). Thus, CPFSK modulation having any shift amount and modulation degree can be realized.

FIG. 14 is a conceptual diagram explaining continuous phase optical frequency shift keying (CPFSK). FIG. 14(A) is a conceptual diagram showing a pulse of continuous phase optical frequency shift keying (CPFSK). FIG. 14(B) is a conceptual diagram showing a pulse of conventional optical frequency shift keying (FSK). As shown in FIG. 14(B), an optical FSK modulation signal generated by conventional external modulation means has discontinuous phase transition between a USB signal and an LSB signal. The optical frequency shift keying modulator (72) of the continuous phase optical frequency shift keying modulator according to this embodiment solves the problem of the discontinuous phase transition by controlling the phase difference (delay amount) $\Delta\phi$ between a sinusoidal clock signal (74, 75) and a baseband signal (76) so that the phase difference (delay amount) $\Delta\phi$ is, for example, represented by the above equation (I). Since the power source system (78) of the continuous phase optical frequency shift keying modulator according to this embodiment controls the phase difference (delay amount) between a sinusoidal clock signal (74,75) and a baseband signal (76), the above described continuous phase optical frequency shift keying can be performed.

In other words, even when a USB signal is switched to an LSB signal, or vice versa, by switching a baseband signal, since the phase difference (delay amount) $\Delta\phi$ between a sinusoidal clock signal (74, 75) and a baseband signal (76) is controlled so that the phase difference is, for example, represented by the above equation (I), there will be no phase difference between the phase of the an optical signal before and after the switching.

The combination of the above described optical frequency shift keying modulator (72) and the power source (78), using synchronous control technique (synchronous modulation method), realizes high-speed modulation by external modulation which is referred to as optical continuous phase frequency shift keying (CPFSK) modulation. Before this synchronous control technique was proposed, direct modulation method for laser diode was the sole method for generating optical CPFSK signals (see for example, K. Iwashita and T. Matsumoto, J. Lightwave. Technol., LT-5, 854-856 (1987); B. Wedding et al., ECOC'03., Th1.5.5 (2003)). Therefore, modulation speed was limited by a reaction speed of a laser diode. In addition, there was a problem that low frequency components of CPFSK signals were decreased because of a thermal coupling effect on a laser diode. The synchronous control technique solves these problems effectively.

On the other hand, the shift amount and the modulation degree of the optical OPFSK modulation signal obtained by the above synchronous control technique has a limitation. In this CPFSK modulation, minimum zero-to-peak frequency shift amount available is estimated to be at least B/2 (B represents bit rate of an CPFSK signal).

In the CPFSK modulation, a frequency shift keying (FSK) modulator based on SSB modulation technique, for example, is used. And the modulator alternatively generates a USB signal or an LSB signal (see for example, T. Kawanishi et al., OFC'04., PDP16 (2004)). The FSK modulator is driven by a sinusoidal clock signal and a baseband signal, and frequency shift and bit rate of an FSK signal are decided respectively by clock frequency $f_0$ of the sinusoidal clock signal (74, 75) and bit rate B of the baseband signal (76). If this frequency $f_0$ and bit rate B, in accordance with the following equation (II) and synchronized with the CPFSK modulator, are inputted to the CPFSK modulator, CPFSK modulation can be realized without initial phase control explained in details below.

$$\text{Clock frequency } f_0 = nB/2, \Delta\phi = \pm 2\pi/4B \quad \text{(II)}$$

Where n is integer, and $\Delta\phi$ is a delay amount between the clock signal and the base band signal. In this case, the minimum frequency shift obtainable is represented by an equation of $f_0$=B/2. Thus, there is a limitation of a shift amount and a modulation degree of the optical CPFSK modulation signal obtained by the synchronous control technique. This is because the synchronous control technique allows frequency switching only when the optical phases correspond with each other. Therefore, modulation degree (frequency shift amount) is restricted to be equal to or more than 1, and MSK modulation with modulation degree 0.5 cannot be performed.

In order to realize frequency shift of B/4, and realize MSK modulation, initial phase control which is used with the above described CPFSK modulation is explained below. In particular, for example, continuous phase is realized by controlling an optical initial phase of input light inputted to the optical frequency shift keying modulator (72) at a timing of frequency switching.

In order to realize optical MSK modulation ($f_0$=B/4), the initial phase control part (79) which is connected in series with the CPFSK modulator controls an optical phase by synchronizing with the baseband signal (76). The initial phase controller (79) compensates for a phase gap generated in the optical FSK modulator (72). By so doing, continuous phase modulation having any frequency shift can be performed. The initial phase controller (79) shifts a phase of an input light by a compensation amount $\delta\phi(t)$ which is represented by the following equation (III), and compensates a phase gap $\delta\phi(t)$ which is generated in the optical frequency shift keying modulator (72) at a timing of baseband signal (76) switching, and causes a variation in the phase difference ($\Delta\phi$).

$$\delta\phi(t) = \{(2k\pi f_0/B + \phi_0) \bmod 2\pi\} \quad \text{(III)}$$

Where k is integer, $f_0$ is a frequency of a sinusoidal clock signal, B is bit rate of a baseband signal, $\phi_0$ is an initial phase. Note that "mod" function means a reminder operation in which when $(2k\pi f_0/B + \phi_0)$ is divided by $2\pi$, the remainder is $\delta\phi(t)$.

In particular, the optical signal is switched from a USB signal to an LSB signal or vice versa by switching the baseband signal (76). Then the phase gap $\delta\phi(t)$ which is based on the above equation (III) is generated. So, when the baseband signal is switched, in order to close the phase gap $\delta\phi(t)$ which is known to be generated in advance, the phase of input light is shifted by $\delta\phi(t)$ at the initial phase controller (79), and then the light is inputted to the optical frequency shift keying modulator (72).

In the above equation (III), when $f_0$=B/4, modulation data of four phases, which are $\phi_0+\pi/2$, $\phi_0+\pi$, $\phi_0+3\pi/2$, and $\phi_0+2\pi$, are generated, and the initial phase controller (79) is controlled based on these four data. However, in case of MSK modulation, the initial phase control based on the above equation (III) is simplified according to the encode data which satisfies all the conditions [1] to [4] described below.

Condition [1]: When applying a k-th baseband signal, a baseband signal having a phase difference ($\Delta\phi$) which satisfies a relationship represented by the above equation (I) with a phase of the sinusoidal clock signal is applied to an electrode of the optical frequency shift keying modulator.

Condition [2]: When applying a k-th baseband signal, the phase of the input light is not controlled.

Condition [3]: When applying a k+1-th baseband signal, and the k-th baseband signal and the k+1-th baseband signal are the same, a phase of the input light is not controlled.

Condition [4]: When applying a k+1-th baseband signal, and the k-th baseband signal and the k+1-th baseband signal are different, a phase of the input light is shifted by $\pi$.

Where "k"s in condition [1] to [4] are all even numbers or all odd numbers.

Going into details, in case of MSK modulation, since $f_0$=B/4, we have an equation: $\delta\phi(t)=\{(k\pi/2+\phi_0) \bmod 2\pi\}$. This means that a phase gap can be generated every twice application of the baseband signal. In other words, for example, if a phase gap is not generated by even number times of signal application, a phase gap can be generated by odd number times of signal application. In a case that a phase gap is generated by odd number times of signal application, the baseband signal is switched (between an LSB signal and a USB signal). And the phase gap generated at this time is $\pi$. Since the phase gap $\delta\phi$ are not generated by even number times of signal application, phase continuity can be obtained by a control based on the above equation (I) without controlling a phase of an input light (condition [1], [2]). On the other hand, in case of the odd number times of signal application, the phase gap $\pi$ is generated when the baseband signal is switched. Therefore, in case the baseband signal is not switched, phase continuity can be obtained without controlling a phase of an input light, and in case the baseband signal is switched, phase continuity can be obtained by shifting a phase of an input light by $\pi$. (condition [3], [4]).

As shown in FIG. 13, the continuous phase optical frequency shift keying modulator (71) according to this embodiment has a portion (72, 78) for CPFSK modulation and a portion (79) for initial phase control. As the optical frequency shift keying modulator (72), the power source (78), and the initial phase controller (79) of the continuous phase optical frequency shift keying modulator (71) according to this embodiment, publicly known ones used in the field of optical information communication can be used as needed.

As the initial phase controller (79), as above explained, one for adjusting a phase of a signal by adjusting baseband signals applied to the $MZ_{CA}$ (11a) or the $MZ_{CB}$ (11b) which are two-electrode composing the third electrode can be used, but is not specifically limited to this, and publicly known phase controllers can be used as needed. For example, a phase controller shown in FIG. 2 of Japanese Patent Application Laid-Open Publication No. H08-79174 can be used. The phase controller comprises a waveguide of $LiNbO_3$ crystal having two electrodes provided on both surfaces of the waveguide. And the phase controller is configured to control a phase of a signal by controlling refractive index of the crystal by applying voltage (a few volts) between the electrodes, and by changing light path length equivalently.

In particular, aforementioned phase controller is adopted as the initial phase controller (79). And the initial phase controller (79) are electrically connected to the power source system (78) via a control device such as a computer not shown in figures. Various signals are inputted to an input device of the computer and outputted from an output device of the computer. A computing means such as a CPU performs phase control based on the above equation (III) by using baseband signals (76) from the power source system (78) based on a direction received from a control program of a main memory and memory information and the like read out from a memorizing means such as a memory. The computing means also performs a predetermined operation based on encode data according to phase control satisfying the aforementioned condition [1] to [4].

The power source system (78) may be connected with a control system such as a computer not shown in figures. The power source system, for example, comprises a power source such as a high-frequency power source, a frequency modulator connected to the power source, a phase modulator connected to the power source, and a pulse pattern generator connected to the power source.

As the frequency modulator, a publicly known frequency modulator can be used. As the phase modulator (31), a publicly known phase modulator can be used. As the pulse pattern generator (32), a publicly known pulse pattern generator can be used. The pulse pattern generator is not particularly limited if it is able to generate a transmission data signal, and a publicly known data signal generator can be used. These are, for example, electrically connected to a control device such as a computer and the like not shown in figures. And various signals are inputted to an input device of the computer and outputted from an output device of the computer. The computing means such as a CPU and the like, based on a direction received from a control program of a main memory, reads out information stored in a memorizing means such as a memory, and performs a predetermined operation.

A clock signal generated from a signal source is converted to a clock signal whose frequency is integral multiple (e.g., one time, two times, three times) of half its frequency by the frequency modulator. The clock signal whose frequency is integral multiple of half its frequency is applied to the first electrode and the second electrode. Then, the phase modulator modulates the clock signal whose frequency is integral multiple of half its frequency by $\pi/2+m\pi$ (m is an integer). And the modulated signal, as a clock signal whose phase is different by $\pi/2$ from the clock signal whose frequency is integral multiple of half its frequency, is applied to the first electrode and the second electrode. In other words, signals whose phases are different by $\pi/2$ are applied to the first electrode and the second electrode respectively. Thus, by changing baseband signals applied to the third electrode, a USB signal and an LSB signal can be outputted.

It is to be noted that the clock signal inputted to the sub Mach-Zehnder waveguide may be one extracted from data signals to be transmitted such as signals extracted from data signals to be transmitted by a clock extracting circuit. In particular, a clock extracting circuit connected to the pulse pattern generator extracts a signal from transmission data signals generated by the pulse pattern generator, and the signal extracted from the transmission data by the clock extracting circuit is used as the clock signal. The clock extracting circuit extracts tone repetition frequency from data signals, and it is an existing electric circuit using an oscillator and a feedback circuit such as a phase synchronization loop.

In this embodiment, the clock signal generated from the power source is converted to a baseband signal having a predetermined phase difference with the clock signal by the pulse pattern generator (the phase difference is represented by e.g., the equation (I)). And then, the converted baseband signal is applied to the main Mach-Zehnder electrode. Thus, even when an optical signal is switched from a USB signal to an LSB signal or vice versa by switching a baseband signal, a phase difference (delay amount) $\Delta\phi$ between the sinusoidal clock signal and the baseband signal are controlled to be a predetermined phase difference, for example, represented by the above equation (I). Therefore, the phase of the optical signal does not shift before and after switching. Note that a bit rate of the baseband signal is from 1 Gbps to 40 Gbps, preferably be from 5 Gbps to 30 Gbps, and more preferably be from 10 Gbps to 20 Gbps. And a frequency of the clock signal is from 0.25 GHz to 10 GHz, preferably be from 1.25 GHz to 7.5 GHz, and more preferably be from 2.5 GHz to 5 GHz. For MSK modulation, a frequency of the clock signal is one fourth of a bit rate of the baseband signal.

In addition, since the optical FSK modulation signal generated from the continuous phase optical frequency shift keying modulator of this embodiment has continuous phase, the modulation bandwidth is narrow. Therefore, even if center frequencies of a USB signal and an LSB signal is close (e.g., the edge of the USB signal and that of the LSB signal overlap, or the USB signal and the LSB signal themselves overlap) the optical FSK modulation signal can be easily decoded by a coherent demodulation. Heretofore, in order to demodulate an optical FSK modulation signal, a USB signal and an LSB signal must be separated. So in the conventional optical information communication by means of the optical FSK modulation method, a wide optical frequency bandwidth was required. However, since optical FSK modulation signal generated from the continuous phase optical frequency shift keying modulator of this embodiment has optical phase signal information, a USB signal and an LSB signal must not be separated. Therefore, optical frequency bandwidth can be saved.

An RZ-CPFSK (return to zero—continuous phase optical frequency shift keying) signal can be obtained by optical FSK modulation. An external modulation type optical modulator for generating the RZ-CPFSK (return to zero—continuous phase optical frequency shift keying) signal, not specifically shown in figures, comprises the above described continuous phase optical frequency shift keying modulator and an intensity modulator to which output light from the continuous phase optical frequency shift keying modulator is inputted.

The modulation signal applied to the intensity modulator is a clock signal generated from the power source.

In the conventional optical FSK modulator, at a transient period when a USB signal and an LSB signal are switched, optical signal intensity changes rapidly due to beats in the both signals. This transient signal causes signal degradation and the like in an optical transmission system. In order to solve the problem, the modulator of the above embodiment generated a continuous phase optical FSK modulation signal. The RZ-CPFSK modulator further generates optical FSK modulation signals with higher quality by controlling the transient signal.

This RZ-CPFSK modulator decreases (suppresses) intensity of a transient signal basically by decreasing output intensities of a USB signal and an LSB signal at a transient period by performing intensity modulation on an optical FSK signal. This decreases intensities of the USB signal and the LSB signal of the optical FSK signal a little bit, but is able to decrease the intensity of the transient signal, thereby generating an optical FSK signal with high quality.

The intensity modulator used in this embodiment is not specifically limited if it is able to modulate intensity of a signal with a predetermined cycle synchronized with a cycle of an optical FSK signal. A preferable optical intensity modulator is a Mach-Zehnder waveguide. And a push-pull type Mach-Zehnder waveguide is more preferable. This is because a Mach-Zehnder waveguide can be formed on the same substrate on which the optical FSK modulator described below is formed. This is also because a Mach-Zehnder waveguide is able to avoid unnecessary variation in the optical phase (referred to as "frequency chirp") generated when intensity modulation is performed. As such a Mach-Zehnder waveguide, a publicly known Mach-Zehnder waveguide which is used for an optical SSB modulator and the like can be used.

The RZ-CPFSK modulator is configured to apply intensity modulation signals which are synchronized with optical FSK signals. And the RZ-CPFSK modulator performs intensity modulation so that intensity will become zero at a timing when transient signals of the optical FSK modulation signal appear (Return-to-Zero modulation). By this modulation, transient signals are suppressed, and USB signals and LSB signals with higher quality are generated. It is to be noted that timing control between an intensity modulation signal and an optical FSK modulation signal can be performed by a publicly known timing control method. In particular, an optical RZ-FSK signal can be obtained by controlling a timing between a signal applied to the intensity modulator and a signal applied to each electrode of the optical FSK modulator. In other words, intensity modulation can be performed in accordance with a cycle of an optical FSK modulation signal by synchronizing a signal applied to the intensity modulator with a signal applied to an optical FSK modulator.

By connecting an initial phase controller in series with the CPFSK modulator, and performing phase control of input light to the CPFSK modulator in advance, the above described effect can be obtained (i.e., modulation signals having any shift amount and a modulation degree can be obtained).

In other words, the optical modulation system according to the seventh aspect of the present invention controls the phase difference between a USB signal and an LSB signal, and is able to provide continuous phase transitions even when the USB signal and the LSB signal is switched.

Figure 15:
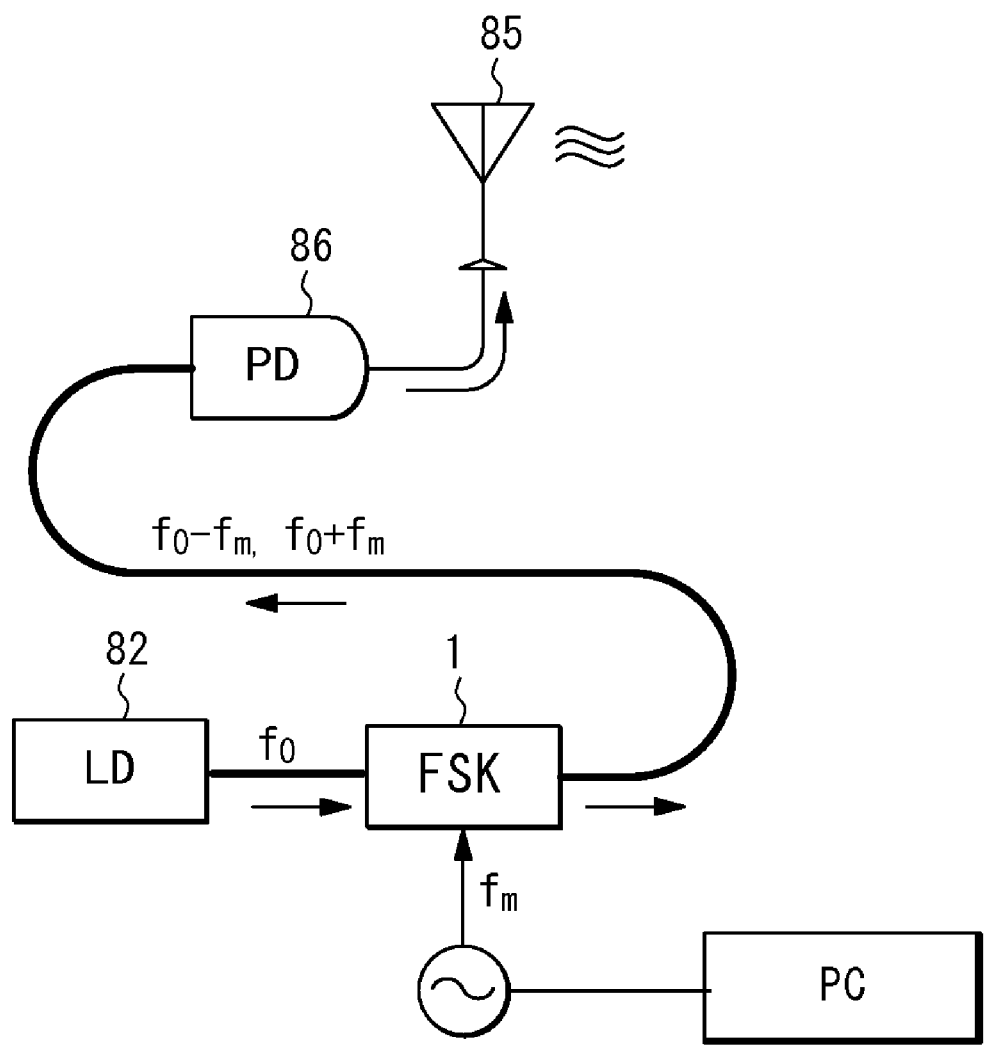
FIG. 15 is a block diagram showing a basic arrangement of a radio signal generator of the present invention.

A preferable embodiment of the optical modulation system according to the seventh aspect of the present invention uses a two-electrode type electrode as the third electrode. A baseband signal applied to the third electrode is divided into two systems, and a sign of one of them is reversed. The baseband signal having a reversed sign is applied to the $MZ_{CB}$ electrode. And the baseband signal not having a reversed sign is applied to the $MZ_{CA}$ electrode. CPFSK modulation and MSK modulation can be performed by applying the above signals so that there is no phase difference between a USB signal and an LSB signal FIG. 15 is a block diagram showing a basic arrangement of a radio signal generator of the present invention. As shown in FIG. 15, the radio signal generator comprises an optical modulation system (1), a photodetector (86), and an antenna (85). The optical modulation system (1) is connectable to a light source. The photodetector (86) detects output light from the optical modulation system. The antenna (85) converts optical signal detected by the photodetector into a radio signal.

A photodetector is a means for detecting output light from a modulation optical signal generator, and converting the output light to an electric signal. As the photodetector, a known optical detector can be adopted, and a device including photodiode, for example, can be adopted. As the photodetector, for example, one for detecting an optical signal and converting it to an electric signal can be used. The intensity, frequency, etc of an optical signal can be detected by the photodetector. As the photodetector, for example, one described in [Hirho Yonetsu, "Optical Communication Element Engineering (light-emitting, light-receiving element)" Kougakutosyo Ltd. the 6th edition, 2000] can be adopted as needed.

An antenna is a means for emitting an electrical signal converted by the photodetector as a radio signal. As an antenna, a known antenna can be used. An optical modulation system (1) generates a modulation signal. A photodetector detects the modulation signal. And an antenna converts the modulation signal into a radio signal, and emits the radio signal. Thus, a radio signal can be generated.

Example 1

A Simulation of FSK-PSK Conversion Using DSB-SC Modulation

The following fact was logically confirmed. A wideband FSK signal generated by an optical FSK modulator can be converted to a PSK signal by performing DSB-SC modulation on the wideband FSK signal and extracting only components close to the carrier by an optical filter. A 1-bit delay circuit for DPSK demodulation is used for demodulation of the PSK signal.

The simulation model of the FSK-PSK Conversion was as follows: a signal length was 1024 pulse, bit rate of FSK signals (256 signals) was 10 Gbps, a line width of a CW light source was 10 MHz, frequency was 193 THz, a FSK modulation signal frequency ($f_m$) was 25 GHz, a phase difference of RF signals applied to the $RF_A$ electrode and the $RF_B$ electrode was 180 degree, transmission rate of a signal applied to the $RF_C$ electrode was 1 Gbps, a phase difference of signals applied to each arms of the $MZ_C$ was 90 degrees, A type of signal applied to the $RF_C$ electrode was NRZPRBS, a frequency of a modulation signal applied to the DSB-SC modulator was 25 GHz, a phase difference of the modulation signals applied to both arms of the MZ waveguide composing the DSB-SC modulator was 180 degree, a center frequency of the optical bandpass filter was assumed to be 20 GHz. Optical spectra outputted form the band pass filter and DPSK demodulation signal were calculated while shifting phases of sinusoidal signals of 25 GHz which are to be FSK modulated and DSB-SC modulated. The results of the simulation are shown in FIGS. 16 and 17.

FIG. 16 is a graph showing a simulation result of optical spectra of BPF output while shifting phases of sinusoidal signals of 25 GHz which are to be FSK modulated and DSB-SC modulated. FIG. 16(A) is a graph showing spectra with phase differences 0 degree, 45 degrees, 90 degrees, and 135 degrees. FIG. 16(B) is a graph showing spectra with phase differences 180 degrees, 225 degrees, 270 degrees, and 315 degrees.

FIG. 17 is a graph showing a simulation result of a DPSK demodulation signal while shifting phases of sinusoidal signals of 25 GHz which are to be FSK modulated and DSB-SC modulated. FIG. 17(A) is a graph showing modulation signals with phase difference 45 degrees. FIG. 17(B) is a graph showing modulation signals with phase difference 135 degrees.

It can be seen from the FIGS. 16 and 17 that the spectrum width increases or decreases every phase difference of 180 degrees. It can also be seen that the spectrum width is minimized when the phase differences are 45 degrees and 225 degrees, and is maximized when the phase differences are 135 degrees and 315 degrees. It can also be seen that when the spectrum width is minimized, eye pattern of the DPSK modulation signal does not open, on the other hand, when the spectrum width is maximized, eye pattern of the DPSK modulation signal opens widely. From foregoing analysis, it can be seen that it is desirable to adjust the phase difference so as to maximize the spectrum width when the present system is used as a FSK-PSK conversion system. On the other hand, it is desirable to adjust the phase difference so as to minimize the spectrum width when the present system is used as FSK label peel.

Example 2

A principle demonstration experiment of FSK-PSK conversion by DSB-SC modulation was performed. The purpose of this experiment was to confirm that a wideband FSK signal generated by an FSK modulator can be converted to a PSK signal by performing DSB-SC modulation on the wideband FSK signal and extracting only components close to the carrier by an optical filter. A 1-bit delay circuit for DPSK demodulation is used for demodulation of the PSK signal.

Figure 18:
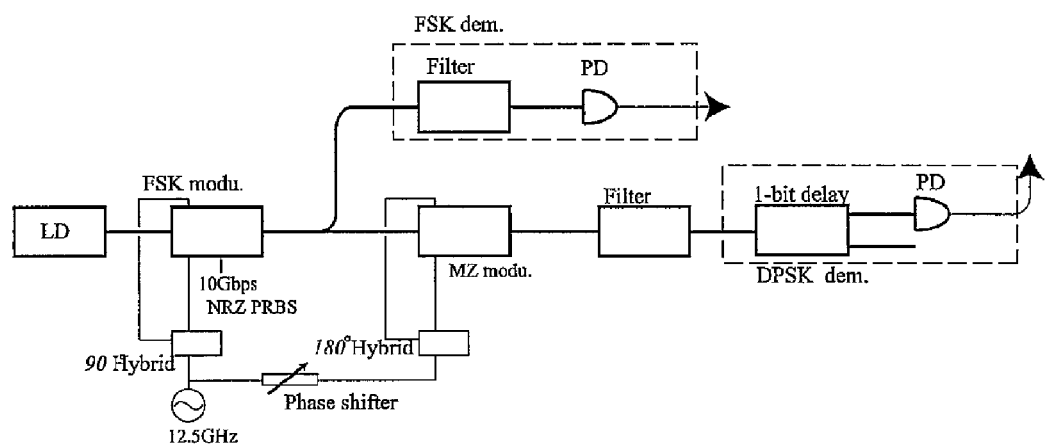
FIG. 18 is a schematic diagram showing an experiment system in Example 1.

FIG. 18 is a schematic diagram showing an experiment system in Example 2. As the light source LD, a wavelength variable laser HP81689A was used. The wavelength was set at 1550.236 nm, and output intensity was set at 6 dBm. Note that a wavelength when FSK demodulation was performed was set at 1550.120 nm. The output of the LD was inputted to the FSK modulator via a polarization controller not shown in figures. Note that, in FIG. 18, LD represents a light source, "FSK modu" represents an optical FSK modulator (having an arrangement shown in FIG. 2), "Phase Shifter" represents a phase modulator, "MZ modu." represents an intensity modulator (optical DSB-SC modulator) having a Mach-Zehnder waveguide, "filter" represents a filter, "Hybrid" represents a phase modulator performing phase modulation for applying signals whose phases are different by a certain amount to each electrode, "FSK dem." represents a demodulator of an FSK signal, "PD" represents a photodetector, "1-bit delay" represents one bit delay circuit, and "DPSK dem." represents a demodulator of a PSK signal.

The configuration of a modulator drive system was as follows. An FSK modulation signal frequency ($f_m$) was set at 12.5 GHz. A phase difference of RF signals applied to the first electrode and the second electrode was 180 degrees. Transmission rate of a signal applied to the third electrode was 9.95 Gbps. A phase difference of the signals applied to the both arms of the $MZ_C$ was 90 degrees. A type of a signal applied to the $RF_C$ electrode was NRZPRBS. A frequency of a modulation signal applied to the DSB-SC modulator (dual drive MZM) was set at 25 GHz. A phase difference of modulation signals applied to the both arms of the MZ waveguide composing the DSB-SC modulator was 180 degree. EDFA (Fitel ErFA1313) which is a loss-compensating device was set behind the FSK modulator and the DSB-SC modulator respectively. Voltage of a pump LD was 216 mA for FSK and 100 mA for DSB-SC. By setting a variable BPF with bandwidth of 1 nm (application photoelectric bandpass filter) at the output of the EDFA, ASE (noise component of natural light) was removed.

The configuration of a measurement system was as follows. An AQ6317B manufactured by AND Co. was used as an optical spectrum analyzer. A 86100A manufactured by Agilent Co. was used as a sampling oscilloscope. A DSCR401R manufactured by Discovery Co. was used as a photodetector.

The optical intensities measured at each point were as follows. The FSK signal (FSK modulator→EDFA→TBPF output point): −1.0 dBm; output of Interleaver for FSK demodulation: −0.7 dBm; DSB-SC output (DSB-SC modulator→EDFA→TBPF output point): −0.9 dBm; output of BPF (interleaver) for PSK conversion: −2.8 dBm; and output of DPSK demodulator (Destructive Port): −2.1 dBm.

FIG. 19 is a graph showing output signal spectra at each point in Example 2. FIG. 19(A) is a graph showing an output signal of an FSK modulator. FIG. 19(B) is a graph showing an output signal of a DSB-SC modulator. FIG. 19(C) is a graph showing a signal having passed through a bandpass filter. In FIG. 19(A), two peaks of the spectrum caused by an FSK modulation signal can be seen. In FIG. 19(B), three peaks of the spectrum caused by an output signal from the DSB-SC modulator can be seen. In FIG. 19(C), a peak of the spectrum caused by a signal having passed through the bandpass filter can be seen. Thus, it can be seen from FIG. 19 that favorable signals could be obtained at each point.

FIG. 20 is oscilloscope images, in place of diagrams, showing outputs of oscilloscope. FIG. 20(A) shows an FSK signal. FIG. 20(B) shows a DPSK demodulation signal. It can be seen from the FIG. 20(B) that DPSK modulation was properly performed since eye pattern of the DPSK modulation signal opens.

Example 3

Generation of a UWB signal by optical FSK modulation was analyzed by using an optical conversion system simulator Optisystem™ 2.2. In this simulation, an FSK frequency modulation ($f_m$) was set at 10 GHz, and an induced phases obtained by the $RF_A$ and $RF_B$ electrodes were set at 1.48 rad. An FSK switching signal is a rectangular pulse having a repetition frequency of 200 MHz and a duty ration of 50%, and the rise time and fall time for the FSK switching signal were set at 100 ps each.

Figure 21:
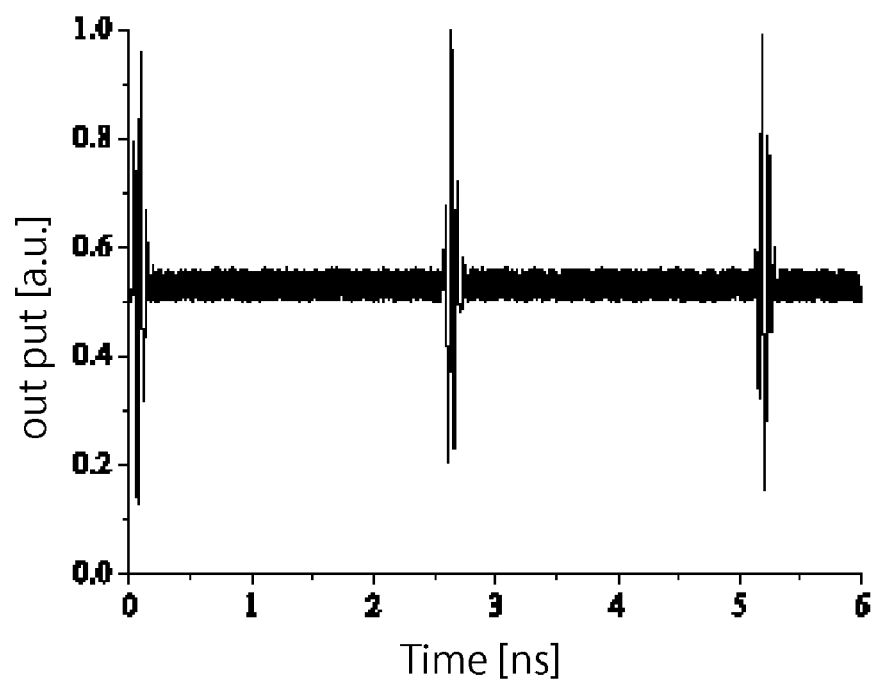
FIG. 21 shows a time waveform of a UWB signal generated in Example 3.
Figure 22:
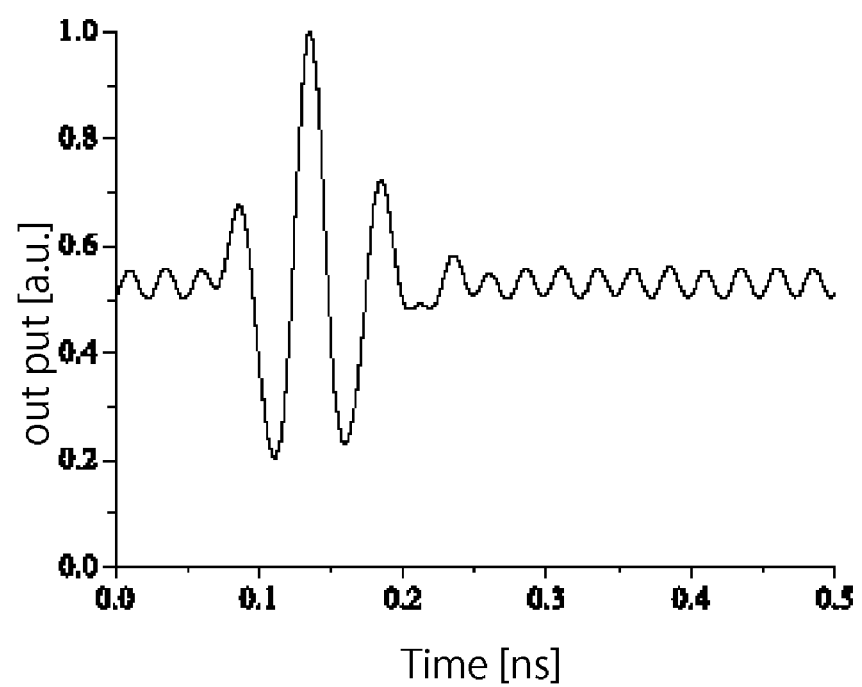
FIG. 22 is a partial enlarged view of the FIG. 21.

FIGS. 21 and 22 show a time waveform of a UWB signal generated in this simulation. FIG. 22 is an enlarged graph of FIG. 21. As is apparent from FIGS. 21 and 22, an RF pulse having a constant average power is generated. A pulse width of the UWB signal is 110 ps, which is almost equal to the rise time of the switching signal.

Example 4

UWB Signal Generation Experiment

Figure 23:
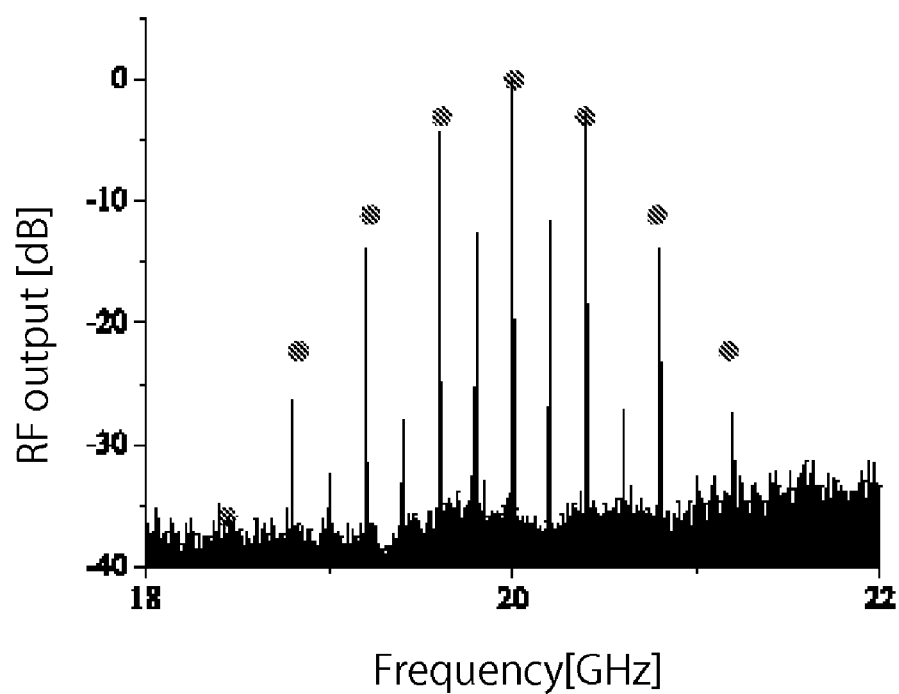
FIG. 23 shows a spectrum, in place of a diagram, of a UWB signal generated in Example 3.

An experiment under the conditions in Example 3 was performed to generate a UWB signal. FIG. 23 shows a spectrum of the generated UWB signal in place of a diagram. As is apparent form FIG. 23, a UWB signal can be outputted by using the UWB signal generator according to the present invention. FIG. 23 also shows calculation results (black circles). In numerical calculation, only a UWB signal having an even-number-order component is generated. However, a spectrum obtained by the experiment includes a UWB signal having an odd-number-order component (smaller than the even-number-order component by −10 dB or less). This is because the extinction ratio of the modulator has a finite value.

Example 5

Figure 24:
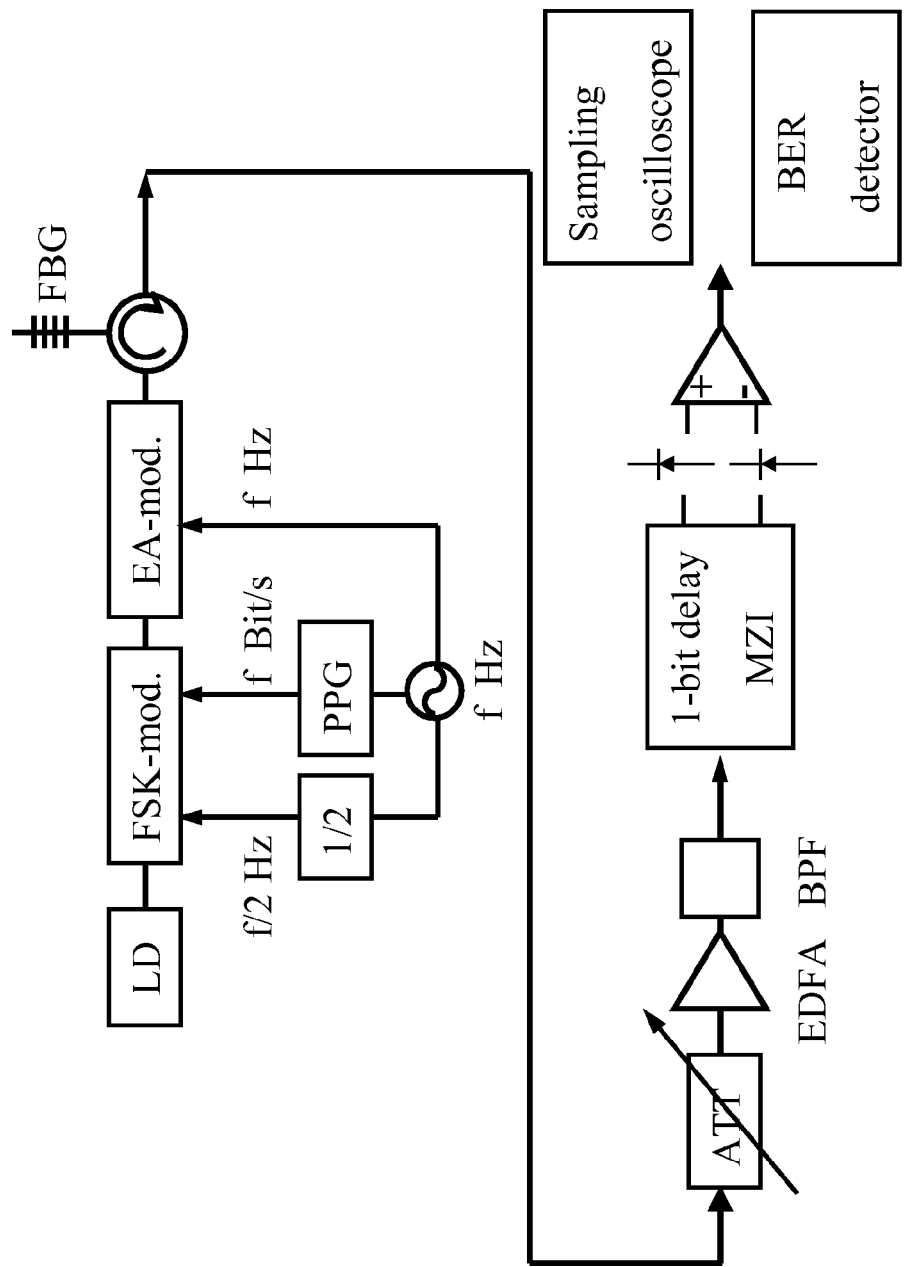
FIG. 24 is a schematic diagram showing a system used in Example 5.

Hereinafter, an experimental example of synchronization control method is explained specifically. FIG. 24 is a schematic diagram showing a system used in Example 5. In the FIG. 24, "LD" represents a light source such as a diode, "FSK-mod." represents an optical FSK modulator (the one having two sub-Mach-Zehnder waveguide and a main Mach-Zehnder waveguide as above described), "PPG" represents a pulse pattern generator, "EA-mod." represents an optional air-absorption-type modulator, "FBG" represents an optional fiber grating, "EDFA" represents an optional erbium-doped fiber amplifier, "BPF" represents a band pass filter, "ATT" represents an optional variable attenuator, and "MZ" represents a Mach-Zehnder waveguide. An optical delay detector comprises a 1-bit delay Mach-Zehnder waveguide and a differential amplifier. "Sampling Oscilloscope" represents an oscilloscope, and "BER detector" represents an optional bit error rate detector.

A signal from a light source is divided into three signals. And, one of the signals is applied to two electrodes of a sub Mach-Zehnder waveguide of an optical FSK modulator as two sinusoidal clock signals whose phases are different by $\pi/2$. One of the divided signals is inputted to a pulse pattern generator. In the pulse generator, the signal is converted to a signal having a predetermined pattern, and the converted signal is applied to an electrode of a main Mach-Zehnder as a baseband signal. Thus, signals fulfilling a predetermined condition and having phases synchronized with a clock signal are applied to electrodes of each Mach-Zehnder waveguide. In so doing, a phase difference (delay amount) $\Delta\phi$ between the sinusoidal clock signal and the baseband signal is set at $\pi/4 + n\pi$ (n is integer) as a synchronization control. Thus, an optical FSK signal having a continuous phase could be obtained. Furthermore, differential amplification was performed by optical delay detector and coherent demodulation by optical phase detection. This improved receiver sensitivity by 3 dB.

Figure 25:
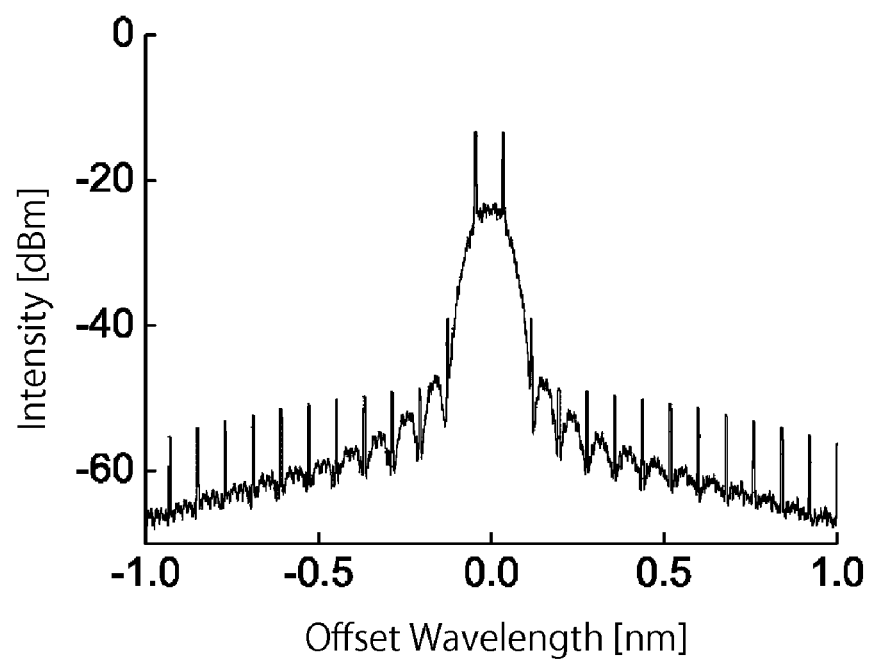
FIG. 25 shows a spectrum based on a calculation of a continuous phase optical frequency shift keying (CPFSK) signal in Example 5.
Figure 26:
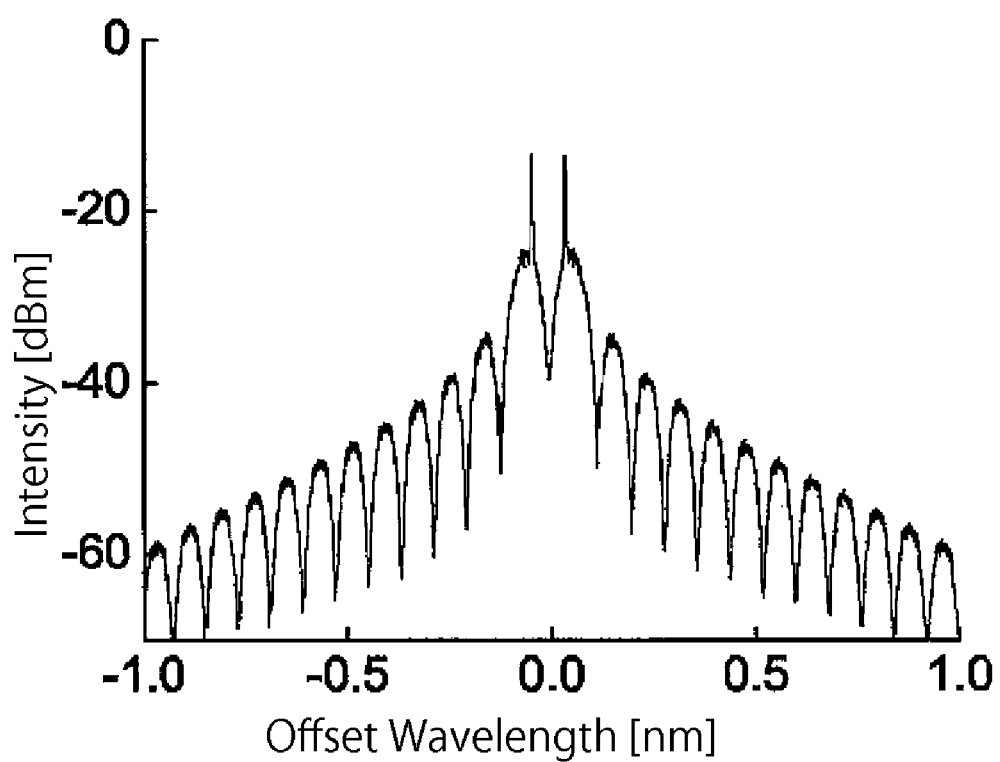
FIG. 26 shows a spectrum of an optical FSK signal with discontinuous phase obtained by an optical FSK modulator.

A spectrum of a continuous phase FSK modulation signal was calculated. A bit rate of a baseband signal was 10 Gbps, a clock frequency was 5 GHz, and $\Delta\phi$ was set at $\pi/4$ (45 degrees). The result is shown in FIG. 25. The FIG. 25 shows a spectrum based on a calculation of a continuous phase optical frequency shift keying (CPFSK) signal in Example 5. It can be seen from the FIG. 25 that high-order side lobes of a modulation spectrum are suppressed due to phase continuity. For reference, a spectrum of an optical FSK modulation signal obtained by a conventional continuous phase optical FSK modulator ($\Delta\phi$ was set at $3\pi/4$ (135 degrees)) is shown in FIG. 26. In other words, the FIG. 26 shows a spectrum of an optical FSK signal with discontinuous phase obtained by an optical FSK modulator.

A detection characteristic when delay detection was performed was calculated. Conditions of the calculation were the same as those of the above example. FIG. 27 is a graph showing a delay detection signal. FIG. 27(A) shows a continuous phase optical frequency shift keying (CPFSK) signal as a delay detection signal. FIG. 27(B) shows an optical FSK modulation signal whose phase is discontinuous (in the above example, the phase difference $\Delta\phi$ is 135 degrees) as a delay detection signal. As shown in the FIG. 27(B), when an optical FSK modulation signal whose phase is discontinuous is modulated, a discontinuous portion appears in a waveform of a detection signal at a timing when a USB signal and an LSB signal are switched. Therefore, a delay detection can not be properly performed by a conventional optical FSK modulation signal. On the other hand, in case of using a continuous phase optical FSK modulation signal as shown in FIG. 27(A), delay detection can be properly performed because the signal has a continuous phase.

Also, spectra of a conventional binary phase shift keying (BPSK) and a continuous phase frequency shift keying (CPFSK) of this embodiment were calculated. The result is shown in FIG. 28. FIG. 28 is a graph showing a spectrum of an optical FSK signal. FIG. 28(A) shows a spectrum of a continuous phase frequency shift keying (CPFSK). FIG. 28(B) shows a spectrum of a conventional binary phase frequency shift keying (BPSK). A BPSK signal had discontinuous phase shifts between codes. On the other hand, CPFSK signal had a continuous phase, and high frequency components (side lobe) could be suppressed. From forgoing analysis, CPFSK is considered to be effectively used in a field of wavelength multiplexing communication and the like.

Example 6

Hereinafter, an experimental example of initial phase control is explained specifically. FIG. 29 is a graph, in place of a diagram, showing a numerical calculation when an initial phase control was not performed. FIG. 29(a) shows an orbit of an optical phase. FIG. 29(b) shows a modulation spectrum of the orbit. FIG. 30 shows an example of a numerical calculation of a modulation spectrum when the best initial phase control was performed. FIG. 30(a) shows an orbit of an optical phase. FIG. 30(b) shows a modulation spectrum of the orbit. Optical spectra shown in these figures were calculated based on the following conditions: clock frequency $f_0=2.5$ GHz; bit rate of a baseband signal B=10 Gb/s (i.e., $f_0$(clock signal)=B(baseband signal)/4). A delay amount $\Delta\phi$ between a clock signal and a baseband signal was set at $\pi/4$.

As shown in FIG. 29(b), when an FSK modulation without an initial phase control is performed, side lobes are generated in higher order. This is because a phase gap generated when a frequency shift is performed contains high frequency components. In other words, as shown in the FIG. 29(a), discontinuous optical phase causes rapid phase changes, and so, as shown in the FIG. 29(a), a broad optical modulation spectrum is generated.

On the other hand, as shown in the FIG. 30, when an FSK modulation with an optimal initial phase control is performed, phase shifts smoothly (phase gap is corrected). Due to this phase continuity, high order side lobe components of a modulation spectrum are effectively suppressed. The modulation spectrum shown in the FIG. 30(b) is equal to an MSK modulation spectrum, which is a condition for performing MSK modulation. Thus it is proved that MSK modulation can be realized by using the initial phase control method.

Lastly, an effect of delay amount (τ') which is caused by a mistiming between data inputted to a baseband and data inputted to an initial phase controller was examined. FIG. 31(a) shows a relationship between sidelobe suppression ratio and a delay amount of an initial phase control. FIG. 31(b) shows a modulation spectrum when a delay amount τ'=20 ps. As shown in the FIG. 31(a), it can be seen that the larger a delay amount τ' becomes, the stronger the intensity of side lobe components becomes. And when a delay amount τ'=20 ps, it can be seen that side lobe components are not effectively suppressed.

The optical modulator of the present invention can be effectively used in the field of optical information communication.

What is claimed is:

1. An optical frequency shift keying modulation system comprising:
    a first sub Mach-Zehnder waveguide ($MZ_A$);
    a second sub Mach-Zehnder waveguide ($MZ_B$);
    a main Mach-Zehnder waveguide ($MZ_C$) comprising:
        an input part of an optical signal,
        a branching part, the branching part being configured to be connected to the input part, the branching part being connected to the $MZ_A$ and the $MZ_B$, the optical signal being branched at the branching part into the $MZ_A$ and the $MZ_B$,
        the first sub Mach-Zehnder waveguide ($MZ_A$),
        the second sub Mach-Zehnder waveguide ($MZ_B$),
        a combining part, the combining part being connected to the $MZ_A$ and the $MZ_B$, the optical signal outputted from the $MZ_A$ and the $MZ_B$ being combined at the combining part,
        an output part outputting the optical signal combined at the combining part;
    a first electrode (electrode A) of the first sub Mach-Zehnder waveguide ($MZ_A$);
    a second electrode (electrode B) of the second sub Mach-Zehnder waveguide ($MZ_B$);
    a third electrode (electrode C) of the main Mach-Zehnder waveguide ($MZ_C$);
    a signal source for applying either one or both of a modulation signal and bias voltage to the first electrode, the second electrode and the third electrode; and
    an output signal phase adjusting part for adjusting a phase difference between an upper side band signal and a lower side band signal, the upper side band signal and the lower side band signal being outputted from the output part.

2. The optical frequency shift keying modulation system as claimed in claim 1,
    wherein the third electrode (electrode C) comprises either one or both of:
    an electrode (electrode $MZ_{CA}$) being provided along a waveguide portion, the waveguide portion being between a combining part of the first sub Mach-Zehnder waveguide ($MZ_A$) and the combining part of the main Mach-Zehnder waveguide ($MZ_C$); and
    an electrode (electrode $MZ_{CB}$) being provided along a waveguide portion, the waveguide portion being between a combining part of the second sub Mach-Zehnder waveguide ($MZ_B$) and the combining part of the main Mach-Zehnder waveguide ($MZ_C$), and
    wherein the output signal phase adjusting part adjusts the phase difference between the upper side band signal and the lower side band signal outputted from the output part, the phase difference being adjusted by controlling voltage applied to either one or both of the electrode $MZ_{CA}$ and the electrode $MZ_{CB}$, the voltage being controlled by the output signal phase adjusting part.

3. The optical frequency shift keying modulation system as claimed in claim 1,
    wherein the output signal phase adjusting part comprises a phase modulator, the phase modulator being provided on between the combining part of the main Mach-Zehnder waveguide ($MZ_C$) and the output part.

4. The optical frequency shift keying modulation system as claimed in claim 1,
    wherein the output signal phase adjusting part adjusts voltage applied to the third electrode so that phase difference between the upper side band signal and the lower side band signal become zero, the upper side band signal and the lower side band signal being outputted from the output part.

5. The optical frequency shift keying modulation system as claimed in claim 1, further comprising:
    an intensity modulator, the intensity modulator being provided on a waveguide portion, the waveguide portion being between the combining part of the first sub Mach-Zehnder waveguide ($MZ_A$) and the combining part of the main Mach-Zehnder waveguide ($MZ_C$), the intensity modulator modulating intensity of the optical signal, the optical signal propagating through the waveguide portion.

6. The optical frequency shift keying modulation system as claimed in claim 1, further comprising:
    a first bias adjusting means for adjusting bias voltage, the bias voltage being applied to the electrode A and the electrode B, the bias voltage being adjusted so as to maximize intensity of the optical signal outputted from the main Mach-Zehnder waveguide; and
    a second bias adjusting means for adjusting bias voltage, the bias voltage being applied to the electrode C, the bias voltage being adjusted so that, when the intensity of the optical signal is represented by Max, intensity of the optical signal is in between 40% to 60%, both inclusive, of the Max, while the bias voltage applied to the electrode A and the electrode B is kept to be the same level as the one obtained in the first bias adjusting means.

7. The optical frequency shift keying modulation system as claimed in claim 1,
    wherein the third electrode (electrode C) comprises either one of:
    an electrode (electrode $MZ_{CA}$) being provided along a waveguide portion, the waveguide portion being between the combining part of the first sub Mach-Zehnder waveguide ($MZ_A$) and the combining part of the main Mach-Zehnder waveguide ($MZ_C$), and
    an electrode (electrode $MZ_{CB}$) being provided along a waveguide portion, the waveguide portion being between the combining part of the second sub Mach-Zehnder waveguide ($MZ_B$) and the combining part of the main Mach-Zehnder waveguide ($MZ_C$),
    wherein the output signal phase adjusting part adjusts the phase difference between the upper side band signal and the lower side band signal outputted from the output part, the phase difference being adjusted by controlling voltage applied to either one of the electrode $MZ_{CA}$ and the electrode $MZ_{CB}$, the voltage being controlled by the output signal phase adjusting part.

8. An optical modulation system comprising:
the optical frequency shift keying modulation system as claimed in claim 1, the system acting as an optical frequency shift keying (FSK) modulator;
an intensity modulator wherein a modulation signal is inputted from the optical frequency shift keying (FSK) modulator; and
a bandpass filter for extracting predetermined frequency components from output light of the intensity modulator,
wherein the optical modulation system adjusts frequencies so that a half of a frequency, the frequency being frequency difference between the upper side band (USB) signal and the lower side band (LSB) signal of output light from the FSK modulator, becomes equal to a modulation frequency of the intensity modulator.

9. An optical modulation system comprising:
an optical frequency shift keying (FSK) modulator;
an intensity modulator wherein a modulation signal is inputted from the optical frequency shift keying (FSK) modulator; and
a bandpass filter for extracting predetermined frequency components from output light of the intensity modulator,
wherein the optical frequency shift keying (FSK) modulator comprises the optical frequency shift keying modulation system as claimed in claim 1,
wherein the optical modulation system adjusts frequencies so that a half of a frequency, the frequency being frequency difference between the upper side band (USB) signal and the lower side band (LSB) signal of output light from the FSK modulator, becomes equal to a modulation frequency of the intensity modulator, and
wherein the optical modulation system converting the optical FSK signal to an optical phase shift keying signal.

10. A UWB signal generating system comprising:
an optical intensity modulator for modulating intensity of laser light; and
an optical frequency shift keying modulation system,
wherein the optical frequency shift keying modulation system is the optical frequency shift keying modulation system as claimed in claim 1 and,
wherein the output light from the optical intensity modulator is inputted into the optical frequency shift keying modulation system.

11. A continuous phase optical frequency shift keying modulator comprising:
an optical frequency shift keying modulator;
a power source system for applying a sinusoidal clock signal to an electrode of the optical frequency shift keying modulator, the power source system applying a baseband signal to the electrode of the optical frequency shift keying modulator, the baseband signal having a predetermined phase difference ($\Delta\phi$) with a phase of the sinusoidal clock signal; and
an initial phase controller controlling a phase of input light inputted to the optical frequency shift keying modulator, the input light being synchronized with the baseband signal, the initial phase controller compensating a phase gap, the phase gap being generated in the optical frequency shift keying modulator when the baseband signal is switched, the phase gap causing a variation in the phase difference ($\Delta\phi$)
wherein the optical frequency shift keying modulator is the optical frequency shift keying modulation system as claimed in claim 1.

12. The continuous phase optical frequency shift keying modulator (1) as claimed in claim 11,
wherein the predetermined phase difference ($\Delta\phi$) is represented by the following equation (I):

$$\Delta\phi = \pi/4 + n\pi \tag{I}$$

where n is integer.

13. A continuous phase optical frequency shift keying modulator as claimed in claim 11, further comprising:
a power source system for applying sinusoidal clock signals to the first electrode and the second electrode, phases of the each sinusoidal clock signal are different by $\pi/2$, the power source system for applying a baseband signal to the third electrode, the baseband signal having a predetermined phase difference ($\Delta\phi$) with a phase of the sinusoidal clock signal applied to the first electrode or the second electrode; and
an initial phase controller controlling a phase of input light inputted to the optical frequency shift keying modulation system as claimed in claim 1, the optical frequency shift keying modulation system acting as the optical frequency shift keying modulator, the input light being synchronized with the baseband signal, the initial phase controller compensating a phase gap, the phase gap being generated in the optical frequency shift keying modulator when the baseband signal is switched, the phase gap causing a variation in the phase difference ($\Delta\phi$).

* * * * *